United States Patent
Cui et al.

(10) Patent No.: US 10,299,240 B2
(45) Date of Patent: May 21, 2019

(54) POSITIONING PARAMETER COORDINATION APPARATUS, SYSTEM, AND METHOD

(71) Applicant: Huawei Technologies Co., Ltd., Shenzhen (CN)

(72) Inventors: Jie Cui, Shenzhen (CN); Anjian Li, Beijing (CN); Jing Han, Beijing (CN); Hong Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/677,819

(22) Filed: Aug. 15, 2017

(65) Prior Publication Data
US 2017/0347332 A1    Nov. 30, 2017

Related U.S. Application Data

(63) Continuation of application No. PCT/CN2015/073159, filed on Feb. 16, 2015.

(51) Int. Cl.
| | |
|---|---|
| *H04W 24/00* | (2009.01) |
| *H04W 64/00* | (2009.01) |
| *H04W 8/24* | (2009.01) |
| *H04W 48/16* | (2009.01) |
| *H04W 72/12* | (2009.01) |
| *H04W 88/02* | (2009.01) |
| *H04W 88/06* | (2009.01) |

(52) U.S. Cl.
CPC ............. *H04W 64/00* (2013.01); *H04W 8/24* (2013.01); *H04W 48/16* (2013.01); *H04W 72/1273* (2013.01); *H04W 88/02* (2013.01); *H04W 88/06* (2013.01)

(58) Field of Classification Search
CPC .................................................... H04W 64/00
See application file for complete search history.

(56) References Cited

U.S. PATENT DOCUMENTS

| 8,195,188 B2 | 6/2012 | Fomukong et al. |
| 2010/0120435 A1 | 5/2010 | Mia et al. |
| 2011/0065454 A1 | 3/2011 | Pawson et al. |

(Continued)

FOREIGN PATENT DOCUMENTS

| CN | 1753550 A | 3/2006 |
| CN | 102104955 A | 6/2011 |

(Continued)

OTHER PUBLICATIONS

Wigren, T. et al.,"Enhanced WCDMA Fingerprinting Localization Using OTDOA Positioning Measurements from LTE," IEEE, XP032395261, 2012, 5 pages, Stockholm, Sweden.

*Primary Examiner* — Justin Y Lee
(74) *Attorney, Agent, or Firm* — Slater Matsil, LLP

(57) ABSTRACT

The present invention provides a positioning parameter coordination apparatus, system, and method. A single positioning controller (SPC) receives a positioning request message sent by a positioning request device, obtains capability information of a user equipment (UE) according to an identifier of the UE, and determines at least one first access network device to complete positioning configuration. The SPC positions the UE according to a positioning parameter of the UE.

19 Claims, 19 Drawing Sheets

(56) References Cited

U.S. PATENT DOCUMENTS

| | | | | |
|---|---|---|---|---|
| 2011/0117926 A1* | 5/2011 | Hwang | ................ | H04W 64/00 |
| | | | | 455/456.1 |
| 2012/0295623 A1* | 11/2012 | Siomina | ................ | G01S 5/0263 |
| | | | | 455/436 |
| 2013/0188510 A1 | 7/2013 | Siomina et al. | | |
| 2013/0203447 A1* | 8/2013 | Hannan | ................ | H04W 64/00 |
| | | | | 455/456.5 |
| 2014/0094188 A1 | 4/2014 | Kazmi et al. | | |

FOREIGN PATENT DOCUMENTS

| | | | |
|---|---|---|---|
| CN | 102265687 A | 11/2011 | |
| CN | 102742335 A | 10/2012 | |
| CN | 103024757 A | 4/2013 | |
| WO | 2012044246 A1 | 4/2012 | |

* cited by examiner

POSITIONING PARAMETER COORDINATION APPARATUS, SYSTEM, AND METHOD

CROSS-REFERENCE TO RELATED APPLICATIONS

This application is a continuation of International Application No. PCT/CN2015/073159, filed on Feb. 16, 2015, the disclosure of which is hereby incorporated by reference in its entirety.

TECHNICAL FIELD

The present invention relates to communications technologies, and in particular, to a positioning parameter coordination apparatus, system, and method.

BACKGROUND

Continuous development of mobile communications technologies gradually brings more requirements of positioning services. Application scenarios of the positioning services tend to diversify, such as, emergency rescue positioning, criminal position tracking, navigation, and traffic control. However, regardless of the versatile application scenarios, a reliable, effective, and fast positioning method is always required in the industry. In other words, a high-precision positioning technology that is easy to be implemented remains popular in the industry.

In a mobile-station positioning algorithm in a Long Term Evolution (LTE for short) system, a characteristic parameter (such as signal field strength, a time difference of arrival of a transmitted signal, or a direction angle of arrival of a signal) of a radio signal transmitted between a mobile station and a base station may be usually detected, and a geometric position of a mobile terminal is estimated according to a related positioning algorithm. Regardless of the used positioning algorithm, an enhanced serving mobile location center (E-SMLC for short) disposed on a core network side is required to perform positioning measurement and exchange positioning information. For example, step 1: A gateway mobile location center (GMLC for short) receives a positioning request. Step 2: The GMLC finds a mobility management entity (MME for short) to which to-be-positioned user equipment (UE) currently belongs. Step 3: The GMLC sends a request of positioning the to-be-positioned UE to the MME. Step 4: The MME sends a positioning request to an E-SMLC. Step 5: The E-SMLC and the to-be-positioned UE perform capability interaction and perform measurement configuration. Step 6: The E-SMLC also interacts with a base station to which the to-be-positioned UE belongs, and obtains positioning signal configuration information on a base station side. Step 7: The E-SMLC obtains a positioning measurement result reported by the to-be-positioned UE (and the base station to which the to-be-positioned UE belongs), and performs positioning calculation, to obtain a position of the to-be-positioned UE. Step 8: The E-SMLC reports the position of the to-be-positioned UE back to the MME. Step 9: The MME feeds the position of the to-be-positioned UE back to the GMLC. Step 10: The GMLC feeds the position of the to-be-positioned UE back to a source end that requests positioning.

In conclusion, based on a current procedure of positioning measurement and positioning information exchange, the E-SMLC performs positioning-related configuration only for the to-be-positioned UE and the base station to which the terminal belongs, and expects to position the UE by performing positioning-related interaction with the to-be-positioned UE and the base station to which the to-be-positioned UE belongs. However, when another cell is deployed around the base station to which the to-be-positioned UE belongs, communications transmission in the another cell interferes with the positioning measurement of the to-be-positioned UE, and positioning accuracy of the UE is reduced.

SUMMARY

The present embodiments provide a positioning parameter coordination apparatus, system, and method, to resolve a prior-art problem of low positioning accuracy of a user equipment (UE).

A first aspect of the present invention provides a single positioning controller (SPC), where the SPC includes a receiving module, configured to receive a positioning request message sent by a positioning request device, where the positioning request message includes an identifier of to-be-positioned UE. The receiving module is also configured to obtain a positioning measurement report of the to-be-positioned UE, where the positioning measurement report includes a positioning measurement result parameter of the to-be-positioned UE. Additionally, the SPC includes a processing module, configured to obtain capability information of the to-be-positioned UE according to the identifier of the UE, where the capability information of the to-be-positioned UE indicates radio standards supported by the UE and determine at least one first access network device according to the capability information of the to-be-positioned UE, where the at least one first access network device is located in a neighboring cell of the to-be-positioned UE, and the at least one first access network device supports one of the radio standards supported by the to-be-positioned UE. The processing module is also configured to perform positioning configuration according to the at least one first access network device and position the to-be-positioned UE according to a positioning parameter of the to-be-positioned UE.

With reference to the first aspect, in a first feasible implementation, the SPC further includes: a sending module, configured to send a first UE capability query message to a second access network device according to the identifier of the to-be-positioned UE, where the second access network device is an access network device to which a server cell of the to-be-positioned UE belongs; where the receiving module is further configured to receive a first UE capability query response message sent by the second access network device, where the first UE capability query response message includes the capability information of the to-be-positioned UE.

With reference to the first aspect, in a second feasible implementation, the sending module is further configured to send a second UE capability query message to the to-be-positioned UE according to the identifier of the to-be-positioned UE; and the receiving module is further configured to receive a second UE capability query response message sent by the to-be-positioned UE, where the second UE capability query response message includes the capability information of the to-be-positioned UE.

With reference to the first aspect or the first feasible implementation of the first aspect or the second feasible implementation of the first aspect, in a third feasible implementation, the sending module is further configured to: send a first query message to the at least one first access network device, where the first query message is used to query downlink positioning signal configuration information of the at least one first access network device; send a second query message to the second access network device, where the second query message is used to query downlink positioning signal configuration information of the second access network device; and send the downlink positioning signal configuration information of the at least one first access network device and the downlink positioning signal configuration information of the second access network device to the to-be-positioned UE; and the receiving module is further configured to: receive a first query response message sent by the at least one first access network device, where the first query response message includes the downlink positioning signal configuration information of the at least one first access network device; and receive a second query response message sent by the second access network device, where the second query response message includes the downlink positioning signal configuration information of the second access network device.

With reference to the first aspect or the first feasible implementation of the first aspect or the second feasible implementation of the first aspect, in a fourth feasible implementation, the processing module is specifically configured to: configure downlink positioning signal configuration information of the at least one first access network device; and configure downlink positioning signal configuration information of the second access network device; and the sending module is further configured to send the downlink positioning signal configuration information of the at least one first access network device and the downlink positioning signal configuration information of the second access network device to the to-be-positioned UE.

With reference to any one of the foregoing feasible implementations of the first aspect, in a fifth feasible implementation, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal; and the downlink positioning signal configuration information of the second access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to any one of the foregoing feasible implementations of the first aspect, in a sixth feasible implementation, the receiving module is further configured to receive the positioning measurement report sent by the to-be-positioned UE, and the positioning measurement report includes a positioning measurement result of downlink positioning reference signals based on multiple access networks.

With reference to the first aspect or the first feasible implementation of the first aspect or the second feasible implementation of the first aspect, in a seventh feasible implementation, the processing module is further configured to: before performing positioning configuration according to the at least one first access network device, use the second access network device to configure that the to-be-positioned UE sends an uplink reference signal; the sending module is further configured to send uplink reference signal configuration information of the to-be-positioned UE to the at least one first access network device and the second access network device; and the receiving module is further configured to receive positioning measurement reports of the to-be-positioned UE that are separately sent by the at least one first access network device and the second access network device.

With reference to the first aspect or any one of the foregoing feasible implementations of the first aspect, in an eighth feasible implementation, the positioning request device is the to-be-positioned UE, an access network device, a core network device, or a 3rd party application server.

A second aspect of the present invention provides an access network device, where the access network device is an access network device to which a server cell of to-be-positioned UE belongs, and the access network device includes: a receiving module, configured to receive a UE capability query message sent by a SPC, where the UE capability query message includes an identifier of the to-be-positioned UE and a capability query instruction. The access network device also includes a processing module, configured to query capability information of the to-be-positioned UE according to the identifier of the to-be-positioned UE and the capability query instruction, where the capability information of the to-be-positioned UE indicates radio standards supported by the to-be-positioned UE. Additionally, the access network device includes a sending module, configured to send a UE capability query response message to the SPC, where the UE capability query response message includes the capability information of the to-be-positioned UE.

With reference to the second aspect, in a first feasible implementation, the receiving module is further configured to: after the sending module sends the UE capability query response message to the SPC, receive uplink reference signal configuration information of the to-be-positioned UE that is sent by the SPC, where the uplink reference signal configuration information of the to-be-positioned UE is used to instruct the to-be-positioned UE to send an uplink reference signal; the sending module is further configured to: send the uplink reference signal configuration information of the to-be-positioned UE to the to-be-positioned UE; and send a measurement report to the SPC, where the measurement report includes a measurement result of the uplink reference signal; and the processing module is further configured to measure the uplink reference signal sent by the to-be-positioned UE.

A third aspect of the present invention provides an access network device, where the access network device is located in a neighboring cell of to-be-positioned UE, and the access network device includes: a receiving module, configured to receive a query message sent by a SPC, where the query message is used to query downlink positioning signal configuration information of the at least one first access network device; and a sending module, configured to send a query response message to the SPC, where the query response message includes the downlink positioning signal configuration information of the first access network device.

With reference to the third aspect, in a first feasible implementation, the downlink positioning signal configuration information of the access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

A fourth aspect of the present invention provides an access network device, where the access network device includes: a receiving module, configured to receive uplink reference signal configuration information of to-be-positioned UE that is sent by a SPC; a processing module, configured to measure an uplink reference signal of the to-be-positioned UE according to the uplink reference signal configuration information of the to-be-positioned UE; and a sending module, configured to send a measurement report to the SPC, where the measurement report includes a measurement result of the uplink reference signal of the to-be-positioned UE.

With reference to the fourth aspect, in a first feasible implementation, the measurement result of the uplink reference signal of the to-be-positioned UE includes: information about a time of arrival of the uplink reference signal of the to-be-positioned UE, and/or about a time difference of arrival of the uplink reference signal of the to-be-positioned UE.

A fifth aspect of the present invention provides UE, where the UE includes: a receiving module, configured to receive downlink positioning signal configuration information of at least one first access network device that is sent by a SPC, where the first access network device is located in a neighboring cell of the to-be-positioned UE; a processing module, configured to: according to the downlink positioning signal configuration information of the at least one first access network device, perform positioning measurement of downlink positioning reference signals based on multiple access networks; and a sending module, configured to send a positioning measurement report to the SPC, where the positioning measurement report includes a positioning measurement result of the downlink positioning reference signals based on the multiple access networks.

With reference to the fifth aspect, in a first feasible implementation, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the fifth aspect or the first feasible implementation of the fifth aspect, in a second feasible implementation, the positioning measurement result of the downlink positioning reference signals based on the multiple access networks includes: information about times of arrival of the downlink positioning reference signals based on the multiple access networks, and/or about a time difference of arrival of the downlink positioning reference signals based on the multiple access networks.

A sixth aspect of the present invention provides a positioning parameter coordination system, where the system includes: the SPC according to the first aspect or any one of the foregoing feasible implementations of the first aspect, the access network device according to the second aspect or any one of the foregoing feasible implementations of the second aspect, at least one access network device according to the third aspect or any one of the foregoing feasible implementations of the third aspect, at least one access network device according to the fourth aspect or any one of the foregoing feasible implementations of the fourth aspect, and the UE according to the fifth aspect or any one of the foregoing feasible implementations of the fifth aspect.

A seventh aspect of the present invention provides a SPC, where the SPC includes: a receiving module, configured to: receive a positioning request message sent by a positioning request device, where the positioning request message includes an identifier of to-be-positioned UE; and receive a positioning measurement report sent by the to-be-positioned UE, where the positioning measurement report includes a positioning measurement result parameter of the to-be-positioned UE; a processing module, configured to: determine a second access network device of the to-be-positioned UE according to the identifier of the UE, where the second access network device is an access network device to which a server cell of the to-be-positioned UE belongs; select at least one first access network device according to the second access network device, where the first access network device is an access network device in a neighboring cell of the serving cell in which the to-be-positioned UE is located; and position the to-be-positioned UE according to the positioning measurement result parameter of the to-be-positioned UE; and a sending module, configured to: send positioning signal configuration information to the at least one first access network device; and send the positioning signal configuration information to the to-be-positioned UE.

With reference to the seventh aspect, in a first feasible implementation, the positioning signal configuration information includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the seventh aspect or the first feasible implementation of the seventh aspect, in a second feasible implementation, the positioning request device is the to-be-positioned UE, an access network device, a core network device, or a 3rd party application server.

An eighth aspect of the present invention provides an access network device, where the access network device is an access network device in a neighboring cell of a serving cell in which to-be-positioned UE is located, and the access network device includes: a receiving module, configured to receive positioning signal configuration information sent by a SPC; and a sending module, configured to send a positioning signal according to the positioning signal configuration information.

With reference to the eighth aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

With reference to the eighth aspect or the first feasible implementation of the eighth aspect, in a second feasible implementation, the sending module is further configured to: after sending the positioning signal according to the positioning signal configuration information, send a configuration response message to the SPC.

A ninth aspect of the present invention provides UE, where the UE includes: a receiving module, configured to receive positioning signal configuration information sent by a SPC, where the positioning signal configuration information includes positioning signal configuration information sent by at least one first access network device, and the first access network device is an access network device in a neighboring cell of a serving cell in which the to-be-positioned UE is located; a processing module, configured to measure, according to the positioning signal configuration information, a positioning signal sent by the at least one first access network device; and a sending module, configured to send a positioning measurement report to the SPC, where the positioning measurement report includes a positioning measurement result parameter of the to-be-positioned UE.

With reference to the ninth aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

A tenth aspect of the present invention provides a positioning parameter coordination system, where the system includes: the according to the seventh aspect or any one of the foregoing feasible implementations of the seventh aspect, the access network device according to the eighth aspect or any one of the foregoing feasible implementations of the eighth aspect, and the UE according to the ninth aspect or any one of the foregoing feasible implementations of the ninth aspect.

An eleventh aspect of the present invention provides a SPC, where the SPC includes: a receiving module, configured to: receive a positioning request message sent by a positioning request device, where the positioning request message includes an identifier of to-be-positioned UE; obtain a reference signal configuration status; and receive a positioning measurement report sent by the to-be-positioned UE, where the positioning measurement report includes a positioning measurement result parameter of the UE; and a processing module, configured to: determine a second access network device of the to-be-positioned UE according to the identifier of the to-be-positioned UE, where the second access network device is an access network device to which a server cell of the to-be-positioned UE belongs; if the reference signal configuration status includes information indicating that a reference signal has been configured, configure that the to-be-positioned UE performs positioning measurement based on the configured reference signal; and position the to-be-positioned UE according to the positioning measurement result parameter of the to-be-positioned UE.

With reference to the eleventh aspect, in a first feasible implementation, the sending module is further configured to send a first query message to the second access network device, and the first query message is used to query whether the second access network device has configured a reference signal for the to-be-positioned UE; and the receiving module is further configured to receive a first query response message sent by the second access network device, and the first query response message includes the information indicating that a reference signal has been configured.

With reference to the eleventh aspect, in a second feasible implementation, the sending module is further configured to send a second query message to the to-be-positioned UE, and the second query message is used to query whether a reference signal has been configured for the UE; and the receiving module is further configured to receive a second query response message sent by the to-be-positioned UE, and the second query response message includes the information indicating that a reference signal has been configured.

With reference to the eleventh aspect or the first feasible implementation of the eleventh aspect or the second feasible implementation of the eleventh aspect, in a third feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the eleventh aspect or any one of the foregoing feasible implementations of the eleventh aspect, in a fourth feasible implementation, the sending module is further configured to send a positioning measurement trigger message to the to-be-positioned UE, and the positioning measurement trigger message includes configuration information of the configured reference signal and positioning measurement indication information; where the positioning measurement indication information is used to represent any one of the following positioning measurement methods: global navigation satellite system (GNSS) positioning, an observed time difference of arrival (OTDOA) manner, enhanced cell identifier (ID) positioning, or uplink-time difference of arrival (U-TDOA) positioning, or fingerprint matching positioning.

With reference to the eleventh aspect or the first feasible implementation of the eleventh aspect or the second feasible implementation of the eleventh aspect or the third feasible implementation of the eleventh aspect, in a fourth feasible implementation, the positioning request device is the to-be-positioned UE, an access network device, a core network device, or a 3rd party application server.

A twelfth aspect of the present invention provides UE, where the UE includes: a receiving module, configured to receive a positioning measurement trigger message sent by a SPC, where the positioning measurement trigger message includes configuration information of a configured reference signal and positioning measurement indication information; a processing module, configured to perform positioning measurement according to the configured reference signal; and a sending module, configured to send a positioning measurement report to the SPC, where the positioning measurement report includes a positioning parameter of the to-be-positioned UE.

With reference to the twelfth aspect, in a first feasible implementation, the receiving module is further configured to: before receiving the positioning measurement trigger message sent by the SPC, receive a second query message sent by the SPC, and the second query message is used to query whether a reference signal has been configured for the to-be-positioned UE; the processing module is further configured to determine that a reference signal has been configured; and the sending module is further configured to send a second query response message to the SPC, and the second query response message includes information indicating that a reference signal has been configured.

With reference to the twelfth aspect or the first feasible implementation of the twelfth aspect, in a second feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the twelfth aspect or the first feasible implementation of the twelfth aspect or the second feasible implementation of the twelfth aspect, in a third feasible implementation, the positioning measurement indication information is used to represent any one of the following positioning measurement methods: GNSS positioning, an OTDOA manner, enhanced cell ID positioning, or U-TDOA positioning, or fingerprint matching positioning.

A thirteenth aspect of the present invention provides an access network device, where the access network device is an access network device to which a server cell of to-be-positioned UE belongs, and the access network device includes: a receiving module, configured to receive a first query message sent by a SPC, where the first query message is used to query whether the access network device has configured a reference signal for the to-be-positioned UE; a processing module, configured to determine that a reference signal has been configured for the to-be-positioned UE; and a sending module, configured to send a first query response message to the SPC, where the first query response message includes information indicating that a reference signal has been configured.

With reference to the thirteenth aspect, in a first feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

A fourteenth aspect of the present invention provides a positioning parameter coordination system, where the system includes: the SPC according to the eleventh aspect or any one of the foregoing feasible implementations of the eleventh aspect, the UE according to the twelfth aspect or any one of the foregoing feasible implementations of the twelfth aspect, and at least one access network device according to the thirteenth aspect or any one of the foregoing feasible implementations of the thirteenth aspect.

A fifteenth aspect of the present invention provides a SPC, where the SPC includes: a receiving module, configured to: receive a positioning request message sent by a positioning request device, where the positioning request message includes an identifier of to-be-positioned UE; and obtain a positioning measurement report, where the positioning measurement report includes a positioning measurement result parameter of the to-be-positioned UE; and a processing module, configured to: obtain receiving status information of a positioning-used reference signal according to the identifier of the to-be-positioned UE; configure a transmission mode for the positioning-used reference signal according to the receiving status information of the positioning-used reference signal, so as to ensure receiving quality of the positioning-used reference signal; and position the to-be-positioned UE according to the positioning measurement result parameter of the to-be-positioned UE.

With reference to the fifteenth aspect, in a first feasible implementation, the SPC further includes: a sending module, configured to: send a first report request message to at least one first access network device according to the identifier of the to-be-positioned UE, where the first report request message is used to instruct the at least one first access network device to report receiving status information of a positioning-used reference signal received by the at least one first access network device, and the first access network device is an access network device in a neighboring cell of a serving cell in which the to-be-positioned UE is located; or send a second report request message to a second access network device according to the identifier of the to-be-positioned UE, where the second report request message is used to instruct the second access network device to report receiving status information of a positioning-used reference signal received by the second access network device, and the second access network device is an access network device to which a server cell of the to-be-positioned UE belongs; or send a third report request message to the to-be-positioned UE according to the identifier of the to-be-positioned UE, where the third report request message is used to instruct the to-be-positioned UE to report receiving status information of a positioning-used reference signal received by the to-be-positioned UE; and the receiving module is specifically configured to: receive a first report response message sent by the at least one first access network device, where the first report response message includes the receiving status information of the positioning-used reference signal received by the at least one first access network device; or receive a second report response message sent by the second access network device, where the second report response message includes the receiving status information of the positioning-used reference signal received by the second access network device; or receive a third report response message sent by the to-be-positioned UE, where the third report response message includes the receiving status information of the positioning-used reference signal received by the to-be-positioned UE.

With reference to the fifteenth aspect or the first feasible implementation of the fifteenth aspect, in a second feasible implementation, the receiving status information of the positioning-used reference signal received by the at least one first access network device includes a signal strength value of the positioning-used reference signal received by the at least one first access network device, and/or signal quality of the positioning-used reference signal received by the at least one first access network device; the receiving status information of the positioning-used reference signal received by the second access network device includes a signal strength value of the positioning-used reference signal received by the second access network device, and/or signal quality of the positioning-used reference signal received by the second access network device; and the receiving status information of the positioning-used reference signal received by the to-be-positioned UE includes a signal strength value of the positioning-used reference signal received by the to-be-positioned UE, and/or signal quality of the positioning-used reference signal received by the to-be-positioned UE.

With reference to the second feasible implementation of the fifteenth aspect, in a third feasible implementation, the processing module is specifically configured to: compare a first interference threshold with the signal strength value of the positioning-used reference signal received by the at least one first access network device, where if the signal strength value of the positioning-used reference signal received by the at least one first access network device is less than or equal to the first interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the at least one first access network device; and/or compare a second interference threshold with the signal quality of the positioning-used reference signal received by the at least one first access network device, where if the signal quality of the positioning-used reference signal received by the at least one first access network device is less than or equal to the second interference threshold, the SPC sends the signal transmission mode indication message to the non-positioned UE, and the signal transmission mode indication message is used to instruct the non-positioned UE to restrict data service transmission when the SPC performs positioning processing of the UE.

With reference to the third feasible implementation of the fifteenth aspect, in a fourth feasible implementation, the processing module is specifically configured to: compare a third interference threshold with the signal strength value of the positioning-used reference signal received by the second access network device, where if the signal strength value of the positioning-used reference signal received by the second access network device is less than or equal to the third interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the second access network device; and/or compare a fourth interference threshold with the signal quality of the positioning-used reference signal received by the second access network device, where if the signal quality of the positioning-used reference signal received by the second access network device is less than or equal to the fourth interference threshold, the SPC sends the signal transmission mode indication message to the non-positioned UE, and the signal transmission mode indication message is used to instruct the non-positioned UE to restrict data service transmission when the SPC performs positioning processing of the UE.

With reference to the second feasible implementation of the fifteenth aspect, in a fifth feasible implementation, the processing module is specifically configured to: compare a fifth interference threshold with the signal strength value of the positioning-used reference signal received by the to-be-positioned UE, where if the signal strength value of the positioning-used reference signal received by the to-be-positioned UE is less than or equal to the fifth interference threshold, the SPC sends a signal transmission mode indication message to the at least one first access network device and/or the second access network device, and the signal transmission mode indication message is used to instruct the at least one first access network device and/or the second access network device to restrict data service transmission when the SPC performs positioning processing of the UE; and/or compare a sixth interference threshold with the signal quality of the positioning-used reference signal received by the to-be-positioned UE, where if the signal quality of the positioning-used reference signal received by the to-be-positioned UE is less than or equal to the sixth interference threshold, the SPC sends the signal transmission mode indication message to the at least one first access network device and/or the second access network device, and the signal transmission mode indication message is used to instruct the at least one first access network device and/or the second access network device to restrict data service transmission when the SPC performs positioning processing of the UE.

With reference to the fifteenth aspect or any one of the foregoing feasible implementations of the fifteenth aspect, in a sixth feasible implementation, the positioning request device is the to-be-positioned UE, an access network device, a core network device, or a 3rd party application server.

A sixteenth aspect of the present invention provides UE, where the UE includes: a receiving module, configured to receive a configuration indication message sent by a SPC, where the configuration indication message is used to instruct the to-be-positioned UE to send a positioning-used uplink reference signal; and a sending module, configured to send the positioning-used uplink reference signal according to the configuration indication message.

A seventeenth aspect of the present invention provides an access network device, where the access network device includes: a receiving module, configured to: receive a positioning-used uplink reference signal sent by to-be-positioned UE; and obtain receiving status information of the positioning-used uplink reference signal; and a sending module, configured to send a report response message to a SPC, where the report response message includes the receiving status information of the positioning-used uplink reference signal received by the access network device.

With reference to the seventeenth aspect, in a first feasible implementation, the receiving module is further configured to: before the sending module sends the report response message to the SPC, receive a report request message sent by the SPC, and the report request message is used to instruct the access network device to report the receiving status information of the positioning-used uplink reference signal received by the access network device.

With reference to the seventeenth aspect or the first feasible implementation of the seventeenth aspect, in a second feasible implementation, the receiving status information of the positioning-used uplink reference signal received by the access network device includes a signal strength value of the positioning-used uplink reference signal received by the access network device, and/or signal quality of the positioning-used uplink reference signal received by the access network device.

With reference to the seventeenth aspect or the first feasible implementation of the seventeenth aspect or the second feasible implementation of the seventeenth aspect, in a third feasible implementation, the access network device is a first access network device and/or a second access network device; the first access network device is an access network device to which a server cell of the to-be-positioned UE belongs; and the second access network device is an access network device to which the server cell of the to-be-positioned UE belongs.

An eighteenth aspect of the present invention provides UE, where the UE includes: a receiving module, configured to: receive a first positioning-used downlink reference signal sent by at least one first access network device, where the first access network device is an access network device in a neighboring cell of a serving cell in which the to-be-positioned UE is located; and/or receive a second positioning-used downlink reference signal sent by a second access network device, where the second access network device is an access network device to which the server cell of the to-be-positioned UE belongs; a processing module, configured to obtain receiving status information of the positioning-used downlink reference signal according to the first positioning-used downlink reference signal and/or the second positioning-used downlink reference signal; and a sending module, configured to send a report response message to a SPC, where the third report response message includes the receiving status information of the positioning-used reference signal received by the to-be-positioned UE.

With reference to the eighteenth aspect, in a first feasible implementation, the receiving module is further configured to: before the sending module sends the report response message to the SPC, receive a report request message sent by the SPC, and the report request message is used to instruct the sending module to report the receiving status information of the positioning-used downlink reference signal received by the UE.

With reference to the eighteenth aspect or the first feasible implementation of the eighteenth aspect, in a second feasible implementation, the receiving status information of the positioning-used reference signal received by the UE includes a signal strength value of the positioning-used downlink reference signal received by the UE, and/or signal quality of the positioning-used downlink reference signal received by the UE.

A nineteenth aspect of the present invention provides an access network device, where the access network device includes: a receiving module, configured to: receive a configuration indication message sent by a SPC, where the configuration indication message is used to instruct to send a positioning-used downlink reference signal to to-be-positioned UE; and receive a signal transmission mode indication message sent by the SPC, where the signal transmission mode indication message is used to instruct the access network device to restrict data service transmission when the SPC performs positioning processing of the to-be-positioned UE; a sending module, configured to send the positioning-used downlink reference signal to the to-be-positioned UE according to the configuration indication message; and a processing module, configured to restrict, according to the signal transmission mode indication message, data service transmission when the SPC performs positioning processing of the to-be-positioned UE.

With reference to the nineteenth aspect, in a first feasible implementation, the access network device is a first access network device and/or a second access network device; and the first access network device is an access network device in a neighboring cell of a serving cell in which the to-be-positioned UE is located; and the second access network device is an access network device to which the server cell of the to-be-positioned UE belongs.

A twentieth aspect of the present invention provides a positioning parameter coordination system, where the system includes: the SPC according to the fifteenth aspect or any one of the foregoing feasible implementations of the fifteenth aspect, the UE according to the sixteenth aspect, at least one access network device according to the seventeenth aspect or any one of the foregoing feasible implementations of the seventeenth aspect, the UE according to the eighteenth aspect or any one of the foregoing feasible implementations of the eighteenth aspect, and at least one access network device according to the nineteenth aspect or any one of the foregoing feasible implementations of the nineteenth aspect.

A twenty-first aspect of the present invention provides a SPC, where the SPC includes: a receiver, configured to: receive a positioning request message sent by a positioning request device, where the positioning request message includes an identifier of to-be-positioned UE; and obtain a positioning measurement report of the to-be-positioned UE, where the positioning measurement report includes a positioning measurement result parameter of the to-be-positioned UE; and a processor, configured to: obtain capability information of the to-be-positioned UE according to the identifier of the UE, where the capability information of the to-be-positioned UE indicates radio standards supported by the UE; determine at least one first access network device according to the capability information of the to-be-positioned UE, where the at least one first access network device is located in a neighboring cell of the to-be-positioned UE, and the at least one first access network device supports one of the radio standards supported by the to-be-positioned UE; perform positioning configuration according to the at least one first access network device; and position the to-be-positioned UE according to a positioning parameter of the to-be-positioned UE.

With reference to the twenty-first aspect, in a first feasible implementation, the SPC further includes: a transmitter, configured to send a first UE capability query message to a second access network device according to the identifier of the to-be-positioned UE, where the second access network device is an access network device to which a server cell of the to-be-positioned UE belongs; where the receiver is further configured to receive a first UE capability query response message sent by the second access network device, where the first UE capability query response message includes the capability information of the to-be-positioned UE.

With reference to the twenty-first aspect, in a second feasible implementation, the transmitter is further configured to send a second UE capability query message to the to-be-positioned UE according to the identifier of the to-be-positioned UE; and the receiver is further configured to receive a second UE capability query response message sent by the to-be-positioned UE, where the second UE capability query response message includes the capability information of the to-be-positioned UE.

With reference to the twenty-first aspect or the first feasible implementation of the twenty-first aspect or the second feasible implementation of the twenty-first aspect, in a third feasible implementation, the transmitter is further configured to: send a first query message to the at least one first access network device, where the first query message is used to query downlink positioning signal configuration information of the at least one first access network device; send a second query message to the second access network device, where the second query message is used to query downlink positioning signal configuration information of the second access network device; and send the downlink positioning signal configuration information of the at least one first access network device and the downlink positioning signal configuration information of the second access network device to the to-be-positioned UE; and the receiver is further configured to: receive a first query response message sent by the at least one first access network device, where the first query response message includes the downlink positioning signal configuration information of the at least one first access network device; and receive a second query response message sent by the second access network device, where the second query response message includes the downlink positioning signal configuration information of the second access network device.

With reference to the twenty-first aspect or the first feasible implementation of the twenty-first aspect or the second feasible implementation of the twenty-first aspect, in a fourth feasible implementation, the transmitter is specifically configured to: configure downlink positioning signal configuration information of the at least one first access network device; and configure downlink positioning signal configuration information of the second access network device; and the transmitter is further configured to send the downlink positioning signal configuration information of the at least one first access network device and the downlink positioning signal configuration information of the second access network device to the to-be-positioned UE.

With reference to any one of the foregoing feasible implementations of the twenty-first aspect, in a fifth feasible implementation, the downlink positioning signal configuration information of the at least one first access network device includes any one or a combination of the following:

a sending period of a downlink positioning signal, a scheduled sending time of a downlink positioning signal, a sending frequency channel number of a downlink positioning signal, and/or a sending sequence of a downlink positioning signal; and the downlink positioning signal configuration information of the second access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to any one of the foregoing feasible implementations of the twenty-first aspect, in a sixth feasible implementation, the receiver is further configured to receive the positioning measurement report sent by the to-be-positioned UE, and the positioning measurement report includes a positioning measurement result of downlink positioning reference signals based on multiple access networks.

With reference to the twenty-first aspect or the first feasible implementation of the twenty-first aspect or the second feasible implementation of the twenty-first aspect, in a seventh feasible implementation, the processor is further configured to: before performing positioning configuration according to the at least one first access network device, use the second access network device to configure that the to-be-positioned UE sends an uplink reference signal; the transmitter is further configured to send uplink reference signal configuration information of the to-be-positioned UE to the at least one first access network device and the second access network device; and the receiver is further configured to receive positioning measurement reports of the to-be-positioned UE that are separately sent by the at least one first access network device and the second access network device.

With reference to the twenty-first aspect or any one of the foregoing feasible implementations of the twenty-first aspect, in an eighth feasible implementation, the positioning request device is the to-be-positioned UE, an access network device, a core network device, or a 3rd party application server.

A twenty-second aspect of the present invention provides an access network device, where the access network device is an access network device to which a server cell of to-be-positioned UE belongs, and the access network device includes: a receiver, configured to receive a UE capability query message sent by a SPC, where the UE capability query message includes an identifier of the to-be-positioned UE and a capability query instruction; a processor, configured to query capability information of the to-be-positioned UE according to the identifier of the to-be-positioned UE and the capability query instruction, where the capability information of the to-be-positioned UE indicates radio standards supported by the to-be-positioned UE; and a transmitter, configured to send a UE capability query response message to the SPC, where the UE capability query response message includes the capability information of the to-be-positioned UE.

With reference to the twenty-second aspect, in a first feasible implementation, the receiver is further configured to: after the transmitter sends the UE capability query response message to the SPC, receive uplink reference signal configuration information of the to-be-positioned UE that is sent by the SPC, where the uplink reference signal configuration information of the to-be-positioned UE is used to instruct the to-be-positioned UE to send an uplink reference signal; the transmitter is further configured to: send the uplink reference signal configuration information of the to-be-positioned UE to the to-be-positioned UE; and send a measurement report to the SPC, where the measurement report includes a measurement result of the uplink reference signal; and the processor is further configured to measure the uplink reference signal sent by the to-be-positioned UE.

A twenty-third aspect of the present invention provides an access network device, where the access network device is located in a neighboring cell of to-be-positioned UE, and the access network device includes: a receiver, configured to receive a query message sent by a SPC, where the query message is used to query downlink positioning signal configuration information of the at least one first access network device; and a transmitter, configured to send a query response message to the SPC, where the query response message includes the downlink positioning signal configuration information of the first access network device.

With reference to the twenty-third aspect, in a first feasible implementation, the downlink positioning signal configuration information of the access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

A twenty-fourth aspect of the present invention provides an access network device, where the access network device includes: a receiver, configured to receive uplink reference signal configuration information of to-be-positioned UE that is sent by a SPC; a processor, configured to measure an uplink reference signal of the to-be-positioned UE according to the uplink reference signal configuration information of the to-be-positioned UE; and a transmitter, configured to send a measurement report to the SPC, where the measurement report includes a measurement result of the uplink reference signal of the to-be-positioned UE.

With reference to the twenty-fourth aspect, in a first feasible implementation, the measurement result of the uplink reference signal of the to-be-positioned UE includes: information about a time of arrival of the uplink reference signal of the to-be-positioned UE, and/or about a time difference of arrival of the uplink reference signal of the to-be-positioned UE.

A twenty-fifth aspect of the present invention provides UE, where the UE includes: a receiver, configured to receive downlink positioning signal configuration information of at least one first access network device that is sent by a SPC, where the first access network device is located in a neighboring cell of the to-be-positioned UE; a processor, configured to: according to the downlink positioning signal configuration information of the at least one first access network device, perform positioning measurement of downlink positioning reference signals based on multiple access networks; and a transmitter, configured to send a positioning measurement report to the SPC, where the positioning measurement report includes a positioning measurement result of the downlink positioning reference signals based on the multiple access networks.

With reference to the twenty-fifth aspect, in a first feasible implementation, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the twenty-fifth aspect or the first feasible implementation of the twenty-fifth aspect, in a second feasible implementation, the positioning measurement result of the downlink positioning reference signals based on the multiple access networks includes: information about times of arrival of the downlink positioning reference signals based on the multiple access networks, and/or about a time difference of arrival of the downlink positioning reference signals based on the multiple access networks.

A twenty-sixth aspect of the present invention provides a SPC, where the SPC includes: a receiver, configured to: receive a positioning request message sent by a positioning request device, where the positioning request message includes an identifier of to-be-positioned UE; and receive a positioning measurement report sent by the to-be-positioned UE, where the positioning measurement report includes a positioning measurement result parameter of the to-be-positioned UE; a processor, configured to: determine a second access network device of the to-be-positioned UE according to the identifier of the UE, where the second access network device is an access network device to which a server cell of the to-be-positioned UE belongs; select at least one first access network device according to the second access network device, where the first access network device is an access network device in a neighboring cell of the serving cell in which the to-be-positioned UE is located; and position the to-be-positioned UE according to the positioning measurement result parameter of the to-be-positioned UE; and a transmitter, configured to: send positioning signal configuration information to the at least one first access network device; and send the positioning signal configuration information to the to-be-positioned UE.

With reference to the twenty-sixth aspect, in a first feasible implementation, the positioning signal configuration information includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the twenty-sixth aspect or the first feasible implementation of the twenty-sixth aspect, in a second feasible implementation, the positioning request device is the to-be-positioned UE, an access network device, a core network device, or a 3rd party application server.

A twenty-seventh aspect of the present invention provides an access network device, where the access network device is an access network device in a neighboring cell of a serving cell in which to-be-positioned UE is located, and the access network device includes: a receiver, configured to receive positioning signal configuration information sent by a SPC; and a transmitter, configured to send a positioning signal according to the positioning signal configuration information.

With reference to the twenty-seventh aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

With reference to the twenty-seventh aspect or the first feasible implementation of the twenty-seventh aspect, in a second feasible implementation, the transmitter is further configured to: after sending the positioning signal according to the positioning signal configuration information, send a configuration response message to the SPC.

A twenty-eighth aspect of the present invention provides UE, where the UE includes: a receiver, configured to receive positioning signal configuration information sent by a SPC, where the positioning signal configuration information includes positioning signal configuration information sent by at least one first access network device, and the first access network device is an access network device in a neighboring cell of a serving cell in which the to-be-positioned UE is located; a processor, configured to measure, according to the positioning signal configuration information, a positioning signal sent by the at least one first access network device; and a transmitter, configured to send a positioning measurement report to the SPC, where the positioning measurement report includes a positioning measurement result parameter of the to-be-positioned UE.

With reference to the twenty-eighth aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

A twenty-ninth aspect of the present invention provides a SPC, where the SPC includes: a receiver, configured to: receive a positioning request message sent by a positioning request device, where the positioning request message includes an identifier of to-be-positioned UE; and obtain a reference signal configuration status; and receive a positioning measurement report sent by the to-be-positioned UE, where the positioning measurement report includes a positioning measurement result parameter of the UE; and a processor, configured to: determine a second access network device of the to-be-positioned UE according to the identifier of the to-be-positioned UE, where the second access network device is an access network device to which a server cell of the to-be-positioned UE belongs; if the reference signal configuration status includes information indicating that a reference signal has been configured, configure that the to-be-positioned UE performs positioning measurement based on the configured reference signal; and position the to-be-positioned UE according to the positioning measurement result parameter of the to-be-positioned UE.

With reference to the twenty-ninth aspect, in a first feasible implementation, the transmitter is further configured to send a first query message to the second access network device, and the first query message is used to query whether the second access network device has configured a reference signal for the to-be-positioned UE; and the receiver is further configured to receive a first query response message sent by the second access network device, and the first query response message includes the information indicating that a reference signal has been configured.

With reference to the twenty-ninth aspect, in a second feasible implementation, the transmitter is further configured to send a second query message to the to-be-positioned UE, and the second query message is used to query whether a reference signal has been configured for the UE; and the receiver is further configured to receive a second query response message sent by the to-be-positioned UE, and the second query response message includes the information indicating that a reference signal has been configured.

With reference to the twenty-ninth aspect or the first feasible implementation of the twenty-ninth aspect or the second feasible implementation of the twenty-ninth aspect, in a third feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the twenty-ninth aspect or any one of the foregoing feasible implementations of the twenty-ninth aspect, in a fourth feasible implementation, the transmitter is further configured to send a positioning measurement trigger message to the to-be-positioned UE, and the positioning measurement trigger message includes configuration information of the configured reference signal and positioning measurement indication information; where the positioning measurement indication information is used to represent any one of the following positioning measurement methods: GNSS positioning, an OTDOA manner, enhanced cell ID positioning, or U-TDOA positioning, or fingerprint matching positioning.

With reference to the twenty-ninth aspect or the first feasible implementation of the twenty-ninth aspect or the second feasible implementation of the twenty-ninth aspect or the third feasible implementation of the twenty-ninth aspect, in a fifth feasible implementation, the positioning request device is the to-be-positioned UE, an access network device, a core network device, or a 3rd party application server.

A thirtieth aspect of the present invention provides UE, where the UE includes: a receiver, configured to receive a positioning measurement trigger message sent by a SPC, where the positioning measurement trigger message includes configuration information of a configured reference signal and positioning measurement indication information; a processor, configured to perform positioning measurement according to the configured reference signal; and a transmitter, configured to send a positioning measurement report to the SPC, where the positioning measurement report includes a positioning parameter of the to-be-positioned UE.

With reference to the thirtieth aspect, in a first feasible implementation, the receiver is further configured to: before receiving the positioning measurement trigger message sent by the SPC, receive a second query message sent by the SPC, and the second query message is used to query whether a reference signal has been configured for the to-be-positioned UE; the processor is further configured to determine that a reference signal has been configured; and the transmitter is further configured to send a second query response message to the SPC, and the second query response message includes information indicating that a reference signal has been configured.

With reference to the thirtieth aspect or the first feasible implementation of the thirtieth aspect, in a second feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the thirtieth aspect or the first feasible implementation of the thirtieth aspect or the second feasible implementation of the thirtieth aspect, in a second feasible implementation, the positioning measurement indication information is used to represent any one of the following positioning measurement methods: GNSS positioning, an OTDOA manner, enhanced cell ID positioning, or U-TDOA positioning, or fingerprint matching positioning.

A thirty-first aspect of the present invention provides an access network device, where the access network device is an access network device to which a server cell of to-be-positioned UE belongs, and the access network device includes: a receiver, configured to receive a first query message sent by a SPC, where the first query message is used to query whether the access network device has configured a reference signal for the to-be-positioned UE; a processor, configured to determine that a reference signal has been configured for the to-be-positioned UE; and a transmitter, configured to send a first query response message to the SPC, where the first query response message includes information indicating that a reference signal has been configured.

With reference to the thirty-first aspect, in a first feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

A thirty-second aspect of the present invention provides a SPC, where the SPC includes: a receiver, configured to: receive a positioning request message sent by a positioning request device, where the positioning request message includes an identifier of to-be-positioned UE; and obtain a positioning measurement report, where the positioning measurement report includes a positioning measurement result parameter of the to-be-positioned UE; and a processor, configured to: obtain receiving status information of a positioning-used reference signal according to the identifier of the to-be-positioned UE; configure a transmission mode for the positioning-used reference signal according to the receiving status information of the positioning-used reference signal, so as to ensure receiving quality of the positioning-used reference signal; and position the to-be-positioned UE according to the positioning measurement result parameter of the to-be-positioned UE.

With reference to the thirty-second aspect, in a first feasible implementation, the SPC further includes: a transmitter, configured to: send a first report request message to at least one first access network device according to the identifier of the to-be-positioned UE, where the first report request message is used to instruct the at least one first access network device to report receiving status information of a positioning-used reference signal received by the at least one first access network device, and the first access network device is an access network device in a neighboring cell of a serving cell in which the to-be-positioned UE is located; or send a second report request message to a second access network device according to the identifier of the to-be-positioned UE, where the second report request message is used to instruct the second access network device to report receiving status information of a positioning-used reference signal received by the second access network device, and the second access network device is an access network device to which a server cell of the to-be-positioned UE belongs; or send a third report request message to the to-be-positioned UE according to the identifier of the to-be-positioned UE, where the third report request message is used to instruct the to-be-positioned UE to report receiving status information of a positioning-used reference signal received by the to-be-positioned UE; and the receiver is specifically configured to: receive a first report response message sent by the at least one first access network device, where the first report response message includes the receiving status information of the positioning-used reference signal received by the at least one first access network device; or receive a second report response message sent by the second access network device, where the second report response message includes the receiving status information of the positioning-used reference signal received by the second access network device; or receive a third report response message sent by the to-be-positioned UE, where the third report response message includes the receiving status information of the positioning-used reference signal received by the to-be-positioned UE.

With reference to the thirty-second aspect or the first feasible implementation of the thirty-second aspect, in a second feasible implementation, the receiving status information of the positioning-used reference signal received by the at least one first access network device includes a signal strength value of the positioning-used reference signal received by the at least one first access network device, and/or signal quality of the positioning-used reference signal received by the at least one first access network device; the receiving status information of the positioning-used reference signal received by the second access network device includes a signal strength value of the positioning-used reference signal received by the second access network device, and/or signal quality of the positioning-used reference signal received by the second access network device; and the receiving status information of the positioning-used reference signal received by the to-be-positioned UE includes a signal strength value of the positioning-used reference signal received by the to-be-positioned UE, and/or signal quality of the positioning-used reference signal received by the to-be-positioned UE.

With reference to the second feasible implementation of the thirty-second aspect, in a third feasible implementation, the processor is specifically configured to: compare a first interference threshold with the signal strength value of the positioning-used reference signal received by the at least one first access network device, where if the signal strength value of the positioning-used reference signal received by the at least one first access network device is less than or equal to the first interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the at least one first access network device; and/or compare a second interference threshold with the signal quality of the positioning-used reference signal received by the at least one first access network device, where if the signal quality of the positioning-used reference signal received by the at least one first access network device is less than or equal to the second interference threshold, the SPC sends the signal transmission mode indication message to the non-positioned UE, and the signal transmission mode indication message is used to instruct the non-positioned UE to restrict data service transmission when the SPC performs positioning processing of the UE.

With reference to the third feasible implementation of the thirty-second aspect, in a fourth feasible implementation, the processor is specifically configured to: compare a third interference threshold with the signal strength value of the positioning-used reference signal received by the second access network device, where if the signal strength value of the positioning-used reference signal received by the second access network device is less than or equal to the third interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the second access network device; and/or compare a fourth interference threshold with the signal quality of the positioning-used reference signal received by the second access network device, where if the signal quality of the positioning-used reference signal received by the second access network device is less than or equal to the fourth interference threshold, the SPC sends the signal transmission mode indication message to the non-positioned UE, and the signal transmission mode indication message is used to instruct the non-positioned UE to restrict data service transmission when the SPC performs positioning processing of the UE.

With reference to the second feasible implementation of the thirty-second aspect, in a fifth feasible implementation, the processor is specifically configured to: compare a fifth interference threshold with the signal strength value of the positioning-used reference signal received by the to-be-positioned UE, where if the signal strength value of the positioning-used reference signal received by the to-be-positioned UE is less than or equal to the fifth interference threshold, the SPC sends a signal transmission mode indication message to the at least one first access network device and/or the second access network device, and the signal transmission mode indication message is used to instruct the at least one first access network device and/or the second access network device to restrict data service transmission when the SPC performs positioning processing of the UE; and/or compare a sixth interference threshold with the signal quality of the positioning-used reference signal received by the to-be-positioned UE, where if the signal quality of the positioning-used reference signal received by the to-be-positioned UE is less than or equal to the sixth interference threshold, the SPC sends the signal transmission mode indication message to the at least one first access network device and/or the second access network device, and the signal transmission mode indication message is used to instruct the at least one first access network device and/or the second access network device to restrict data service transmission when the SPC performs positioning processing of the UE.

With reference to the thirty-second aspect or any one of the foregoing feasible implementations of the thirty-second aspect, in a sixth feasible implementation, the positioning request device is the to-be-positioned UE, an access network device, a core network device, or a 3rd party application server.

A thirty-third aspect of the present invention provides UE, where the UE includes: a receiver, configured to receive a configuration indication message sent by a SPC, where the configuration indication message is used to instruct the to-be-positioned UE to send a positioning-used uplink reference signal; and a transmitter, configured to send the positioning-used uplink reference signal according to the configuration indication message.

A thirty-fourth aspect of the present invention provides an access network device, where the access network device includes: a receiver, configured to: receive a positioning-used uplink reference signal sent by to-be-positioned UE; and obtain receiving status information of the positioning-used uplink reference signal; and a transmitter, configured to send a report response message to a SPC, where the report response message includes the receiving status information of the positioning-used uplink reference signal received by the access network device.

With reference to the thirty-fourth aspect, in a first feasible implementation, the receiver is further configured to: before the transmitter sends the report response message to the SPC, receive a report request message sent by the SPC, and the report request message is used to instruct the access network device to report the receiving status information of the positioning-used uplink reference signal received by the access network device.

With reference to the thirty-fourth aspect or the first feasible implementation of the thirty-fourth aspect, in a second feasible implementation, the receiving status information of the positioning-used uplink reference signal received by the access network device includes a signal strength value of the positioning-used uplink reference signal received by the access network device, and/or signal quality of the positioning-used uplink reference signal received by the access network device.

With reference to the thirty-fourth aspect or the first feasible implementation of the thirty-fourth aspect or the second feasible implementation of the thirty-fourth aspect, in a third feasible implementation, the access network device is a first access network device and/or a second access network device; the first access network device is an access network device to which a server cell of the to-be-positioned UE belongs; and the second access network device is an access network device to which the server cell of the to-be-positioned UE belongs.

A thirty-fifth aspect of the present invention provides UE, where the UE includes: a receiver, configured to: receive a first positioning-used downlink reference signal sent by at least one first access network device, where the first access network device is an access network device in a neighboring cell of a serving cell in which the to-be-positioned UE is located; and/or receive a second positioning-used downlink reference signal sent by a second access network device, where the second access network device is an access network device to which the server cell of the to-be-positioned UE belongs; a processor, configured to obtain receiving status information of the positioning-used downlink reference signal according to the first positioning-used downlink reference signal and/or the second positioning-used downlink reference signal; and a transmitter, configured to send a report response message to a SPC, where the third report response message includes the receiving status information of the positioning-used reference signal received by the to-be-positioned UE.

With reference to the thirty-fifth aspect, in a first feasible implementation, the receiver is further configured to: before the transmitter sends the report response message to the SPC, receive a report request message sent by the SPC, and the report request message is used to instruct the transmitter to report the receiving status information of the positioning-used downlink reference signal received by the UE.

With reference to the thirty-fifth aspect or the first feasible implementation of the thirty-fifth aspect, in a second feasible implementation, the receiving status information of the positioning-used reference signal received by the UE includes a signal strength value of the positioning-used downlink reference signal received by the UE, and/or signal quality of the positioning-used downlink reference signal received by the UE.

A thirty-sixth aspect of the present invention provides an access network device, where the access network device includes: a receiver, configured to: receive a configuration indication message sent by a SPC, where the configuration indication message is used to instruct to send a positioning-used downlink reference signal to to-be-positioned UE; and receive a signal transmission mode indication message sent by the SPC, where the signal transmission mode indication message is used to instruct the access network device to restrict data service transmission when the SPC performs positioning processing of the to-be-positioned UE; a transmitter, configured to send the positioning-used downlink reference signal to the to-be-positioned UE according to the configuration indication message; and a processor, configured to restrict, according to the signal transmission mode indication message, data service transmission when the SPC performs positioning processing of the to-be-positioned UE.

With reference to the thirty-sixth aspect, in a first feasible implementation, the access network device is a first access network device and/or a second access network device; and the first access network device is an access network device in a neighboring cell of a serving cell in which the to-be-positioned UE is located; and the second access network device is an access network device to which the server cell of the to-be-positioned UE belongs.

A thirty-seventh aspect of the present invention provides a positioning parameter coordination method, where the method includes: receiving, by a SPC, a positioning request message sent by a positioning request device, where the positioning request message includes an identifier of to-be-positioned UE; obtaining, by the SPC, capability information of the to-be-positioned UE according to the identifier of the UE, where the capability information of the to-be-positioned UE indicates radio standards supported by the UE; determining, by the SPC, at least one first access network device according to the capability information of the to-be-positioned UE, where the at least one first access network device is located in a neighboring cell of the to-be-positioned UE, and the at least one first access network device supports one of the radio standards supported by the to-be-positioned UE; performing, by the SPC, positioning configuration according to the at least one first access network device; obtaining, by the SPC, a positioning measurement report of the to-be-positioned UE, where the positioning measurement report includes a positioning measurement result parameter of the to-be-positioned UE; and positioning, by the SPC, the to-be-positioned UE according to a positioning parameter of the to-be-positioned UE.

With reference to the thirty-seventh aspect, in a first feasible implementation, the obtaining, by the SPC, capability information of the to-be-positioned UE according to the identifier of the to-be-positioned UE includes: sending, by the SPC, a first UE capability query message to a second access network device according to the identifier of the to-be-positioned UE, where the second access network device is an access network device to which a server cell of the to-be-positioned UE belongs; and receiving, by the SPC, a first UE capability query response message sent by the second access network device, where the first UE capability query response message includes the capability information of the to-be-positioned UE.

With reference to the thirty-seventh aspect, in a second feasible implementation, the obtaining, by the SPC, capability information of the to-be-positioned UE according to the identifier of the to-be-positioned UE includes: sending, by the SPC, a second UE capability query message to the to-be-positioned UE according to the identifier of the to-be-positioned UE; and receiving, by the SPC, a second UE capability query response message sent by the to-be-positioned UE, where the second UE capability query response message includes the capability information of the to-be-positioned UE.

With reference to the thirty-seventh aspect or the first feasible implementation of the thirty-seventh aspect or the second feasible implementation of the thirty-seventh aspect, in a third feasible implementation, the performing, by the SPC, positioning configuration according to the at least one first access network device includes: sending, by the SPC, a first query message to the at least one first access network device, where the first query message is used to query downlink positioning signal configuration information of the at least one first access network device; sending, by the SPC, a second query message to the second access network device, where the second query message is used to query downlink positioning signal configuration information of the second access network device; receiving, by the SPC, a first query response message sent by the at least one first access network device, where the first query response message includes the downlink positioning signal configuration information of the at least one first access network device; receiving, by the SPC, a second query response message sent by the second access network device, where the second query response message includes the downlink positioning signal configuration information of the second access network device; and sending, by the SPC, the downlink positioning signal configuration information of the at least one first access network device and the downlink positioning signal configuration information of the second access network device to the to-be-positioned UE.

With reference to the thirty-seventh aspect or the first feasible implementation of the thirty-seventh aspect or the second feasible implementation of the thirty-seventh aspect, in a fourth feasible implementation, the performing, by the SPC, positioning configuration according to the at least one first access network device includes: configuring, by the SPC, downlink positioning signal configuration information of the at least one first access network device; configuring, by the SPC, downlink positioning signal configuration information of the second access network device; and sending, by the SPC, the downlink positioning signal configuration information of the at least one first access network device and the downlink positioning signal configuration information of the second access network device to the to-be-positioned UE.

With reference to any one of the foregoing feasible implementations of the thirty-seventh aspect, in a fifth feasible implementation, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal; and the downlink positioning signal configuration information of the second access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to any one of the foregoing feasible implementations of the thirty-seventh aspect, in a sixth feasible implementation, the obtaining, by the SPC, a positioning measurement report of the to-be-positioned UE includes: receiving, by the SPC, the positioning measurement report sent by the to-be-positioned UE, where the positioning measurement report includes a positioning measurement result of downlink positioning reference signals based on multiple access networks.

With reference to the thirty-seventh aspect or the first feasible implementation of the thirty-seventh aspect or the second feasible implementation of the thirty-seventh aspect, in a seventh feasible implementation, before the performing, by the SPC, positioning configuration according to the at least one first access network device, the method includes: configuring, by the SPC by using the second access network device, that the to-be-positioned UE sends an uplink reference signal; the performing, by the SPC, positioning configuration according to the at least one first access network device includes: sending, by the SPC, uplink reference signal configuration information of the to-be-positioned UE to the at least one first access network device and the second access network device; and the obtaining, by the SPC, a positioning measurement report of the to-be-positioned UE according to the positioning configuration includes: receiving, by the SPC, positioning measurement reports of the to-be-positioned UE that are separately sent by the at least one first access network device and the second access network device.

With reference to the thirty-seventh aspect or any one of the foregoing feasible implementations of the thirty-seventh aspect, in an eighth feasible implementation, the positioning request device is the to-be-positioned UE, an access network device, a core network device, or a 3rd party application server.

A thirty-eighth aspect of the present invention provides a positioning parameter coordination method, where the method includes: receiving, by a second access network device, a UE capability query message sent by a SPC, where the UE capability query message includes an identifier of to-be-positioned UE and a capability query instruction, and the second access network device is an access network device to which a server cell of the to-be-positioned UE belongs; querying, by the second access network device, capability information of the to-be-positioned UE according to the identifier of the to-be-positioned UE and the capability query instruction, where the capability information of the to-be-positioned UE indicates radio standards supported by the to-be-positioned UE; and sending, by the second access network device, a UE capability query response message to the SPC, where the UE capability query response message includes the capability information of the to-be-positioned UE.

With reference to the thirty-eighth aspect, in a first feasible implementation, after the sending, by the second access network device, a UE capability query response message to the SPC, the method further includes: receiving, by the second access network device, uplink reference signal configuration information of the to-be-positioned UE that is sent by the SPC, where the uplink reference signal configuration information of the to-be-positioned UE is used to instruct the to-be-positioned UE to send an uplink reference signal; sending, by the second access network device, the uplink reference signal configuration information of the to-be-positioned UE to the to-be-positioned UE; measuring, by the second access network device, the uplink reference signal sent by the to-be-positioned UE; and sending, by the second access network device, a measurement report to the SPC, where the measurement report includes a measurement result of the uplink reference signal.

A thirty-ninth aspect of the present invention provides a positioning parameter coordination method, where the method includes: receiving, by a first access network device, a query message sent by a SPC, where the query message is used to query downlink positioning signal configuration information of the at least one first access network device, and the first access network device is located in a neighboring cell of to-be-positioned UE; and sending, by the first access network device, a query response message to the SPC, where the query response message includes the downlink positioning signal configuration information of the first access network device.

With reference to the thirty-ninth aspect, in a first feasible implementation, the downlink positioning signal configuration information of the access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

A fortieth aspect of the present invention provides a positioning parameter coordination method, where the method includes: receiving, by a first access network device, uplink reference signal configuration information of to-be-positioned UE that is sent by a SPC; measuring, by the first access network device, an uplink reference signal of the to-be-positioned UE according to the uplink reference signal configuration information of the to-be-positioned UE; and sending, by the first access network device, a measurement report to the SPC, where the measurement report includes a measurement result of the uplink reference signal of the to-be-positioned UE.

With reference to the fortieth aspect, in a first feasible implementation, the measurement result of the uplink reference signal of the to-be-positioned UE includes: information about a time of arrival of the uplink reference signal of the to-be-positioned UE, and/or about a time difference of arrival of the uplink reference signal of the to-be-positioned UE.

A forty-first aspect of the present invention provides a positioning parameter coordination method, where the method includes: receiving, by to-be-positioned UE, downlink positioning signal configuration information of at least one first access network device that is sent by a SPC, where the first access network device is located in a neighboring cell of the to-be-positioned UE; performing, by the to-be-positioned UE according to the downlink positioning signal configuration information of the at least one first access network device, positioning measurement of downlink positioning reference signals based on multiple access networks; and sending, by the to-be-positioned UE, a positioning measurement report to the SPC, where the positioning measurement report includes a positioning measurement result of the downlink positioning reference signals based on the multiple access networks.

With reference to the forty-first aspect, in a first feasible implementation, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the forty-first aspect or the first feasible implementation of the forty-first aspect, in a second feasible implementation, the positioning measurement result of the downlink positioning reference signals based on the multiple access networks includes: information about times of arrival of the downlink positioning reference signals based on the multiple access networks, and/or about a time difference of arrival of the downlink positioning reference signals based on the multiple access networks.

A forty-second aspect of the present invention provides a positioning parameter coordination method, where the method includes: receiving, by a SPC, a positioning request message sent by a positioning request device, where the positioning request message includes an identifier of to-be-positioned UE; determining, by the SPC, a second access network device of the to-be-positioned UE according to the identifier of the UE, where the second access network device is an access network device to which a server cell of the to-be-positioned UE belongs; selecting, by the SPC, at least one first access network device according to the second access network device, where the first access network device is an access network device in a neighboring cell of the serving cell in which the to-be-positioned UE is located; sending, by the SPC, positioning signal configuration information to the at least one first access network device; sending, by the SPC, the positioning signal configuration information to the to-be-positioned UE; receiving, by the SPC, a positioning measurement report sent by the to-be-positioned UE, where the positioning measurement report includes a positioning measurement result parameter of the to-be-positioned UE; and positioning, by the SPC, the to-be-positioned UE according to the positioning measurement result parameter of the to-be-positioned UE.

With reference to the forty-second aspect, in a first feasible implementation, the positioning signal configuration information includes any one or a combination of the following: a sending period of a downlink positioning signal, a scheduled sending time of a downlink positioning signal, a sending frequency channel number of a downlink positioning signal, and/or a sending sequence of a downlink positioning signal.

With reference to the forty-second aspect or the first feasible implementation of the forty-second aspect, in a second feasible implementation, the positioning request device is the to-be-positioned UE, an access network device, a core network device, or a 3rd party application server.

A forty-third aspect of the present invention provides a positioning parameter coordination method, where the method includes: receiving, by a first access network device, positioning signal configuration information sent by a SPC, where the first access network device is an access network device in a neighboring cell of a serving cell in which to-be-positioned UE is located; and sending, by the first access network device, a positioning signal according to the positioning signal configuration information.

With reference to the forty-third aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

With reference to the forty-third aspect or the first feasible implementation of the forty-third aspect, in a second feasible implementation, after the sending, by the first access network device, a positioning signal according to the positioning signal configuration information, the method further includes: sending, by the first access network device, a configuration response message to the SPC.

A forty-fourth aspect of the present invention provides a positioning parameter coordination method, where the method includes: receiving, by to-be-positioned UE, positioning signal configuration information sent by a SPC, where the positioning signal configuration information includes positioning signal configuration information sent by at least one first access network device; measuring, by the to-be-positioned UE according to the positioning signal configuration information, a positioning signal sent by the at least one first access network device, where the first access network device is an access network device in a neighboring cell of a serving cell in which the to-be-positioned UE is located; and sending, by the to-be-positioned UE, a positioning measurement report to the SPC, where the positioning measurement report includes a positioning measurement result parameter of the to-be-positioned UE.

With reference to the forty-fourth aspect, in a first feasible implementation, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

A forty-fifth aspect of the present invention provides a positioning parameter coordination method, where the method includes: receiving, by a SPC, a positioning request message sent by a positioning request device, where the positioning request message includes an identifier of to-be-positioned UE; determining, by the SPC, a second access network device of the to-be-positioned UE according to the identifier of the to-be-positioned UE, where the second access network device is an access network device to which a server cell of the to-be-positioned UE belongs; obtaining, by the SPC, a reference signal configuration status; if the reference signal configuration status includes information indicating that a reference signal has been configured, configuring, by the SPC, that the to-be-positioned UE performs positioning measurement based on the configured reference signal; receiving, by the SPC, a positioning measurement report sent by the to-be-positioned UE, where the positioning measurement report includes a positioning measurement result parameter of the UE; and positioning, by the SPC, the to-be-positioned UE according to the positioning measurement result parameter of the to-be-positioned UE.

With reference to the forty-fifth aspect, in a first feasible implementation, the obtaining, by the SPC, a reference signal configuration status includes: sending, by the SPC, a first query message to the second access network device, where the first query message is used to query whether the second access network device has configured a reference signal for the to-be-positioned UE; and receiving, by the SPC, a first query response message sent by the second access network device, where the first query response message includes the information indicating that a reference signal has been configured.

With reference to the forty-fifth aspect, in a second feasible implementation, the obtaining, by the SPC, a reference signal configuration status includes: sending, by the SPC, a second query message to the to-be-positioned UE, where the second query message is used to query whether a reference signal has been configured for the UE; and receiving, by the SPC, a second query response message sent by the to-be-positioned UE, where the second query response message includes the information indicating that a reference signal has been configured.

With reference to the forty-fifth aspect or the first feasible implementation of the forty-fifth aspect or the second feasible implementation of the forty-fifth aspect, in a third feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the forty-fifth aspect or the first feasible implementation of the forty-fifth aspect or the second feasible implementation of the forty-fifth aspect or the third feasible implementation of the forty-fifth aspect, in a fourth feasible implementation, the configuring, by the SPC, that the to-be-positioned UE performs positioning measurement based on the configured reference signal includes: sending, by the SPC, a positioning measurement trigger message to the to-be-positioned UE, where the positioning measurement trigger message includes configuration information of the configured reference signal and positioning measurement indication information; and the positioning measurement indication information is used to represent any one of the following positioning measurement methods: GNSS positioning, an OTDOA manner, enhanced cell ID positioning, or U-TDOA positioning, or fingerprint matching positioning.

With reference to the forty-fifth aspect or the first feasible implementation of the forty-fifth aspect or the second feasible implementation of the forty-fifth aspect or the third feasible implementation of the forty-fifth aspect, in a fifth feasible implementation, the positioning request device is the to-be-positioned UE, an access network device, a core network device, or a 3rd party application server.

A forty-sixth aspect of the present invention provides a positioning parameter coordination method, where the method includes: receiving, by to-be-positioned UE, a positioning measurement trigger message sent by a SPC, where the positioning measurement trigger message includes configuration information of a configured reference signal and positioning measurement indication information; performing, by the to-be-positioned UE, positioning measurement according to the configured reference signal; and sending, by the to-be-positioned UE, a positioning measurement report to the SPC, where the positioning measurement report includes a positioning parameter of the to-be-positioned UE.

With reference to the forty-sixth aspect, in a first feasible implementation, before the receiving, by to-be-positioned UE, a positioning measurement trigger message sent by a SPC, the method further includes: receiving, by the to-be-positioned UE, a second query message sent by the SPC, where the second query message is used to query whether a reference signal has been configured for the to-be-positioned UE; and sending a second query response message to the SPC when it is determined that a reference signal has been configured for the to-be-positioned UE, where the second query response message includes information indicating that a reference signal has been configured.

With reference to the forty-sixth aspect or the first feasible implementation of the forty-sixth aspect, in a second feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

With reference to the forty-sixth aspect or the first feasible implementation of the forty-sixth aspect or the second feasible implementation of the forty-sixth aspect, in a third feasible implementation, the positioning measurement indication information is used to represent any one of the following positioning measurement methods: GNSS positioning, an OTDOA manner, enhanced cell ID positioning, or U-TDOA positioning, or fingerprint matching positioning.

A forty-seventh aspect of the present invention provides a positioning parameter coordination method, where the method includes: receiving, by a second access network device, a first query message sent by a SPC, where the first query message is used to query whether the second access network device has configured a reference signal for to-be-positioned UE, and the second access network device is an access network device to which a server cell of the to-be-positioned UE belongs; and sending, by the second access network device, a first query response message to the SPC when it is determined that the second access network device has configured a reference signal for the to-be-positioned UE, where the first query response message includes information indicating that a reference signal has been configured.

With reference to the forty-seventh aspect, in a first feasible implementation, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

A forty-eighth aspect of the present invention provides a positioning parameter coordination method, where the method includes: receiving, by a SPC, a positioning request message sent by a positioning request device, where the positioning request message includes an identifier of to-be-positioned UE; obtaining, by the SPC, receiving status information of a positioning-used reference signal according to the identifier of the to-be-positioned UE; configuring, by the SPC, a transmission mode for the positioning-used reference signal according to the receiving status information of the positioning-used reference signal, so as to ensure receiving quality of the positioning-used reference signal; obtaining, by the SPC, a positioning measurement report, where the positioning measurement report includes a positioning measurement result parameter of the to-be-positioned UE; and positioning, by the SPC, the to-be-positioned UE according to the positioning measurement result parameter of the to-be-positioned UE.

With reference to the forty-eighth aspect, in a first feasible implementation, the obtaining, by the SPC, receiving status information of a positioning-used reference signal according to the identifier of the UE includes: sending, by the SPC, a first report request message to at least one first access network device according to the identifier of the to-be-positioned UE, where the first report request message is used to instruct the at least one first access network device to report receiving status information of a positioning-used reference signal received by the at least one first access network device, and the first access network device is an access network device in a neighboring cell of a serving cell in which the to-be-positioned UE is located; or sending, by the SPC, a second report request message to a second access network device according to the identifier of the to-be-positioned UE, where the second report request message is used to instruct the second access network device to report receiving status information of a positioning-used reference signal received by the second access network device, and the second access network device is an access network device to which a server cell of the to-be-positioned UE belongs; or sending, by the SPC, a third report request message to the to-be-positioned UE according to the identifier of the to-be-positioned UE, where the third report request message is used to instruct the to-be-positioned UE to report receiving status information of a positioning-used reference signal received by the to-be-positioned UE; and the obtaining, by the SPC, a positioning measurement report includes: receiving, by the SPC, a first report response message sent by the at least one first access network device, where the first report response message includes the receiving status information of the positioning-used reference signal received by the at least one first access network device; or receiving, by the SPC, a second report response message sent by the second access network device, where the second report response message includes the receiving status information of the positioning-used reference signal received by the second access network device; or receiving, by the SPC, a third report response message sent by the to-be-positioned UE, where the third report response message includes the receiving status information of the positioning-used reference signal received by the to-be-positioned UE.

With reference to the forty-eighth aspect or the first feasible implementation of the forty-eighth aspect, in a second feasible implementation, the receiving status information of the positioning-used reference signal received by the at least one first access network device includes a signal strength value of the positioning-used reference signal received by the at least one first access network device, and/or signal quality of the positioning-used reference signal received by the at least one first access network device; the receiving status information of the positioning-used reference signal received by the second access network device includes a signal strength value of the positioning-used reference signal received by the second access network device, and/or signal quality of the positioning-used reference signal received by the second access network device; and the receiving status information of the positioning-used reference signal received by the to-be-positioned UE includes a signal strength value of the positioning-used reference signal received by the to-be-positioned UE, and/or signal quality of the positioning-used reference signal received by the to-be-positioned UE.

With reference to the second feasible implementation of the forty-eighth aspect, in a third feasible implementation, the configuring, by the SPC, a transmission mode for the positioning-used reference signal according to the receiving status information of the positioning-used reference signal includes: comparing, by the SPC, a first interference threshold with the signal strength value of the positioning-used reference signal received by the at least one first access network device, and if the signal strength value of the positioning-used reference signal received by the at least one first access network device is less than or equal to the first interference threshold, sending, by the SPC, a signal transmission mode indication message to non-positioned UE, where the signal transmission mode indication message is used to instruct the non-positioned UE to restrict data service transmission when the SPC performs positioning processing of the UE, and there is a service transmitted between the non-positioned UE and the at least one first access network device; and/or comparing, by the SPC, a second interference threshold with the signal quality of the positioning-used reference signal received by the at least one first access network device, and if the signal quality of the positioning-used reference signal received by the at least one first access network device is less than or equal to the second interference threshold, sending, by the SPC, the signal transmission mode indication message to the non-positioned UE, where the signal transmission mode indication message is used to instruct the non-positioned UE to restrict data service transmission when the SPC performs positioning processing of the UE.

With reference to the third feasible implementation of the forty-eighth aspect, in a fourth feasible implementation, the configuring, by the SPC, a transmission mode for the positioning-used reference signal according to the receiving status information of the positioning-used reference signal includes: comparing, by the SPC, a third interference threshold with the signal strength value of the positioning-used reference signal received by the second access network device, and if the signal strength value of the positioning-used reference signal received by the second access network device is less than or equal to the third interference threshold, sending, by the SPC, a signal transmission mode indication message to non-positioned UE, where the signal transmission mode indication message is used to instruct the non-positioned UE to restrict data service transmission when the SPC performs positioning processing of the UE, and there is a service transmitted between the non-positioned UE and the second access network device; and/or comparing, by the SPC, a fourth interference threshold with the signal quality of the positioning-used reference signal received by the second access network device, and if the signal quality of the positioning-used reference signal received by the second access network device is less than or equal to the fourth interference threshold, sending, by the SPC, the signal transmission mode indication message to the non-positioned UE, where the signal transmission mode indication message is used to instruct the non-positioned UE to restrict data service transmission when the SPC performs positioning processing of the UE.

With reference to the second feasible implementation of the forty-eighth aspect, in a fifth feasible implementation, the configuring, by the SPC, a transmission mode for the positioning-used reference signal according to the receiving status information of the positioning-used reference signal includes: comparing, by the SPC, a fifth interference threshold with the signal strength value of the positioning-used reference signal received by the to-be-positioned UE, and if the signal strength value of the positioning-used reference signal received by the to-be-positioned UE is less than or equal to the fifth interference threshold, sending, by the SPC, a signal transmission mode indication message to the at least one first access network device and/or the second access network device, where the signal transmission mode indication message is used to instruct the at least one first access network device and/or the second access network device to restrict data service transmission when the SPC performs positioning processing of the UE; and/or comparing, by the SPC, a sixth interference threshold with the signal quality of the positioning-used reference signal received by the to-be-positioned UE, and if the signal quality of the positioning-used reference signal received by the to-be-positioned UE is less than or equal to the sixth interference threshold, send-ing, by the SPC, the signal transmission mode indication message to the at least one first access network device and/or the second access network device, where the signal transmission mode indication message is used to instruct the at least one first access network device and/or the second access network device to restrict data service transmission when the SPC performs positioning processing of the UE.

With reference to the forty-eighth aspect or any one of the foregoing feasible implementations of the forty-eighth aspect, in a sixth feasible implementation, the positioning request device is the to-be-positioned UE, an access network device, a core network device, or a 3rd party application server.

A forty-ninth aspect of the present invention provides a positioning parameter coordination method, where the method includes: receiving, by to-be-positioned UE, a configuration indication message sent by a, where the configuration indication message is used to instruct the to-be-positioned UE to send a positioning-used uplink reference signal; and sending, by the to-be-positioned UE, the positioning-used uplink reference signal according to the configuration indication message.

A fiftieth aspect of the present invention provides a positioning parameter coordination method, where the method includes: receiving, by an access network device, a positioning-used uplink reference signal sent by to-be-positioned UE; obtaining, by the access network device, receiving status information of the positioning-used uplink reference signal; and sending, by the access network device, a report response message to a SPC, where the report response message includes the receiving status information of the positioning-used uplink reference signal received by the access network device.

With reference to the fiftieth aspect, in a first feasible implementation, before the sending, by the access network device, a report response message to a SPC, the method further includes: receiving, by the access network device, a report request message sent by the SPC, where the report request message is used to instruct the access network device to report the receiving status information of the positioning-used uplink reference signal received by the access network device.

With reference to the fiftieth aspect or the first feasible implementation of the fiftieth aspect, in a second feasible implementation, the receiving status information of the positioning-used uplink reference signal received by the access network device includes a signal strength value of the positioning-used uplink reference signal received by the access network device, and/or signal quality of the positioning-used uplink reference signal received by the access network device.

With reference to the fiftieth aspect or the first feasible implementation of the fiftieth aspect or the second feasible implementation of the fiftieth aspect, in a third feasible implementation, the access network device is a first access network device and/or a second access network device; the first access network device is an access network device to which a server cell of the to-be-positioned UE belongs; and the second access network device is an access network device to which the server cell of the to-be-positioned UE belongs.

A fifty-first aspect of the present invention provides a positioning parameter coordination method, where the method includes: receiving, by to-be-positioned UE, a first positioning-used downlink reference signal sent by at least one first access network device, where the first access network device is an access network device in a neighboring cell of a serving cell in which the to-be-positioned UE is located; and/or receiving, by the to-be-positioned UE, a second positioning-used downlink reference signal sent by a second access network device, where the second access network device is an access network device to which the server cell of the to-be-positioned UE belongs; obtaining, by the to-be-positioned UE, receiving status information of the positioning-used downlink reference signal according to the first positioning-used downlink reference signal and/or the second positioning-used downlink reference signal; and sending, by the to-be-positioned UE, a report response message to a SPC, where the third report response message includes the receiving status information of the positioning-used reference signal received by the to-be-positioned UE.

With reference to the fifty-first aspect, in a first feasible implementation, before the sending, by the to-be-positioned UE, a report response message to a SPC, the method further includes: receiving, by the to-be-positioned UE, a report request message sent by the SPC, where the report request message is used to instruct the to-be-positioned UE to report the receiving status information of the positioning-used downlink reference signal received by the to-be-positioned UE.

With reference to the fifty-first aspect or the first feasible implementation of the fifty-first aspect, in a second feasible implementation, the receiving status information of the positioning-used reference signal received by the to-be-positioned UE includes a signal strength value of the positioning-used downlink reference signal received by the to-be-positioned UE, and/or signal quality of the positioning-used downlink reference signal received by the to-be-positioned UE.

A fifty-second aspect of the present invention provides a positioning parameter coordination method, where the method includes: receiving, by an access network device, a configuration indication message sent by a SPC, where the configuration indication message is used to instruct the access network device to send a positioning-used downlink reference signal to to-be-positioned UE; sending, by the access network device, the positioning-used downlink reference signal to the to-be-positioned UE according to the configuration indication message; receiving, by the access network device, a signal transmission mode indication message sent by the SPC, where the signal transmission mode indication message is used to instruct the access network device to restrict data service transmission when the SPC performs positioning processing of the to-be-positioned UE; and restricting, by the access network device according to the signal transmission mode indication message, data service transmission when the SPC performs positioning processing of the to-be-positioned UE.

With reference to the fifty-second aspect, in a first feasible implementation, the access network device is a first access network device and/or a second access network device; and the first access network device is an access network device in a neighboring cell of a serving cell in which the to-be-positioned UE is located; and the second access network device is an access network device to which the server cell of the to-be-positioned UE belongs.

According to the positioning parameter coordination apparatus, system, and method that are provided in the present invention, an SPC receives a positioning request message sent by a positioning request device, and the positioning request message includes an identifier of to-be-positioned UE. The SPC obtains capability information of the to-be-positioned UE according to the identifier of the UE, and the capability information of the to-be-positioned UE indicates radio standards supported by the UE. The SPC determines at least one first access network device according to the capability information of the to-be-positioned UE, the at least one first access network device is located in a neighboring cell of the to-be-positioned UE, and the at least one first access network device supports one of the radio standards supported by the to-be-positioned UE. The SPC performs positioning configuration according to the at least one first access network device. The SPC obtains a positioning measurement report of the to-be-positioned UE, and the positioning measurement report includes a positioning measurement result parameter of the to-be-positioned UE. The SPC positions the to-be-positioned UE according to the positioning parameter of the to-be-positioned UE. In this way, the SPC can select multiple access network devices that support the radio standards supported by the UE to coordinately implement a multi-RAT positioning operation, that is, when a base station to which the to-be-positioned UE belongs deploys another cell, the SPC can position the to-be-positioned UE in coordination with an access network device (such as the first access network device) in the another cell, so as to improve positioning accuracy of the UE.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present embodiments.

In a network architecture provided in the prior art, an evolved serving mobile location center (E-SMLC) is located on a core network side, and a gateway mobile location center (GMLC for short) is also a device on a core network side. The E-SMLC and the GMLC need to deal with various positioning requests, invoke a radio network capability according to precision required by the request to obtain positioning information, and complete operation of a positioning service. The operation of the positioning service includes functions such as user data management, service data management, subscription information management, and authentication and charging of a value-added application. A basic positioning procedure is as follows.

Step 11. The GMLC receives a positioning request.

Step 12. The GMLC finds a mobile management entity (MME) to which a terminal currently belongs.

Step 13. The GMLC sends a request of positioning to-be-positioned UE to the MME.

Step 14. The MME sends a positioning request to the E-SMLC.

Step 15. The E-SMLC and the terminal perform capability interaction and perform measurement configuration. The E-SMLC also interacts with a base station, and obtains positioning signal configuration information on a base station side.

Step 16. The E-SMLC obtains a positioning measurement result reported by the terminal (and the base station), and performs positioning calculation, to obtain a position of the terminal.

Step 17. The E-SMLC reports the position of the terminal back to the MME.

Step 18. The MME feeds the position of the terminal back to the GMLC.

Step 19. The GMLC feeds the position of the terminal back to a source end that requests positioning.

However, in the foregoing positioning procedure, a large quantity of interactions are included on the core network side, and therefore, an extremely large delay is introduced. In addition, because the E-SMLC is incapable of configuring transmission of a positioning reference signal, multiple interactions are required in the positioning process, and a large amount of signaling is introduced. Furthermore, in the foregoing procedure, interactions within long term evolution (LTE) only are considered, and a positioning manner in which a terminal in the LTE performs inter-radio access technology (RAT) measurement and reporting is not considered. Improvement is required in these aspects.

Figure 1:
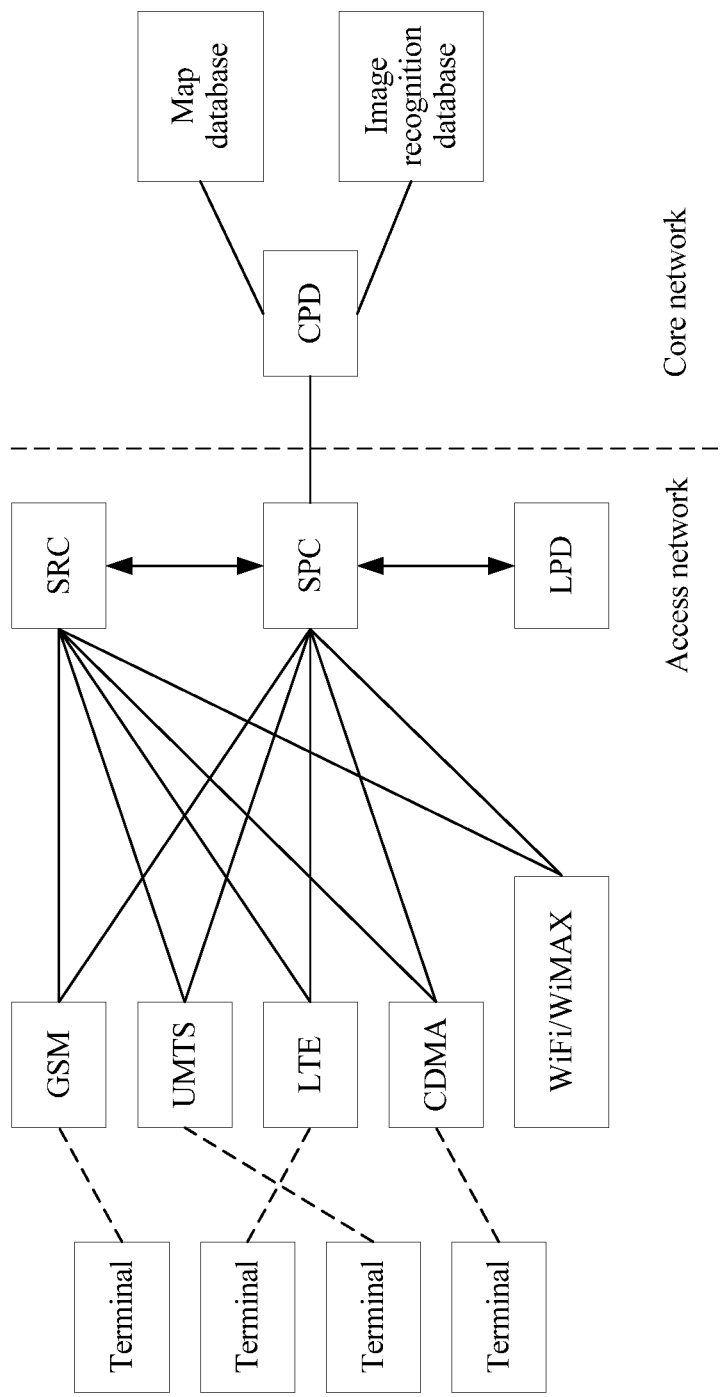
FIG. 1 is a schematic diagram of a network architecture according to an embodiment of the present invention.

A new node and two databases are introduced in the present invention based on a new network architecture. FIG. 1 is a schematic diagram of a network architecture according to an embodiment of the present invention. Referring to FIG. 1, there is (1) the new node: a single positioning controller (SPC for short), (2) a local positioning database (LPD for short), and (3) a cloud positioning database (CPD for short).

Functions of the SPC are as follows.

Positioning-signal designing and configuration: Configuration of multi-RAT positioning reference signals is compatible, and configuration of a positioning reference signal (PRS for short), configuration of a CSI-RS (Channel State Information-Reference Signal), and the like may be included.

Positioning measurement configuration and resource allocation: Positioning measurement may be configured according to a positioning requirement, and network resources are configured for the positioning measurement. For example, a reference signal physical resource is configured.

Position calculation: Positioning calculation is performed according to different positioning solutions. For example, a positioning result obtained according to a time of arrival is combined with a positioning result obtained according to a fingerprint matching algorithm, so as to obtain a final positioning result.

Track prediction: The SPC maintains prediction and storage of tracks of a currently positioned terminal, and interacts with a positioning database, to obtain related information of user behavior and habit.

Hybrid positioning for multiple radio access types (RAT for short) and multiple networks: The SPC is compatible with positioning solutions for multiple RATs and multiple non-third generation partnership project (3GPP) standards, for example, LTE, Universal Mobile Telecommunications System (UMTS for short), Code Division Multiple Access (CDMA for short) 2000, Global System for Mobile Communications (GSM for short), Bluetooth, WiFi, ZigBee standard, and Worldwide Interoperability for Microwave Access (WiMAX for short). Supported positioning solutions include: Assisted Global Navigation Satellite System (A-GNSS), an observed time difference of arrival (OTDOA for short) positioning method, an uplink-time difference of arrival (Uplink UTDOA for short) positioning method, exclusive chip ID (ECID for short), an adaptive positioning manner in a neural network, beacon positioning, and the like.

Functions of the LPD are as follows.

The short-time positioning database may be used for positioning calculation in the SPC, and may modify a positioning result according to a motion track, a GIS, and speed information. After obtaining the positioning result, the SPC may also output the positioning result to maintain the short-time database.

Functions of the CPD are as follows.

The long-time positioning database may be used for collecting statistics on user behavior and habit and service popularity, and for big data analysis. The database is also used as an outgoing port for SPC positioning information.

It may be learned that, as a positioning unit, the SPC is capable of position calculation, and has a direct interface with a single RAN controller (SRC for short). An interface also exists between the SRC and the LPD.

With reference to specific embodiments, the following describes functions of an SPC, to-be-positioned user equipment (UE), and access network devices (an access network device in a neighboring cell of the to-be-positioned UE and an access network device to which a server cell of the to-be-positioned UE belongs) in different interaction scenarios. It needs to be noted that in the following description, a first access network device is always short for an access network device in a neighboring cell of a serving cell in which the to-be-positioned UE is located or for a serving base station, and a second access network device is always short for an access network device to which the server cell of the to-be-positioned UE belongs or for a neighboring base station.

Figure 2:
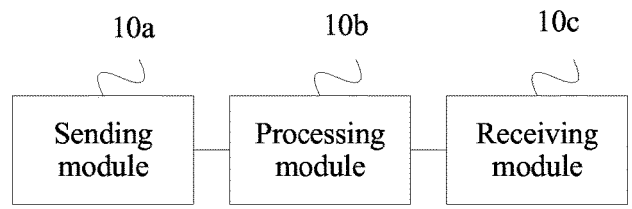
FIG. 2 is a schematic structural diagram of a general-purpose network node according to an embodiment of the present invention.

FIG. 2 is a schematic structural diagram of a general-purpose network node according to an embodiment of the present invention. The general-purpose network node includes: a sending module 10a, a processing module 10b, and a receiving module 10c.

The foregoing SPC, the to-be-positioned UE, and the access network device (the first access network device or the second access network device) may all use the structure shown in FIG. 2.

It needs to be noted that the sending module 10a, the processing module 10b, and the receiving module 10c in the structure shown in FIG. 2 may have different functions in different application scenarios. In some scenarios, a node may use only some functions of some of the modules in the structure shown in FIG. 2.

Referring to FIG. 2, the following describes functions of the SPC, the to-be-positioned UE, and the access network device in different interaction scenarios.

In scenario one, for a manner in which an SPC and a base station (or an access point) coordinately perform a multi-RAT positioning operation, the embodiments of the present invention provide a positioning parameter coordination method. With reference to specific embodiments, functions of the SPC and other nodes are described below when the present embodiments are applied to the multi-RAT positioning operation.

Referring to FIG. 2, the SPC has the following functions: a receiving module 10c, configured to: receive a positioning request message sent by a positioning request device, where the positioning request message includes an identifier of to-be-positioned UE; and obtain a positioning measurement report of the to-be-positioned UE, where the positioning measurement report includes a positioning measurement result parameter of the to-be-positioned UE; and a processing module 10b, configured to: obtain capability information of the to-be-positioned UE according to the identifier of the UE, where the capability information of the to-be-positioned UE indicates radio standards supported by the UE; determine at least one first access network device according to the capability information of the to-be-positioned UE, where the at least one first access network device is located in a neighboring cell of the to-be-positioned UE, and the at least one first access network device supports one of the radio standards supported by the to-be-positioned UE; perform positioning configuration according to the at least one first access network device; and position the to-be-positioned UE according to a positioning parameter of the to-be-positioned UE.

According to the SPC provided in this embodiment of the present invention, a receiving module receives a positioning request message sent by a positioning request device, and the positioning request message includes an identifier of to-be-positioned UE. The receiving module obtains capability information of the to-be-positioned UE according to the identifier of the UE, and the capability information of the to-be-positioned UE indicates radio standards supported by the UE. A processing module determines at least one first access network device according to the capability information of the to-be-positioned UE, the at least one first access network device is located in a neighboring cell of the to-be-positioned UE, and the at least one first access network device supports one of the radio standards supported by the to-be-positioned UE. The processing module performs positioning configuration according to the at least one first access network device. The receiving module obtains a positioning measurement report of the to-be-positioned UE, and the positioning measurement report includes a positioning measurement result parameter of the to-be-positioned UE. The processing module positions the to-be-positioned UE according to the positioning parameter of the to-be-positioned UE. In this way, the SPC can select multiple access network devices that support the radio standards supported by the UE to coordinately implement a multi-RAT positioning operation, that is, when a base station to which the to-be-positioned UE belongs deploys another cell, the SPC can position the to-be-positioned UE in coordination with an access network device (such as the first access network device) in the another cell, so as to improve positioning accuracy of the UE.

Referring to FIG. 2, the SPC further has the following function: a sending module 10a, configured to send a first UE capability query message to a second access network device according to the identifier of the to-be-positioned UE, where the second access network device is an access network device to which a server cell of the to-be-positioned UE belongs.

The receiving module 10c is further configured to receive a first UE capability query response message sent by the second access network device, and the first UE capability query response message includes the capability information of the to-be-positioned UE.

Alternatively, the sending module 10a is configured to send a second UE capability query message to the to-be-positioned UE according to the identifier of the to-be-positioned UE.

The receiving module 10c is further configured to receive a second UE capability query response message sent by the to-be-positioned UE, and the second UE capability query response message includes the capability information of the to-be-positioned UE.

Optionally, the sending module 10a is further configured to: send a first query message to the at least one first access network device, where the first query message is used to query downlink positioning signal configuration information of the at least one first access network device; send a second query message to the second access network device, where the second query message is used to query downlink positioning signal configuration information of the second access network device; and send the downlink positioning signal configuration information of the at least one first access network device and the downlink positioning signal configuration information of the second access network device to the to-be-positioned UE.

The receiving module 10c is further configured to: receive a first query response message sent by the at least one first access network device, where the first query response message includes the downlink positioning signal configuration information of the at least one first access network device; and receive a second query response message sent by the second access network device, where the second query response message includes the downlink positioning signal configuration information of the second access network device.

Alternatively, the processing module 10b is specifically configured to: configure downlink positioning signal configuration information of the at least one first access network device; and configure downlink positioning signal configuration information of the second access network device.

The sending module 10a is further configured to send the downlink positioning signal configuration information of the at least one first access network device and the downlink positioning signal configuration information of the second access network device to the to-be-positioned UE.

Optionally, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

The downlink positioning signal configuration information of the second access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

Optionally, the receiving module 10c is further configured to receive the positioning measurement report sent by the to-be-positioned UE, and the positioning measurement report includes a positioning measurement result of downlink positioning reference signals based on multiple access networks.

Optionally, the processing module 10b is further configured to: before performing positioning configuration according to the at least one first access network device, use the second access network device to configure that the to-be-positioned UE sends an uplink reference signal.

The sending module 10a is further configured to send uplink reference signal configuration information of the to-be-positioned UE to the at least one first access network device and the second access network device.

The receiving module 10c is further configured to receive positioning measurement reports of the to-be-positioned UE that are separately sent by the at least one first access network device and the second access network device.

Optionally, the positioning request device is the to-be-positioned UE, an access network device, a core network device, or a 3rd party application server.

Accordingly, when the access network device is an access network device to which a server cell of the to-be-positioned UE belongs, referring to FIG. 2, modules of the access network device have the following functions: a receiving module 10c, configured to receive a UE capability query message sent by a single positioning controller (SPC), where the UE capability query message includes an identifier of the to-be-positioned UE and a capability query instruction; a processing module 10b, configured to query capability information of the to-be-positioned UE according to the identifier of the to-be-positioned UE and the capability query instruction, where the capability information of the to-be-positioned UE indicates radio standards supported by the to-be-positioned UE; and a sending module 10a, configured to send a UE capability query response message to the SPC, where the UE capability query response message includes the capability information of the to-be-positioned UE.

According to the access network device provided in this embodiment of the present invention, a receiving module receives a UE capability query message sent by a SPC, and the UE capability query message includes an identifier of to-be-positioned UE and a capability query instruction. A processing module queries capability information of the to-be-positioned UE according to the identifier of the to-be-positioned UE and the capability query instruction, and the capability information of the to-be-positioned UE indicates radio standards supported by the to-be-positioned UE. A sending module sends a UE capability query response message to the SPC, and the UE capability query response message includes the capability information of the to-be-positioned UE. In this way, the SPC can select multiple access network devices that support the radio standards supported by the UE to coordinately implement a multi-RAT positioning operation, that is, when a base station to which the to-be-positioned UE belongs deploys another cell, the second access network device assists the SPC in positioning the to-be-positioned UE in coordination with an access network device (such as a first access network device) in the another cell, so as to improve positioning accuracy of the UE.

Optionally, the receiving module 10c is further configured to: after the sending module boa sends the UE capability query response message to the SPC, receive uplink reference signal configuration information of the to-be-positioned UE that is sent by the SPC, and the uplink reference signal configuration information of the to-be-positioned UE is used to instruct the to-be-positioned UE to send an uplink reference signal.

The sending module boa is further configured to: send the uplink reference signal configuration information of the to-be-positioned UE to the to-be-positioned UE; and send a measurement report to the SPC, where the measurement report includes a measurement result of the uplink reference signal.

The processing module 10b is further configured to measure the uplink reference signal sent by the to-be-positioned UE.

Accordingly, in scenario one, an access network device in a neighboring cell of the to-be-positioned UE may also be used.

Accordingly, in scenario one, when the access network device is located in the neighboring cell of the to-be-positioned UE, referring to FIG. 2, modules of the access network device have the following functions: a receiving module 10c, configured to receive a query message sent by a SPC, where the query message is used to query downlink positioning signal configuration information of the at least one first access network device; and a sending module 10a, configured to send a query response message to the SPC, where the query response message includes the downlink positioning signal configuration information of the first access network device.

According to the positioning parameter coordination method provided in this embodiment of the present invention, a first access network device receives a query message sent by a SPC, the query message is used to query downlink positioning signal configuration information of the at least one first access network device, and the first access network device is located in a neighboring cell of to-be-positioned UE. The first access network device sends a query response message to the SPC, and the query response message includes the downlink positioning signal configuration information of the first access network device. In this way, the SPC can select multiple access network devices that support radio standards supported by the UE to coordinately perform a multi-RAT positioning operation, so as to improve positioning accuracy of the UE.

Optionally, the downlink positioning signal configuration information of the access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

Accordingly, in scenario one, when the access network device is located in the neighboring cell of the to-be-positioned UE and performs an uplink positioning solution, referring to FIG. 2, modules of the access network device have the following functions: a receiving module 10c, configured to receive uplink reference signal configuration information of to-be-positioned UE that is sent by a SPC; a processing module 10b, configured to measure an uplink reference signal of the to-be-positioned UE according to the uplink reference signal configuration information of the to-be-positioned UE; and a sending module 10a, configured to send a measurement report to the SPC, where the measurement report includes a measurement result of the uplink reference signal of the to-be-positioned UE.

According to the access network device provided in this embodiment of the present invention, a receiving module receives uplink reference signal configuration information of to-be-positioned UE that is sent by a SPC. A processing module measures an uplink reference signal of the to-be-positioned UE according to the uplink reference signal configuration information of the to-be-positioned UE. A sending module sends a measurement report to the SPC, and the measurement report includes a measurement result of the uplink reference signal of the to-be-positioned UE. In this way, the SPC can select multiple access network devices that support radio standards supported by the UE to coordinately perform a multi-RAT positioning operation, that is, when a base station to which the to-be-positioned UE belongs deploys another cell, an access network device (such as a first access network device) in the another cell can perform positioning processing of the to-be-positioned UE according to configuration of the SPC, so as to improve positioning accuracy of the UE.

Optionally, the measurement result of the uplink reference signal of the to-be-positioned UE includes: information about a time of arrival of the uplink reference signal of the to-be-positioned UE, and/or about a time difference of arrival of the uplink reference signal of the to-be-positioned UE.

Accordingly, in scenario one, when the to-be-positioned UE performs the downlink positioning solution, referring to FIG. 2, modules of the to-be-positioned UE have the following functions: a receiving module 10c, configured to receive downlink positioning signal configuration information of at least one first access network device that is sent by a SPC, where the first access network device is located in a neighboring cell of the to-be-positioned UE; a processing module 10b, configured to: according to the downlink positioning signal configuration information of the at least one first access network device, perform positioning measurement of downlink positioning reference signals based on multiple access networks; and a sending module 10a, configured to send a positioning measurement report to the SPC, where the positioning measurement report includes a positioning measurement result of the downlink positioning reference signals based on the multiple access networks.

According to the UE provided in this embodiment of the present invention, a receiving module receives downlink positioning signal configuration information of at least one first access network device that is sent by a SPC, and the first access network device is located in a neighboring cell of the to-be-positioned UE. A processing module performs, according to the downlink positioning signal configuration information of the at least one first access network device, positioning measurement of downlink positioning reference signals based on multiple access networks. A sending module sends a positioning measurement report to the SPC, and the positioning measurement report includes a positioning measurement result of the downlink positioning reference signals based on the multiple access networks. In this way, the SPC can support multiple access network devices that support radio standards supported by the UE to coordinately perform a multi-RAT positioning operation, so as to improve positioning accuracy of the UE.

Optionally, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

Optionally, the positioning measurement result of the downlink positioning reference signals based on the multiple access networks includes: information about times of arrival of the downlink positioning reference signals based on the multiple access networks, and/or about a time difference of arrival of the downlink positioning reference signals based on the multiple access networks.

Accordingly, in scenario one, when the to-be-positioned UE performs the uplink positioning solution, referring to FIG. 2, modules of the to-be-positioned UE have the following functions: a receiving module 10c, configured to receive uplink reference signal configuration information of the to-be-positioned UE that is sent by a second access network device, where the second access network device is an access network device to which a server cell of the to-be-positioned UE belongs; and a sending module boa, configured to send an uplink reference signal according to the uplink reference signal configuration information.

According to the UE provided in this embodiment of the present invention, a receiving module receives uplink reference signal configuration information of the to-be-positioned UE that is sent by a second access network device, and the second access network device is an access network device to which a server cell of the to-be-positioned UE belongs. A sending module sends an uplink reference signal according to the uplink reference signal configuration information. In this way, the SPC can select multiple access network devices that support radio standards supported by the UE to coordinately perform a multi-RAT positioning operation, so as to improve positioning accuracy of the UE.

In scenario two, for a manner in which an SPC and a base station (or an access point) coordinately control use of positioning resources, or in which an SPC and a base station (or an access point) coordinately configure a positioning signal, referring to FIG. 2, functions of the SPC, to-be-positioned UE, and access network devices (a first access network device and a second access network device) in scenario two are separately described below.

Referring to FIG. 2, the SPC has the following functions: a receiving module 10c, configured to: receive a positioning request message sent by a positioning request device, where the positioning request message includes an identifier of to-be-positioned UE; and receive a positioning measurement report sent by the to-be-positioned UE, where the positioning measurement report includes a positioning measurement result parameter of the to-be-positioned UE; a processing module 10b, configured to: determine a second access network device of the to-be-positioned UE according to the identifier of the UE, where the second access network device is an access network device to which a server cell of the to-be-positioned UE belongs; select at least one first access network device according to the second access network device, where the first access network device is an access network device in a neighboring cell of the serving cell in which the to-be-positioned UE is located; and position the to-be-positioned UE according to the positioning measurement result parameter of the to-be-positioned UE; and a sending module 10a, configured to: send positioning signal configuration information to the at least one first access network device; and send the positioning signal configuration information to the to-be-positioned UE.

According to the SPC provided in this embodiment of the present invention, a receiving module receives a positioning request message sent by a positioning request device, and the positioning request message includes an identifier of to-be-positioned UE. A processing module determines a second access network device of the to-be-positioned UE according to the identifier of the UE, and the second access network device is an access network device to which a server cell of the to-be-positioned UE belongs. The processing module selects at least one first access network device according to the second access network device, and the first access network device is an access network device in a neighboring cell of the serving cell in which the to-be-positioned UE is located. A sending module sends positioning signal configuration information to the at least one first access network device. The sending module sends the positioning signal configuration information to the to-be-positioned UE. The receiving module receives a positioning measurement report sent by the to-be-positioned UE, and the positioning measurement report includes a positioning measurement result parameter of the to-be-positioned UE. The processing module positions the to-be-positioned UE according to the positioning measurement result parameter of the to-be-positioned UE. In this way, the SPC can select an access network device in a neighboring cell of the UE to coordinately perform positioning, so as to ensure maximum utilization of resources and improve positioning accuracy of the UE.

Optionally, the positioning signal configuration information includes any one or a combination of the following: a sending period of a downlink positioning signal, a scheduled sending time of a downlink positioning signal, a sending frequency channel number of a downlink positioning signal, and/or a sending sequence of a downlink positioning signal.

Optionally, the positioning request device is the to-be-positioned UE, an access network device, a core network device, or a 3rd party application server.

Accordingly, in scenario two, when the access network device is an access network device in a neighboring cell of a serving cell in which the to-be-positioned UE is located, referring to FIG. 2, modules of the access network device have the following functions: a receiving module 10c, configured to receive positioning signal configuration information sent by a SPC; and a sending module 10a, configured to send a positioning signal according to the positioning signal configuration information.

According to the access network device provided in this embodiment of the present invention, a receiving module receives positioning signal configuration information sent by a SPC, and the first access network device is an access network device in a neighboring cell of a serving cell in which to-be-positioned UE is located. A sending module sends a positioning signal according to the positioning signal configuration information. In this way, the SPC can select an access network device (that is, the first access network device) in a neighboring cell of the UE to coordinately perform positioning, so as to ensure maximum utilization of resources and improve positioning accuracy of the UE.

Optionally, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

Optionally, the sending module boa is further configured to: after sending the positioning signal according to the positioning signal configuration information, send a configuration response message to the SPC.

Accordingly, in scenario two, referring to FIG. 2, modules of the to-be-positioned UE have the following functions: a receiving module 10c, configured to receive positioning signal configuration information sent by a SPC, where the positioning signal configuration information includes positioning signal configuration information sent by at least one first access network device, and the first access network device is an access network device in a neighboring cell of a serving cell in which the to-be-positioned UE is located; a processing module 10b, configured to measure, according to the positioning signal configuration information, a positioning signal sent by the at least one first access network device; and a sending module 10a, configured to send a positioning measurement report to the SPC, where the positioning measurement report includes a positioning measurement result parameter of the to-be-positioned UE.

According to the UE provided in this embodiment of the present invention, a receiving module receives positioning signal configuration information sent by a SPC, the positioning signal configuration information includes positioning signal configuration information sent by at least one first access network device, and the first access network device is an access network device in a neighboring cell of a serving cell in which the to-be-positioned UE is located. A processing module measures, according to the positioning signal configuration information, a positioning signal sent by the at least one first access network device, and the first access network device is an access network device in a neighboring cell of a serving cell in which the to-be-positioned UE is located. A sending module sends a positioning measurement report to the SPC, and the positioning measurement report includes a positioning measurement result parameter of the to-be-positioned UE. In this way, the SPC can select an access network device in a neighboring cell of the UE to coordinately perform positioning, so as to ensure maximum utilization of resources and improve positioning accuracy of the UE.

Optionally, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

In scenario three in which an SPC and a base station (or an access point) coordinately reuse an existing reference signal to perform positioning, referring to FIG. 2, functions of the SPC, to-be-positioned UE, and access network devices (a first access network device and a second access network device) in scenario three are separately described below.

Referring to FIG. 2, the SPC has the following functions: a receiving module 10c, configured to: receive a positioning request message sent by a positioning request device, where the positioning request message includes an identifier of to-be-positioned UE; and obtain a reference signal configuration status; and receive a positioning measurement report sent by the to-be-positioned UE, where the positioning measurement report includes a positioning measurement result parameter of the UE; and a processing module 10b, configured to: determine a second access network device of the to-be-positioned UE according to the identifier of the to-be-positioned UE, where the second access network device is an access network device to which a server cell of the to-be-positioned UE belongs; if the reference signal configuration status includes information indicating that a reference signal has been configured, configure that the to-be-positioned UE performs positioning measurement based on the configured reference signal; and position the to-be-positioned UE according to the positioning measurement result parameter of the to-be-positioned UE.

According to the SPC provided in this embodiment of the present invention, a receiving module receives a positioning request message sent by a positioning request device, and the positioning request message includes an identifier of to-be-positioned UE. A processing module determines a second access network device of the to-be-positioned UE according to the identifier of the to-be-positioned UE, and the second access network device is an access network device to which a server cell of the to-be-positioned UE belongs. The receiving module obtains a reference signal configuration status. If the reference signal configuration status includes information indicating that a reference signal has been configured, the processing module configures that the to-be-positioned UE performs positioning measurement based on the configured reference signal. The receiving module receives a positioning measurement report sent by the to-be-positioned UE, and the positioning measurement report includes a positioning measurement result parameter of the UE. The processing module positions the to-be-positioned UE according to the positioning measurement result parameter of the to-be-positioned UE. In this way, the SPC can use the existing reference signal to position the UE, unnecessary network overheads are reduced, network resource utilization is improved, and positioning accuracy of the UE is ensured.

Optionally, the sending module 10a is further configured to send a first query message to the second access network device, and the first query message is used to query whether the second access network device has configured a reference signal for the to-be-positioned UE.

The receiving module 10c is further configured to receive a first query response message sent by the second access network device, and the first query response message includes the information indicating that a reference signal has been configured.

Optionally, the sending module 10a is further configured to send a second query message to the to-be-positioned UE, and the second query message is used to query whether a reference signal has been configured for the UE.

The receiving module 10c is further configured to receive a second query response message sent by the to-be-positioned UE, and the second query response message includes the information indicating that a reference signal has been configured.

Optionally, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

Further, the sending module 10a is further configured to send a positioning measurement trigger message to the to-be-positioned UE, and the positioning measurement trigger message includes configuration information of the configured reference signal and positioning measurement indication information.

The positioning measurement indication information is used to represent any one of the following positioning measurement methods: global navigation satellite system (GNSS) positioning, an observed time difference of arrival (OTDOA) manner, enhanced cell identifier (ID) positioning, or uplink-time difference of arrival (U-TDOA) positioning, or fingerprint matching positioning.

Optionally, the positioning request device is the to-be-positioned UE, an access network device, a core network device, or a 3rd party application server.

Accordingly, in scenario three, referring to FIG. 2, modules of the to-be-positioned UE have the following functions: a receiving module 10c, configured to receive a positioning measurement trigger message sent by a SPC, where the positioning measurement trigger message includes configuration information of a configured reference signal and positioning measurement indication information; a processing module 10b, configured to perform positioning measurement according to the configured reference signal; and a sending module 10a, configured to send a positioning measurement report to the SPC, where the positioning measurement report includes a positioning parameter of the to-be-positioned UE.

According to the UE provided in this embodiment of the present invention, a receiving module receives a positioning measurement trigger message sent by a SPC, and the positioning measurement trigger message includes configuration information of a configured reference signal and positioning measurement indication information. A processing module performs positioning measurement according to the configured reference signal, and the positioning measurement is measuring a time of arrival and/or an angle of arrival and/or a time difference of arrival of the configured reference signal. A sending module sends a positioning measurement report to the SPC, and the positioning measurement report includes a positioning parameter of the to-be-positioned UE. In this way, the SPC can use the existing reference signal to position the UE, unnecessary network overheads are reduced, network resource utilization is improved, and positioning accuracy of the UE is ensured.

Optionally, the receiving module 10c is further configured to: before receiving the positioning measurement trigger message sent by the SPC, receive a second query message sent by the SPC, and the second query message is used to query whether a reference signal has been configured for the to-be-positioned UE.

The processing module 10b is further configured to determine that a reference signal has been configured.

The sending module boa is further configured to send a second query response message to the SPC, and the second query response message includes information indicating that a reference signal has been configured.

Optionally, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

Optionally, the positioning measurement indication information is used to represent any one of the following positioning measurement methods: GNSS positioning, an OTDOA manner, enhanced cell ID positioning, or U-TDOA positioning, or fingerprint matching positioning.

Accordingly, in scenario three, referring to FIG. 2, when the access network device is an access network device to which a server cell of the to-be-positioned UE belongs, modules of the access network device have the following functions: a receiving module 10c, configured to receive a first query message sent by a SPC, where the first query message is used to query whether the access network device has configured a reference signal for the to-be-positioned UE; a processing module 10b, configured to determine that a reference signal has been configured for the to-be-positioned UE; and a sending module 10a, configured to send a first query response message to the SPC, where the first query response message includes information indicating that a reference signal has been configured.

According to the access network device provided in this embodiment of the present invention, a receiving module receives a first query message sent by a SPC, and the first query message is used to query whether the second access network device has configured a reference signal for to-be-positioned UE, and the second access network device is an access network device to which a server cell of the to-be-positioned UE belongs. A processing module determines that a reference signal has been configured for the to-be-positioned UE. A sending module sends a first query response message to the SPC, and the query response message includes information indicating that a reference signal has been configured. In this way, the SPC can use the existing reference signal to position the UE, unnecessary network overheads are reduced, network resource utilization is improved, and positioning accuracy of the UE is ensured.

Optionally, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

In scenario four, for a manner in which an SPC and a base station (or an access point) coordinately cancel interference in a positioning signal, referring to FIG. 2, functions of the SPC, to-be-positioned UE, and access network devices (a first access network device and a second access network device) in scenario four are separately described below.

Referring to FIG. 2, the SPC has the following functions: a receiving module 10c, configured to: receive a positioning request message sent by a positioning request device, where the positioning request message includes an identifier of to-be-positioned UE; and obtain a positioning measurement report, where the positioning measurement report includes a positioning measurement result parameter of the to-be-positioned UE; and a processing module 10b, configured to: obtain receiving status information of a positioning-used reference signal according to the identifier of the to-be-positioned UE; configure a transmission mode for the positioning-used reference signal according to the receiving status information of the positioning-used reference signal, so as to ensure receiving quality of the positioning-used reference signal; and position the to-be-positioned UE according to the positioning measurement result parameter of the to-be-positioned UE.

According to the SPC provided in this embodiment of the present invention, a receiving module receives a positioning request message sent by a positioning request device, and the positioning request message includes an identifier of to-be-positioned UE. A processing module obtains receiving status information of a positioning-used reference signal according to the identifier of the to-be-positioned UE. The processing module configures a transmission mode for the positioning-used reference signal according to the receiving status information of the positioning-used reference signal, so as to ensure receiving quality of the positioning-used reference signal. A first access network device is an access network device in a neighboring cell of a serving cell in which the to-be-positioned UE is located, and a second access network device is an access network device to which the server cell of the to-be-positioned UE belongs. The receiving module obtains a positioning measurement report, and the positioning measurement report includes a positioning measurement result parameter of the to-be-positioned UE. The processing module positions the to-be-positioned UE according to the positioning measurement result parameter of the to-be-positioned UE. In this way, when positioning the UE, the SPC configures the transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, a sending module 10a is configured to: send a first report request message to at least one first access network device according to the identifier of the to-be-positioned UE, where the first report request message is used to instruct the at least one first access network device to report receiving status information of a positioning-used reference signal received by the at least one first access network device, and the first access network device is an access network device in a neighboring cell of a serving cell in which the to-be-positioned UE is located; or send a second report request message to a second access network device according to the identifier of the to-be-positioned UE, where the second report request message is used to instruct the second access network device to report receiving status information of a positioning-used reference signal received by the second access network device, and the second access network device is an access network device to which a server cell of the to-be-positioned UE belongs; or send a third report request message to the to-be-positioned UE according to the identifier of the to-be-positioned UE, where the third report request message is used to instruct the to-be-positioned UE to report receiving status information of a positioning-used reference signal received by the to-be-positioned UE.

The receiving module 10c is specifically configured to: receive a first report response message sent by the at least one first access network device, where the first report response message includes the receiving status information of the positioning-used reference signal received by the at least one first access network device; or receive a second report response message sent by the second access network device, where the second report response message includes the receiving status information of the positioning-used reference signal received by the second access network device; or receive a third report response message sent by the to-be-positioned UE, where the third report response message includes the receiving status information of the positioning-used reference signal received by the to-be-positioned UE.

Optionally, the receiving status information of the positioning-used reference signal received by the at least one first access network device includes a signal strength value of the positioning-used reference signal received by the at least one first access network device, and/or signal quality of the positioning-used reference signal received by the at least one first access network device.

The receiving status information of the positioning-used reference signal received by the second access network device includes a signal strength value of the positioning-used reference signal received by the second access network device, and/or signal quality of the positioning-used reference signal received by the second access network device.

The receiving status information of the positioning-used reference signal received by the to-be-positioned UE includes a signal strength value of the positioning-used reference signal received by the to-be-positioned UE, and/or signal quality of the positioning-used reference signal received by the to-be-positioned UE.

Optionally, the processing module 10b is specifically configured to: compare a first interference threshold with the signal strength value of the positioning-used reference signal received by the at least one first access network device, where if the signal strength value of the positioning-used reference signal received by the at least one first access network device is less than or equal to the first interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the at least one first access network device; and/or compare a second interference threshold with the signal quality of the positioning-used reference signal received by the at least one first access network device, where if the signal quality of the positioning-used reference signal received by the at least one first access network device is less than or equal to the second interference threshold, the SPC sends the signal transmission mode indication message to the non-positioned UE, and the signal transmission mode indication message is used to instruct the non-positioned UE to restrict data service transmission when the SPC performs positioning processing of the UE.

Optionally, the processing module 10b is specifically configured to: compare a third interference threshold with the signal strength value of the positioning-used reference signal received by the second access network device, where if the signal strength value of the positioning-used reference signal received by the second access network device is less than or equal to the third interference threshold, the SPC sends a signal transmission mode indication message to non-positioned UE, the signal transmission mode indication message is used to instruct the non-positioned UE to restrict data service transmission when the SPC performs positioning processing of the UE, and there is a service transmitted between the non-positioned UE and the second access network device; and/or compare a fourth interference threshold with the signal quality of the positioning-used reference signal received by the second access network device, where if the signal quality of the positioning-used reference signal received by the second access network device is less than or equal to the fourth interference threshold, the SPC sends the signal transmission mode indication message to the non-positioned UE, and the signal transmission mode indication message is used to instruct the non-positioned UE to restrict data service transmission when the SPC performs positioning processing of the UE.

Optionally, the processing module 10b is specifically configured to: compare a fifth interference threshold with the signal strength value of the positioning-used reference signal received by the to-be-positioned UE, where if the signal strength value of the positioning-used reference signal received by the to-be-positioned UE is less than or equal to the fifth interference threshold, the SPC sends a signal transmission mode indication message to the at least one first access network device and/or the second access network device, and the signal transmission mode indication message is used to instruct the at least one first access network device and/or the second access network device to restrict data service transmission when the SPC performs positioning processing of the UE; and/or compare a sixth interference threshold with the signal quality of the positioning-used reference signal received by the to-be-positioned UE, where if the signal quality of the positioning-used reference signal received by the to-be-positioned UE is less than or equal to the sixth interference threshold, the SPC sends the signal transmission mode indication message to the at least one first access network device and/or the second access network device, and the signal transmission mode indication message is used to instruct the at least one first access network device and/or the second access network device to restrict data service transmission when the SPC performs positioning processing of the UE.

Optionally, the positioning request device is the to-be-positioned UE, an access network device, a core network device, or a 3rd party application server.

Accordingly, in scenario four, referring to FIG. 2, modules of the to-be-positioned UE have the following functions: a receiving module 10c, configured to receive a configuration indication message sent by a SPC, where the configuration indication message is used to instruct the to-be-positioned UE to send a positioning-used uplink reference signal; and a sending module 10a, configured to send the positioning-used uplink reference signal according to the configuration indication message.

According to the UE provided in this embodiment of the present invention, a receiving module receives a configuration indication message sent by a SPC, and the configuration indication message is used to instruct the to-be-positioned UE to send a positioning-used uplink reference signal. A sending module sends the positioning-used uplink reference signal according to the configuration indication message. In this way, when positioning the UE, the SPC configures a transmission mode of the positioning-used reference signal according to receiving status information of the positioning-used reference signal, so as to ensure receiving quality of the positioning-used reference signal, avoid interference in positioning the UE from other service data transmission, and improve positioning accuracy of the UE.

Accordingly, in scenario four, referring to FIG. 2, modules of the access network device have the following functions: a receiving module 10c, configured to: receive a positioning-used uplink reference signal sent by to-be-positioned UE; and obtain receiving status information of the positioning-used uplink reference signal; and a sending module 10a, configured to send a report response message to a SPC, where the report response message includes the receiving status information of the positioning-used uplink reference signal received by the access network device.

According to the access network device provided in this embodiment of the present invention, a receiving module receives a positioning-used uplink reference signal sent by to-be-positioned UE. The receiving module obtains receiving status information of the positioning-used uplink reference signal. A sending module sends a report response message to a SPC, and the report response message includes the receiving status information of the positioning-used uplink reference signal received by the access network device. In this way, when positioning the UE, the SPC configures a transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, the receiving module 10c is further configured to: before the sending module 10a sends the report response message to the SPC, receive a report request message sent by the SPC, and the report request message is used to instruct the access network device to report the receiving status information of the positioning-used uplink reference signal received by the access network device.

Optionally, the receiving status information of the positioning-used uplink reference signal received by the access network device includes a signal strength value of the positioning-used uplink reference signal received by the access network device, and/or signal quality of the positioning-used uplink reference signal received by the access network device.

Optionally, the access network device is a first access network device and/or a second access network device.

The first access network device is an access network device to which a server cell of the to-be-positioned UE belongs.

The second access network device is an access network device to which the server cell of the to-be-positioned UE belongs.

Accordingly, in scenario four, referring to FIG. 2, when the to-be-positioned UE performs a downlink solution, modules of the to-be-positioned UE have the following functions: a receiving module 10c, configured to: receive a first positioning-used downlink reference signal sent by at least one first access network device, where the first access network device is an access network device in a neighboring cell of a serving cell in which the to-be-positioned UE is located; and/or receive a second positioning-used downlink reference signal sent by a second access network device, where the second access network device is an access network device to which the server cell of the to-be-positioned UE belongs; a processing module 10b, configured to obtain receiving status information of the positioning-used downlink reference signal according to the first positioning-used downlink reference signal and/or the second positioning-used downlink reference signal; and a sending module 10a, configured to send a report response message to a SPC, where the third report response message includes the receiving status information of the positioning-used reference signal received by the to-be-positioned UE.

According to the UE provided in this embodiment of the present invention, a receiving module receives a first positioning-used downlink reference signal sent by at least one first access network device, where the first access network device is an access network device in a neighboring cell of a serving cell in which the to-be-positioned UE is located; and/or the receiving module receives a second positioning-used downlink reference signal sent by a second access network device, where the second access network device is an access network device to which the server cell of the to-be-positioned UE belongs. A processing module obtains receiving status information of the positioning-used downlink reference signal according to the first positioning-used downlink reference signal and/or the second positioning-used downlink reference signal. A sending module sends a report response message to a SPC, and the third report response message includes the receiving status information of the positioning-used reference signal received by the to-be-positioned UE. In this way, when positioning the UE, the SPC configures a transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, the receiving module 10c is further configured to: before the sending module boa sends the report response message to the SPC, receive a report request message sent by the SPC, and the report request message is used to instruct the sending module 10a to report the receiving status information of the positioning-used downlink reference signal received by the UE.

Optionally, the receiving status information of the positioning-used reference signal received by the UE includes a signal strength value of the positioning-used downlink reference signal received by the UE, and/or signal quality of the positioning-used downlink reference signal received by the UE.

Accordingly, in scenario four, referring to FIG. 2, when the access network device performs a downlink solution, modules of the access network device have the following functions: a receiving module 10c, configured to: receive a configuration indication message sent by a SPC, where the configuration indication message is used to instruct to send a positioning-used downlink reference signal to to-be-positioned UE; and receive a signal transmission mode indication message sent by the SPC, where the signal transmission mode indication message is used to instruct the access network device to restrict data service transmission when the SPC performs positioning processing of the to-be-positioned UE; a sending module 10a, configured to send the positioning-used downlink reference signal to the to-be-positioned UE according to the configuration indication message; and a processing module 10b, configured to restrict, according to the signal transmission mode indication message, data service transmission when the SPC performs positioning processing of the to-be-positioned UE.

According to the access network device provided in this embodiment of the present invention, a receiving module receives a configuration indication message sent by a SPC, and the configuration indication message is used to instruct the access network device to send a positioning-used downlink reference signal to to-be-positioned UE. A sending module sends the positioning-used downlink reference signal to the to-be-positioned UE according to the configuration indication message. The receiving module receives a signal transmission mode indication message sent by the SPC, and the signal transmission mode indication message is used to instruct the access network device to restrict data service transmission when the SPC performs positioning processing of the to-be-positioned UE. A processing module restricts, according to the signal transmission mode indication message, data service transmission when the SPC performs positioning processing of the to-be-positioned UE. In this way, when positioning the UE, the SPC configures a transmission mode of the positioning-used reference signal according to receiving status information of the positioning-used reference signal, so as to ensure receiving quality of the positioning-used reference signal, avoid interference in positioning the UE from other service data transmission, and improve positioning accuracy of the UE.

Optionally, the access network device is a first access network device and/or a second access network device.

The first access network device is an access network device in a neighboring cell of a serving cell in which the to-be-positioned UE is located. The second access network device is an access network device to which the server cell of the to-be-positioned UE belongs.

Figure 3:
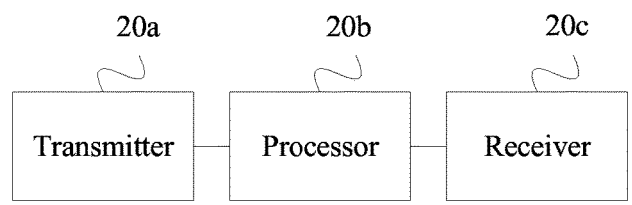
FIG. 3 is a schematic structural diagram of another general-purpose network node according to an embodiment of the present invention.

FIG. 3 is a schematic structural diagram of another general-purpose network node according to an embodiment of the present invention. The general-purpose network node includes: a transmitter 20a, a processor 20b, and a receiver 20c.

The transmitter 20a has the foregoing functions of the sending module 10a shown in FIG. 2, the processor 20b has the foregoing functions of the processing module 10b shown in FIG. 2, and the receiver 20c has the foregoing functions of the receiving module 10c shown in FIG. 2.

The general-purpose network node shown in FIG. 3 can implement technical effects of the foregoing embodiments corresponding to FIG. 2.

Figure 4:
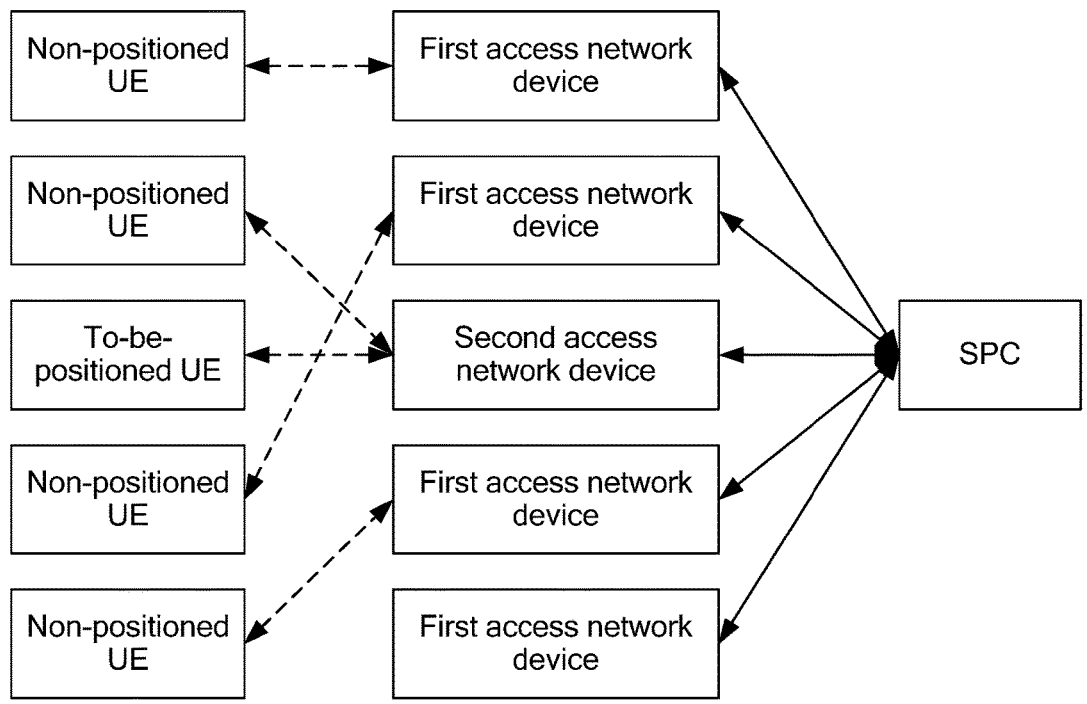
FIG. 4 is a schematic structural diagram of a general-purpose network node and a schematic deployment diagram of a positioning parameter coordination system according to an embodiment of the present invention.

FIG. 4 is a schematic structural diagram of a general-purpose network node and a schematic deployment diagram of a positioning parameter coordination system according to an embodiment of the present invention. Referring to FIG. 4, the system includes: an SPC, four first access network devices, a second access network device, and to-be-positioned UE. Optionally, in some scenarios, at least one non-positioned UE may be further included, for example, four non-positioned UEs shown in FIG. 4.

The SPC can implement functions and technical effects in the foregoing corresponding embodiments. The first access network device can implement functions and technical effects in the foregoing corresponding embodiments. The second access network device can implement functions and technical effects in the foregoing corresponding embodiments. The to-be-positioned UE can implement functions and technical effects in the foregoing corresponding embodiments.

With reference to specific embodiments, procedures of the SPC in different interaction scenarios are described below. It needs to be noted that in the following description, the first access network device is short for an access network device in a neighboring cell of a serving cell in which the to-be-positioned UE is located or for a serving base station, and the second access network device is short for an access network device to which the server cell of the to-be-positioned UE belongs or for a neighboring base station.

In scenario one, for a manner in which an SPC and a base station (or an access point) coordinately perform a multi-RAT positioning operation, the embodiments of the present invention provide a positioning parameter coordination method. With reference to specific embodiments, interactions between the SPC and other nodes are described below when the present embodiments are applied to the multi-RAT positioning operation.

Figure 5:
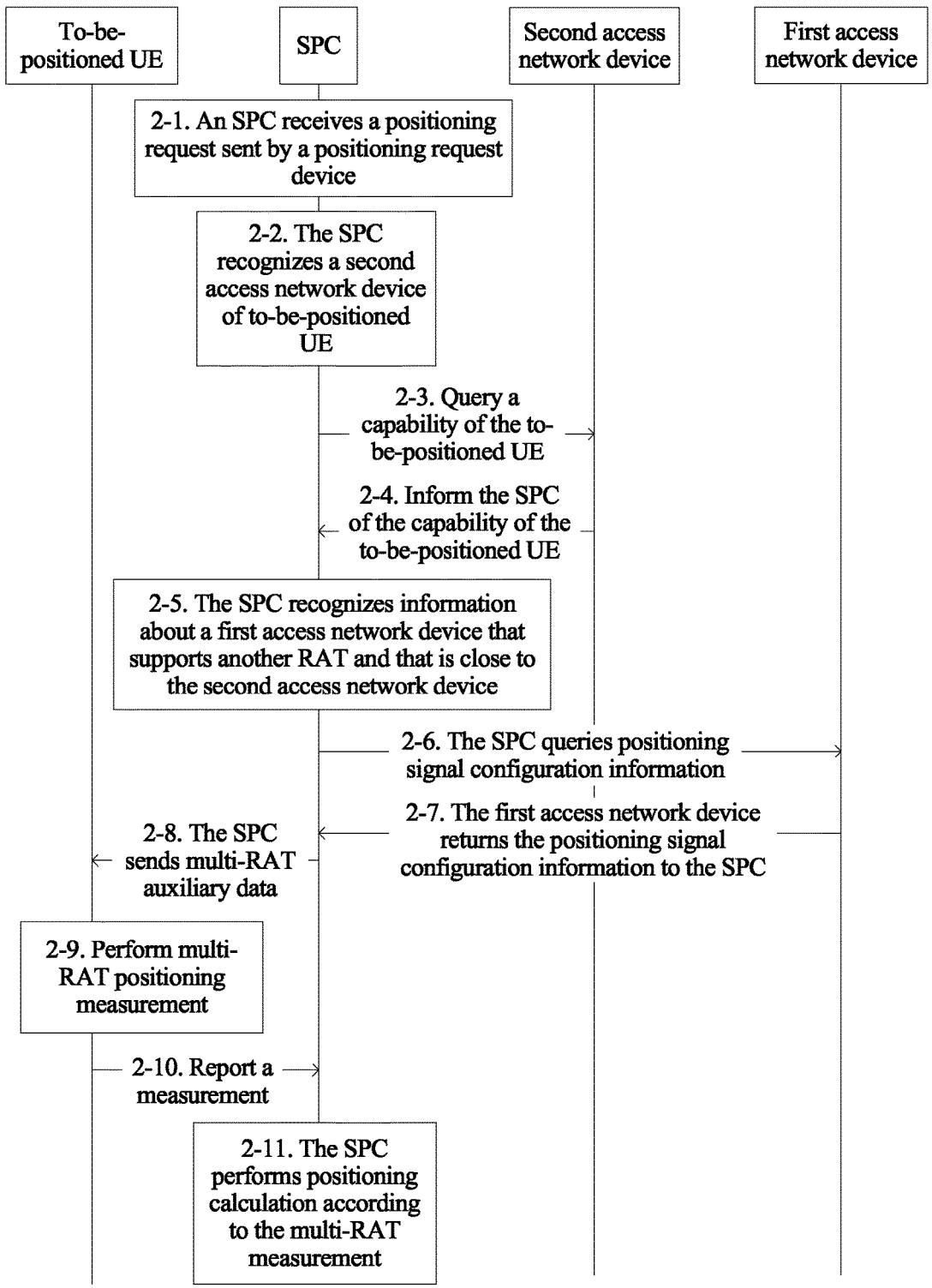
FIG. 5 is a schematic interaction diagram of a positioning parameter coordination method according to an embodiment of the present invention.

FIG. 5 is a schematic interaction diagram of a positioning parameter coordination method according to an embodiment of the present invention. The method is corresponding to the foregoing downlink positioning solution. Referring to FIG. 5, the interaction includes the following steps.

Step 2-1. An SPC receives a positioning request sent by a positioning request device.

The positioning request may be from a third party entity, to-be-positioned UE, an access network device, or the like.

Step 2-2. The SPC recognizes a second access network device of to-be-positioned UE.

Step 2-3. The SPC queries a capability of the to-be-positioned UE.

Specifically, the SPC queries the second access network device about the capability of the to-be-positioned UE, and the capability of the to-be-positioned UE includes radio standards supported by the terminal.

Step 2-4. The second access network device informs the SPC of the capability of the to-be-positioned UE.

Step 2-5. The SPC recognizes information about a first access network device that supports another RAT and that is close to the second access network device.

Specifically, the SPC recognizes a radio base station and an access point that are surrounding or close to the to-be-positioned UE and that can be used for positioning the to-be-positioned UE.

Step 2-6. The SPC queries positioning signal configuration information.

Specifically, the SPC queries the first access network device in a neighboring cell about positioning signal configuration information of the first access network device. It needs to be noted herein that, because the SPC has obtained the information about the different radio standards supported by the to-be-positioned UE, the SPC in step 6 queries only a neighboring-cell base station or access point that supports one of the radio standards supported by the terminal. The positioning signal configuration information includes related information of sending a downlink positioning signal, for example, a sending period, a scheduled sending time, a sending sequence, or a sending frequency channel number.

In addition, alternatively, the SPC in step 6 may proactively configure a downlink positioning signal for the first access network device, and the query step is replaced.

Step 2-7. The first access network device returns the positioning signal configuration information to the SPC.

Specifically, if the SPC in step 6 proactively configures the downlink signal, a configuration response action is performed in step 7.

Step 2-8. After obtaining the positioning signal configuration information of the first access network device, the SPC sends, to the to-be-positioned UE, the positioning signal configuration information that serves as multi-RAT auxiliary data.

Step 2-9. The to-be-positioned UE performs multi-RAT positioning measurement.

Step 2-10. The to-be-positioned UE reports, to the SPC, a measurement obtained in step 9.

Step 2-11. The SPC performs positioning calculation according to a RAT positioning measurement result, to obtain a position of the to-be-positioned UE.

Figure 6:
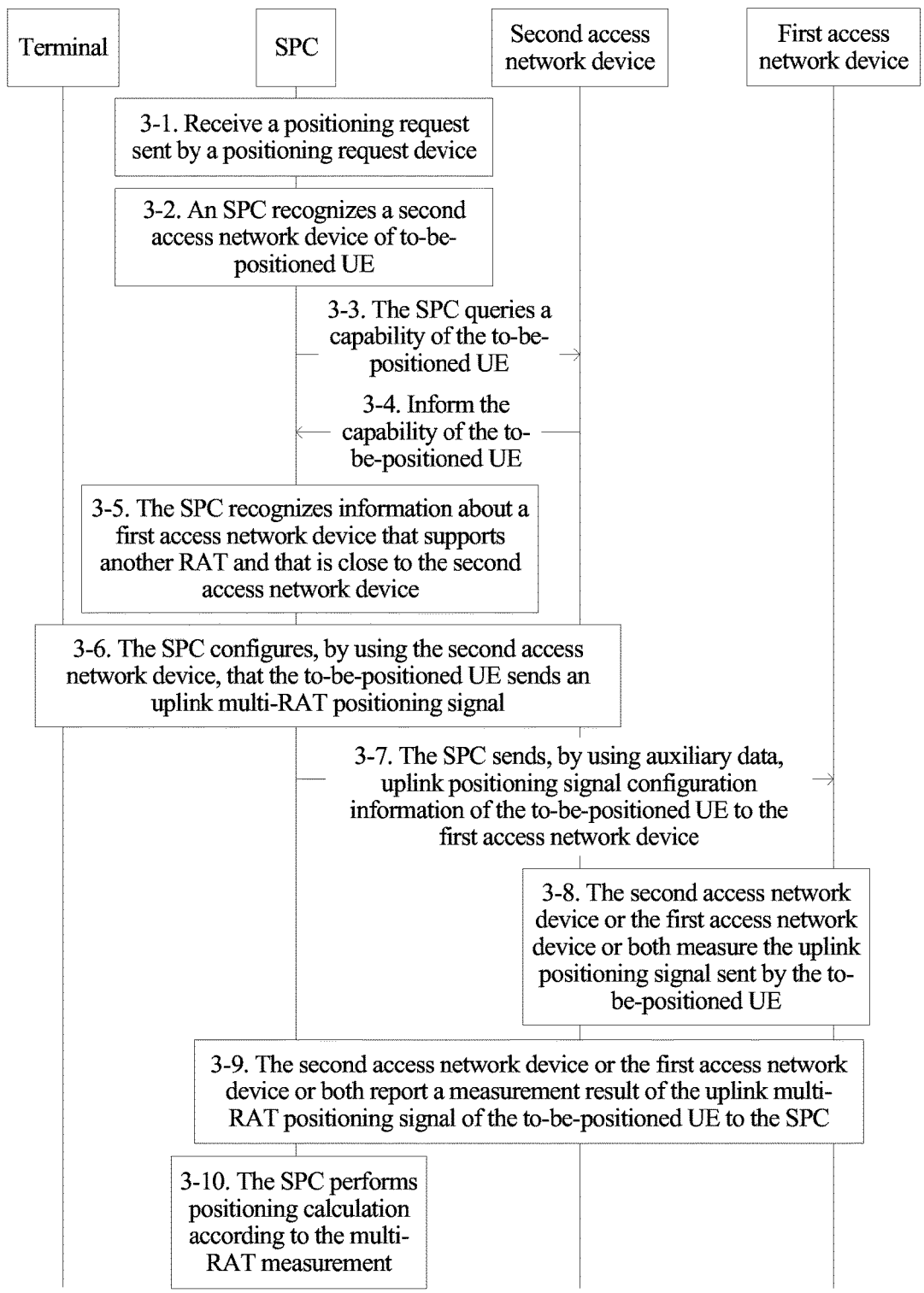
FIG. 6 is a schematic interaction diagram of another positioning parameter coordination method according to an embodiment of the present invention.

FIG. 6 is a schematic interaction diagram of another positioning parameter coordination method according to an embodiment of the present invention. The method is corresponding to the foregoing uplink positioning solution. Referring to FIG. 6, the interaction includes the following steps.

Step 3-1. An SPC receives a positioning request sent by a positioning request device.

The positioning request may be from a third party entity, to-be-positioned UE, an access network device, or the like.

Step 3-2. The SPC recognizes a second access network device of to-be-positioned UE.

Step 3-3. The SPC queries the second access network device about a capability of the to-be-positioned UE.

Specifically, the capability of the to-be-positioned UE includes radio standards supported by the to-be-positioned UE.

Step 3-4. The second access network device sends the capability of the to-be-positioned UE to the SPC.

Step 3-5. The SPC recognizes information about a first access network device that supports another RAT and that is close to the second access network device.

Step 3-6. The SPC configures, by using the second access network device, that the to-be-positioned UE sends an uplink multi-RAT positioning signal.

It needs to be noted that, because the SPC has obtained the information about the different radio standards supported by the to-be-positioned UE, the SPC in this step configures that the to-be-positioned UE sends only a radio positioning signal that supports one of the standards supported by the to-be-positioned UE.

Step 3-7. The SPC sends, by using auxiliary data, uplink positioning signal configuration information of the to-be-positioned UE to the first access network device.

Step 3-8 The second access network device or the first access network device or both measure the uplink positioning signal sent by the to-be-positioned UE.

Step 3-9. The second access network device or the first access network device or both report a measurement result of the uplink multi-RAT positioning signal of the to-be-positioned UE to the SPC.

Step 3-10. The SPC performs positioning calculation according to the measurement result of the multi-RAT-based positioning signal (RAT), to obtain information about a position of the to-be-positioned UE.

The following separately describes functions of the nodes: the SPC, the serving base station, the neighboring-cell base station, and the to-be-positioned UE in FIG. 5 and FIG. 6.

Figure 7:
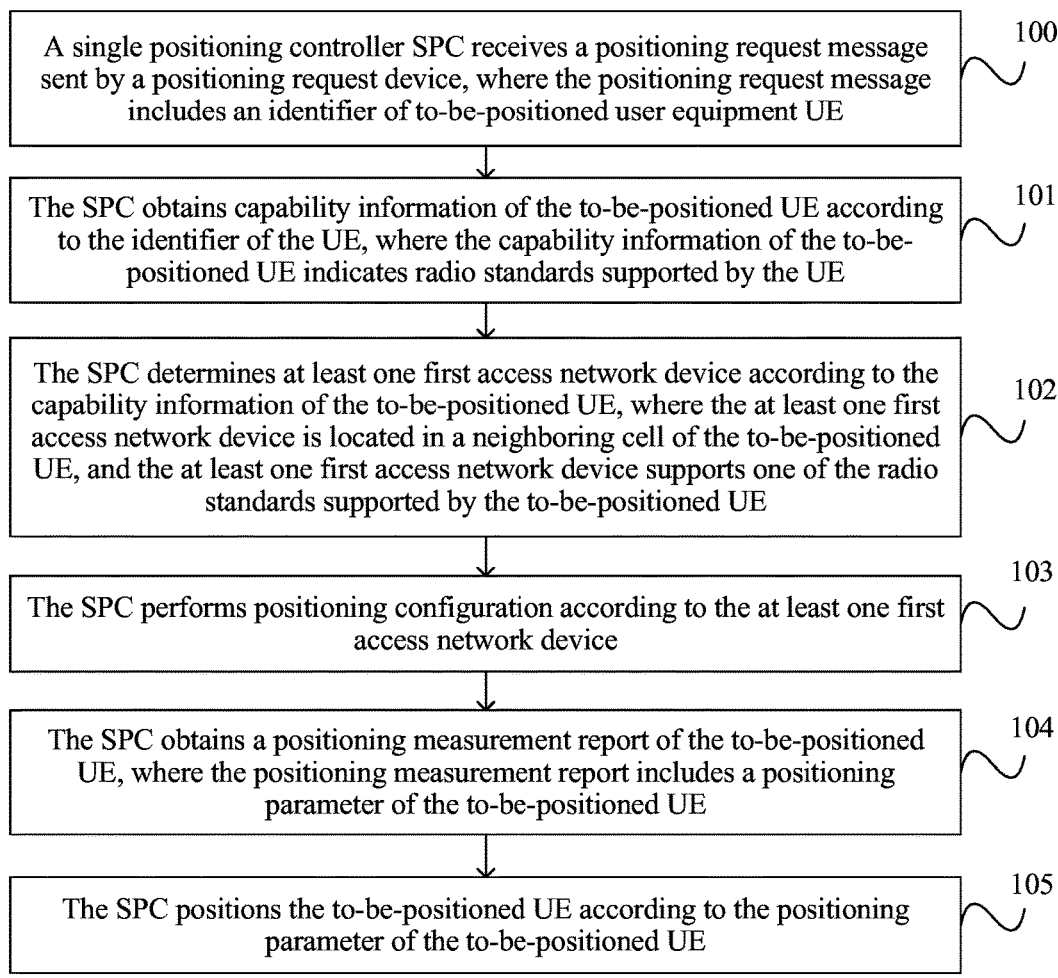
FIG. 7 is a schematic procedure diagram of a positioning parameter coordination method according to an embodiment of the present invention.

For the foregoing SPC, FIG. 7 is a schematic procedure diagram of a positioning parameter coordination method according to an embodiment of the present invention. The method is performed by the SPC. Referring to FIG. 7, the method includes the following steps:

Step 100. The SPC receives a positioning request message sent by a positioning request device, where the positioning request message includes an identifier of to-be-positioned UE.

Step 101. The SPC obtains capability information of the to-be-positioned UE according to the identifier of the UE, where the capability information of the to-be-positioned UE indicates radio standards supported by the UE.

Step 102. The SPC determines at least one first access network device according to the capability information of the to-be-positioned UE, where the at least one first access network device is located in a neighboring cell of the to-be-positioned UE, and the at least one first access network device supports one of the radio standards supported by the to-be-positioned UE.

Step 103. The SPC performs positioning configuration according to the at least one first access network device.

Step 104. The SPC obtains a positioning measurement report of the to-be-positioned UE, where the positioning measurement report includes a positioning measurement result parameter of the to-be-positioned UE.

Step 105. The SPC positions the to-be-positioned UE according to a positioning parameter of the to-be-positioned UE.

According to the positioning parameter coordination method provided in this embodiment of the present invention, a SPC receives a positioning request message sent by a positioning request device, and the positioning request message includes an identifier of to-be-positioned UE. The SPC obtains capability information of the to-be-positioned UE according to the identifier of the UE, and the capability information of the to-be-positioned UE indicates radio standards supported by the UE. The SPC determines at least one first access network device according to the capability information of the to-be-positioned UE, the at least one first access network device is located in a neighboring cell of the to-be-positioned UE, and the at least one first access network device supports one of the radio standards supported by the to-be-positioned UE. The SPC performs positioning configuration according to the at least one first access network device. The SPC obtains a positioning measurement report of the to-be-positioned UE, and the positioning measurement report includes a positioning measurement result parameter of the to-be-positioned UE. The SPC positions the to-be-positioned UE according to the positioning parameter of the to-be-positioned UE. In this way, the SPC can select multiple access network devices that support the radio standards supported by the UE to coordinately implement a multi-RAT positioning operation, that is, when a base station to which the to-be-positioned UE belongs deploys another cell, the SPC can position the to-be-positioned UE in coordination with an access network device (such as the first access network device) in the another cell, so as to improve positioning accuracy of the UE.

Further, step 101 may include multiple feasible implementations, and two feasible implementations are described below.

Manner One.

Step 101a-1. The SPC sends a first UE capability query message to a second access network device according to the identifier of the to-be-positioned UE, where the second access network device is an access network device to which a server cell of the to-be-positioned UE belongs.

Step 101a-2. The SPC receives a first UE capability query response message sent by the second access network device, where the first UE capability query response message includes the capability information of the to-be-positioned UE.

Manner Two.

Step 101b-1. The SPC sends a second UE capability query message to the to-be-positioned UE according to the identifier of the to-be-positioned UE.

Step 101b-2. The SPC receives a second UE capability query response message sent by the to-be-positioned UE, where the second UE capability query response message includes the capability information of the to-be-positioned UE.

Optionally, step 103 may include multiple feasible implementations, and several feasible implementations are described below.

Manner One.

Step 103a-1. The SPC sends a first query message to the at least one first access network device, where the first query message is used to query downlink positioning signal configuration information of the at least one first access network device.

Step 103a-2. The SPC sends a second query message to the second access network device, where the second query message is used to query downlink positioning signal configuration information of the second access network device.

Step 103a-3. The SPC receives a first query response message sent by the at least one first access network device, where the first query response message includes the downlink positioning signal configuration information of the at least one first access network device.

Step 103a-4. The SPC receives a second query response message sent by the second access network device, where the second query response message includes the downlink positioning signal configuration information of the second access network device.

Step 103a-5. The SPC sends the downlink positioning signal configuration information of the at least one first access network device and the downlink positioning signal configuration information of the second access network device to the to-be-positioned UE.

Manner Two:

For the foregoing downlink positioning solution shown in FIG. 5, the SPC provided in this embodiment of the present invention has the following functions.

Step 103b-1. The SPC configures downlink positioning signal configuration information of the at least one first access network device.

Step 103b-2. The SPC configures downlink positioning signal configuration information of the second access network device.

Step 103b-3. The SPC sends the downlink positioning signal configuration information of the at least one first access network device and the downlink positioning signal configuration information of the second access network device to the to-be-positioned UE.

Optionally, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

The downlink positioning signal configuration information of the second access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

A feasible implementation of step 104 is as follows.

Step 104a-1. The SPC receives the positioning measurement report sent by the to-be-positioned UE, where the positioning measurement report includes a positioning measurement result of downlink positioning reference signals based on multiple access networks.

For the foregoing uplink positioning solution shown in FIG. 6, the SPC provided in this embodiment of the present invention has the following functions.

Before step 103, the method further includes.

Step 106. The SPC configures, by using the second access network device, that the to-be-positioned UE sends an uplink reference signal.

Another feasible implementation of step 103 is as follows.

Step 103c-1. The SPC sends uplink reference signal configuration information of the to-be-positioned UE to the at least one first access network device and the second access network device.

Another feasible implementation of step 104 is as follows.

Step 104b-1. The SPC receives positioning measurement reports of the to-be-positioned UE that are separately sent by the at least one first access network device and the second access network device.

Optionally, the positioning request device is the to-be-positioned UE, an access network device, a core network device, or a 3rd party application server.

Figure 8:
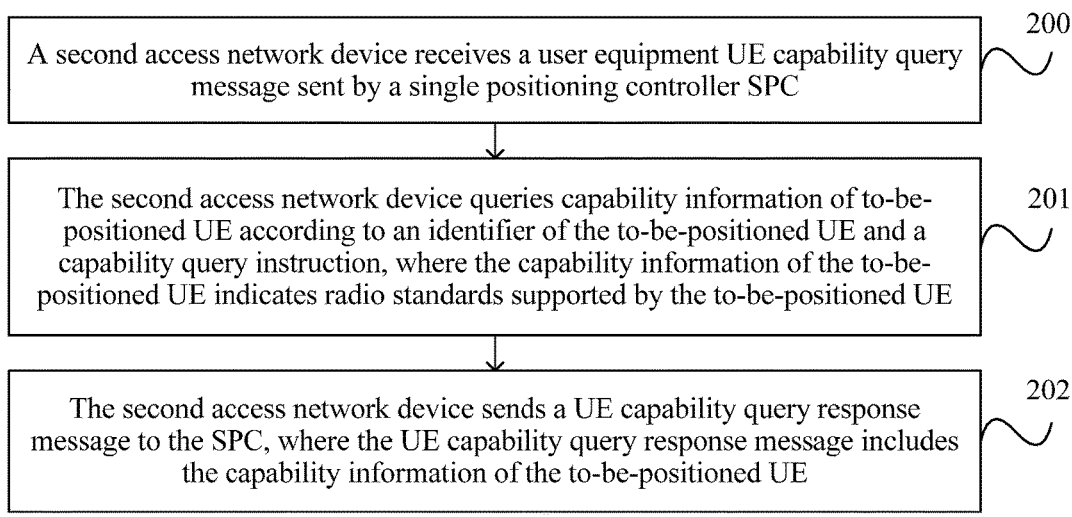
FIG. 8 is a schematic procedure diagram of another positioning parameter coordination method according to an embodiment of the present invention.

For the foregoing serving base station, FIG. 8 is a schematic procedure diagram of another positioning parameter coordination method according to an embodiment of the present invention. The method is performed by a second access network device, that is, the serving base station. The second access network device may be another device such as a serving access point. Referring to FIG. 8, the method includes the following steps.

Step 200. The second access network device receives a UE capability query message sent by a SPC.

The UE capability query message includes an identifier of to-be-positioned UE and a capability query instruction, and the second access network device is an access network device to which a server cell of the to-be-positioned UE belongs.

Step 201. The second access network device queries capability information of the to-be-positioned UE according to the identifier of the to-be-positioned UE and the capability query instruction, where the capability information of the to-be-positioned UE indicates radio standards supported by the to-be-positioned UE.

Step 202. The second access network device sends a UE capability query response message to the SPC, where the UE capability query response message includes the capability information of the to-be-positioned UE.

According to the positioning parameter coordination method provided in this embodiment of the present invention, a second access network device receives a UE capability query message sent by a SPC, the UE capability query message includes an identifier of to-be-positioned UE and a capability query instruction, and the second access network device is an access network device to which a server cell of the to-be-positioned UE belongs. The second access network device queries capability information of the to-be-positioned UE according to the identifier of the to-be-positioned UE and the capability query instruction, and the capability information of the to-be-positioned UE indicates radio standards supported by the to-be-positioned UE. The second access network device sends a UE capability query response message to the SPC, and the UE capability query response message includes the capability information of the to-be-positioned UE. In this way, the SPC can select multiple access network devices that support the radio standards supported by the UE to coordinately implement a multi-RAT positioning operation, that is, when a base station to which the to-be-positioned UE belongs deploys another cell, the second access network device assists the SPC in positioning the to-be-positioned UE in coordination with an access network device (such as a first access network device) in the another cell, so as to improve positioning accuracy of the UE.

For the foregoing uplink positioning solution shown in FIG. 8, the second access network device provided in this embodiment of the present invention has the following functions.

After step 202, the method further includes.

Step 203. The second access network device receives uplink reference signal configuration information of the to-be-positioned UE that is sent by the SPC, where the uplink reference signal configuration information of the to-be-positioned UE is used to instruct the to-be-positioned UE to send an uplink reference signal.

Step 204. The second access network device sends the uplink reference signal configuration information of the to-be-positioned UE to the to-be-positioned UE.

Step 205. The second access network device measures the uplink reference signal sent by the to-be-positioned UE.

Step 206. The second access network device sends a measurement report to the SPC, where the measurement report includes a measurement result of the uplink reference signal.

Specifically, the measurement result includes information about a time of arrival of the uplink reference signal or about a time difference of arrival of the uplink reference signal.

Figure 9:
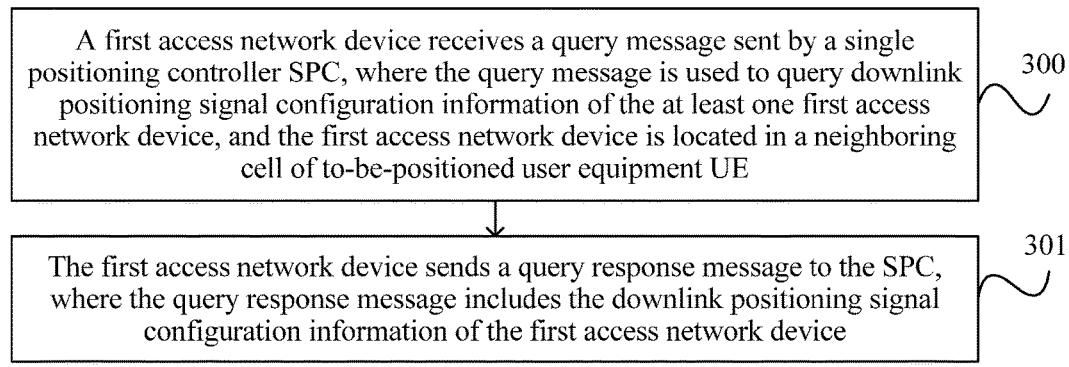
FIG. 9 is a schematic procedure diagram of another positioning parameter coordination method according to an embodiment of the present invention.

For the foregoing neighboring-cell base station, FIG. 9 is a schematic procedure diagram of another positioning parameter coordination method according to an embodiment of the present invention. The method is performed by a first access network device, that is, the neighboring-cell base station. The second access network device may be another device such as a serving access point. Referring to FIG. 9, for the foregoing downlink positioning solution shown in FIG. 5, the first access network device provided in this embodiment of the present invention may perform the following steps.

Step 300. The first access network device receives a query message sent by a SPC, where the query message is used to query downlink positioning signal configuration information of the at least one first access network device, and the first access network device is located in a neighboring cell of to-be-positioned UE.

Step 301. The first access network device sends a query response message to the SPC, where the query response message includes the downlink positioning signal configuration information of the first access network device.

According to the positioning parameter coordination method provided in this embodiment of the present invention, a first access network device receives a query message sent by a SPC, the query message is used to query downlink positioning signal configuration information of the at least one first access network device, and the first access network device is located in a neighboring cell of to-be-positioned UE. The first access network device sends a query response message to the SPC, and the query response message includes the downlink positioning signal configuration information of the first access network device. In this way, the SPC can select multiple access network devices that support radio standards supported by the UE to coordinately perform a multi-RAT positioning operation, so as to improve positioning accuracy of the UE.

Optionally, the downlink positioning signal configuration information of the access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

Figure 10:
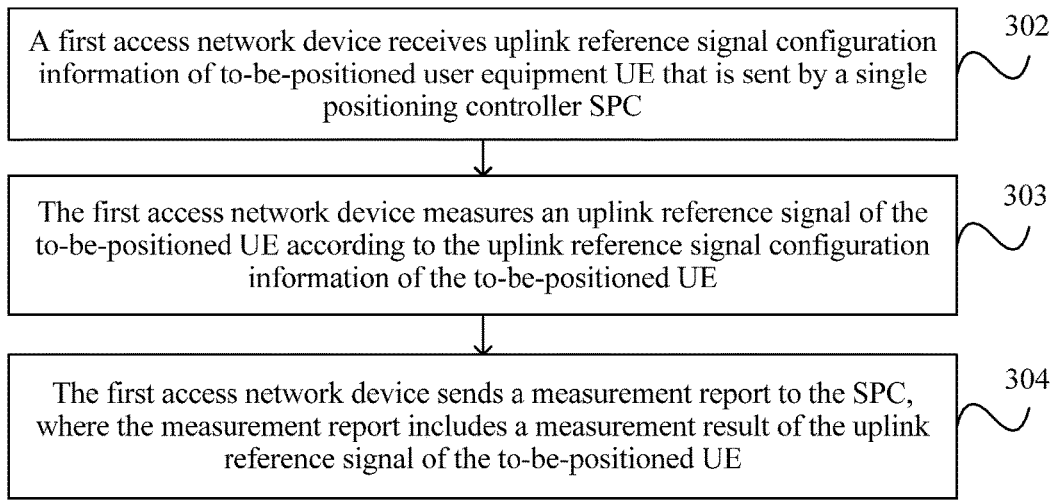
FIG. 10 is a schematic procedure diagram of another positioning parameter coordination method according to an embodiment of the present invention.

FIG. 10 is a schematic procedure diagram of another positioning parameter coordination method according to an embodiment of the present invention. The method is performed by a first access network device, that is, a neighboring-cell base station. Referring to FIG. 10, for the foregoing uplink positioning solution shown in FIG. 6, the first access network device provided in this embodiment of the present invention may perform the following steps:

Step 302. The first access network device receives uplink reference signal configuration information of to-be-positioned UE that is sent by a SPC.

Step 303. The first access network device measures an uplink reference signal of the to-be-positioned UE according to the uplink reference signal configuration information of the to-be-positioned UE.

Step 304. The first access network device sends a measurement report to the SPC, where the measurement report includes a measurement result of the uplink reference signal of the to-be-positioned UE.

According to the positioning parameter coordination method provided in this embodiment of the present invention, a first access network device receives uplink reference signal configuration information of to-be-positioned UE that is sent by a SPC. The first access network device measures an uplink reference signal of the to-be-positioned UE according to the uplink reference signal configuration information of the to-be-positioned UE. The first access network device sends a measurement report to the SPC, and the measurement report includes a measurement result of the uplink reference signal of the to-be-positioned UE. In this way, the SPC can select multiple access network devices that support radio standards supported by the UE to coordinately perform a multi-RAT positioning operation, that is, when a base station to which the to-be-positioned UE belongs deploys another cell, an access network device (such as the first access network device) in the another cell can perform positioning processing of the to-be-positioned UE according to configuration of the SPC, so as to improve positioning accuracy of the UE.

Optionally, the measurement result of the uplink reference signal of the to-be-positioned UE includes: information about a time of arrival of the uplink reference signal of the to-be-positioned UE, and/or about a time difference of arrival of the uplink reference signal of the to-be-positioned UE.

Figure 11:
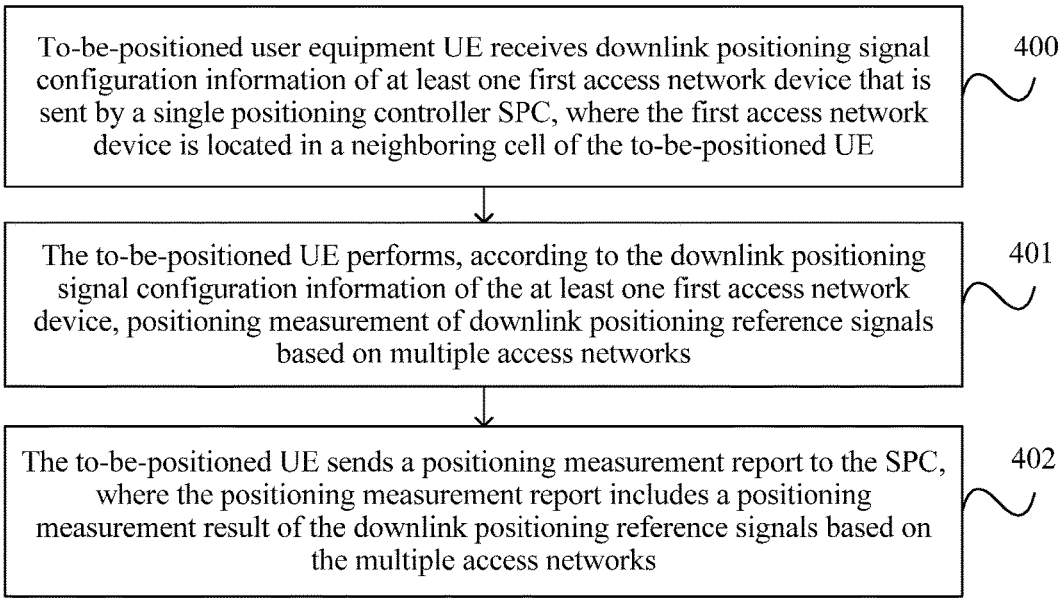
FIG. 11 is a schematic procedure diagram of another positioning parameter coordination method according to an embodiment of the present invention.

FIG. 11 is a schematic procedure diagram of another positioning parameter coordination method according to an embodiment of the present invention. The method is performed by to-be-positioned UE, and the UE may be specifically a smartphone, a tablet computer, a vehicle-mounted communications device, and the like. Referring to FIG. 11, for the foregoing downlink positioning solution shown in FIG. 5, the to-be-positioned UE provided in this embodiment of the present invention may perform the following steps.

Step 400. The to-be-positioned UE receives downlink positioning signal configuration information of at least one first access network device that is sent by a SPC, where the first access network device is located in a neighboring cell of the to-be-positioned UE.

Step 401. The to-be-positioned UE performs, according to the downlink positioning signal configuration information of the at least one first access network device, positioning measurement of downlink positioning reference signals based on multiple access networks.

Step 402. The to-be-positioned UE sends a positioning measurement report to the SPC, where the positioning measurement report includes a positioning measurement result of the downlink positioning reference signals based on the multiple access networks.

According to the positioning parameter coordination method provided in this embodiment of the present invention, to-be-positioned UE receives downlink positioning signal configuration information of at least one first access network device that is sent by a SPC, and the first access network device is located in a neighboring cell of the to-be-positioned UE. The to-be-positioned UE performs, according to the downlink positioning signal configuration information of the at least one first access network device, positioning measurement of downlink positioning reference signals based on multiple access networks. The to-be-positioned UE sends a positioning measurement report to the SPC, and the positioning measurement report includes a positioning measurement result of the downlink positioning reference signals based on the multiple access networks. In this way, the SPC can support multiple access network devices that support radio standards supported by the UE to coordinately perform a multi-RAT positioning operation, so as to improve positioning accuracy of the UE.

Optionally, the downlink positioning signal configuration information of the at least one first access network device includes any one or a combination of the following: a sending period of a downlink positioning signal, a scheduled sending time of a downlink positioning signal, a sending frequency channel number of a downlink positioning signal, and/or a sending sequence of a downlink positioning signal.

Optionally, the positioning measurement result of the downlink positioning reference signals based on the multiple access networks includes: information about times of arrival of the downlink positioning reference signals based on the multiple access networks, and/or about a time difference of arrival of the downlink positioning reference signals based on the multiple access networks.

Figure 12:
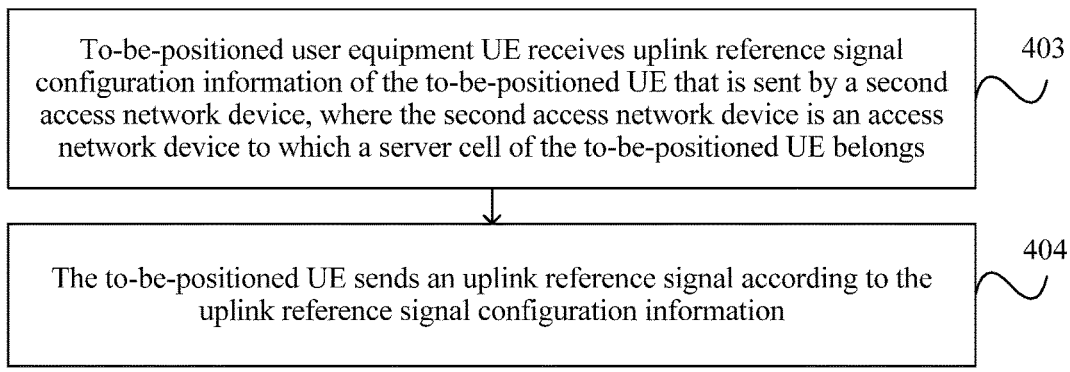
FIG. 12 is a schematic procedure diagram of another positioning parameter coordination method according to an embodiment of the present invention.

FIG. 12 is a schematic procedure diagram of another positioning parameter coordination method according to an embodiment of the present invention. The method is performed by to-be-positioned UE. Referring to FIG. 12, for the foregoing uplink positioning solution shown in FIG. 6, the to-be-positioned UE provided in this embodiment of the present invention may perform the following steps.

Step 403. The to-be-positioned UE receives uplink reference signal configuration information of the to-be-positioned UE that is sent by a second access network device, where the second access network device is an access network device to which a server cell of the to-be-positioned UE belongs.

Step 404. The to-be-positioned UE sends an uplink reference signal according to the uplink reference signal configuration information.

According to the positioning parameter coordination method provided in this embodiment of the present invention, to-be-positioned UE receives uplink reference signal configuration information of the to-be-positioned UE that is sent by a second access network device, and the second access network device is an access network device to which a server cell of the to-be-positioned UE belongs. The to-be-positioned UE sends an uplink reference signal according to the uplink reference signal configuration information. In this way, an SPC can select multiple access network devices that support radio standards supported by the UE to coordinately perform a multi-RAT positioning operation, so as to improve positioning accuracy of the UE.

Figure 13:
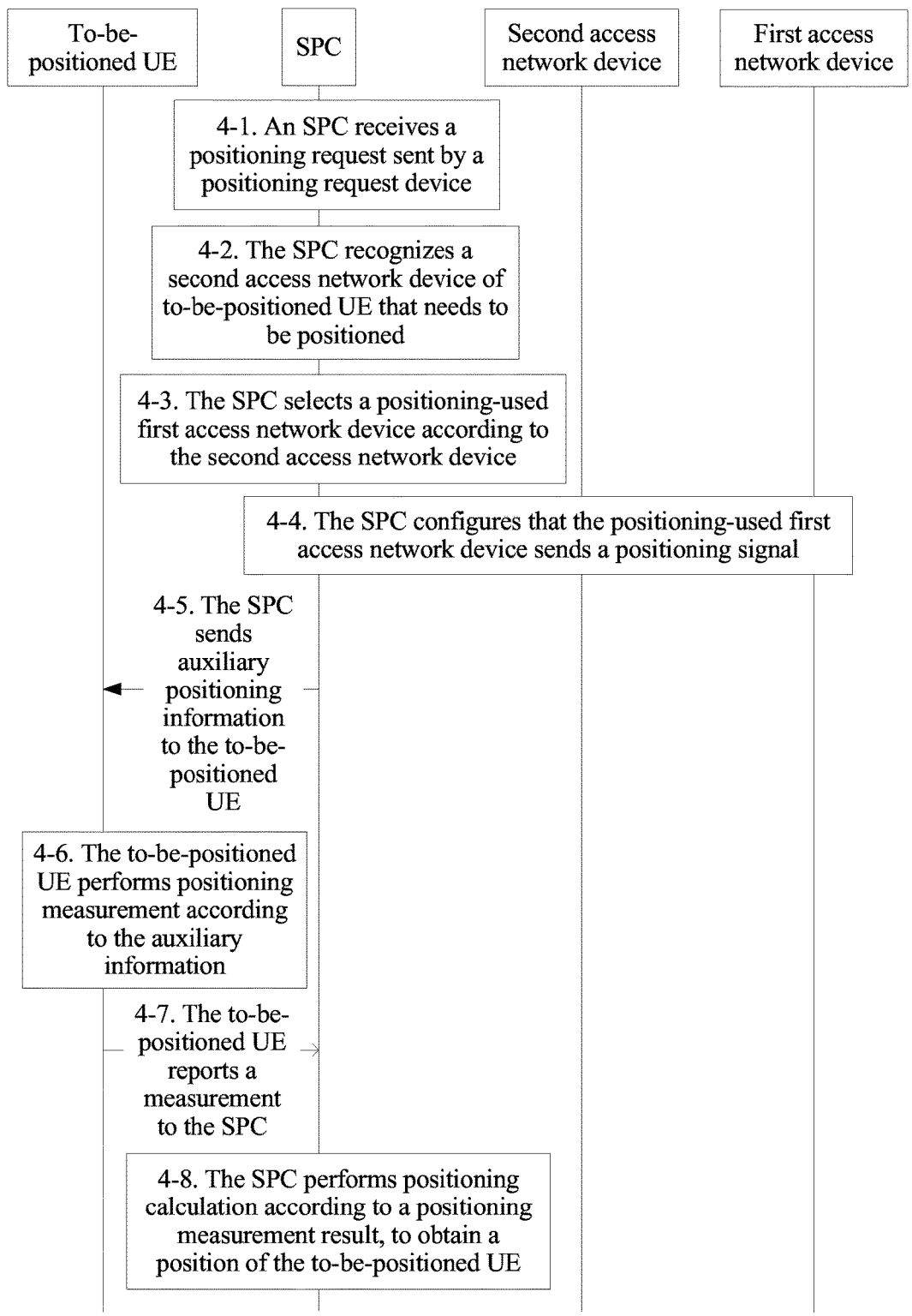
FIG. 13 is a schematic interaction diagram of another positioning parameter coordination method according to an embodiment of the present invention.

Scenario two describes a manner in which an SPC and a base station (or an access point) coordinately control use of positioning resources, or in which an SPC and a base station (or an access point) coordinately configure a positioning signal. First, a scenario in which an SPC and a base station (or an access point) coordinately control use of positioning resources is used as an example. FIG. 13 is a schematic interaction diagram of another positioning parameter coordination method according to an embodiment of the present invention. Referring to FIG. 13, the interaction includes the following steps.

Step 4-1. The SPC receives a positioning request sent by a positioning request device.

The positioning request may be from a third party entity, to-be-positioned UE, an access network device, or the like.

Step 4-2. The SPC recognizes a second access network device of to-be-positioned UE that needs to be positioned.

Step 4-3. The SPC selects a positioning-used first access network device according to the second access network device.

For step 4-3, a selection method may be, for example, as follows: If two to-be-positioned UEs exist in a current network and the two to-be-positioned UEs belong to two cells, the SPC usually selects a first access network device surrounding the two cells as a positioning base station or access point, and not all base stations and access points in the network need to be used as positioning anchors.

Step 4-4. The SPC configures that the positioning-used first access network device sends a positioning signal.

Specifically, the SPC configures that the selected first access network device sends the positioning signal, and configuration content includes a sending period, a sending frequency channel number, a sending bandwidth, a scheduled sending time, a sending sequence, or the like.

Step 4-5. The SPC sends auxiliary positioning information to the to-be-positioned UE.

Specifically, the SPC sends, to the to-be-positioned UE, positioning signal configuration information of the first access network device that serves as auxiliary positioning data.

Step 4-6. The to-be-positioned UE performs positioning measurement according to the auxiliary information.

Step 4-7. The to-be-positioned UE reports a measurement to the SPC.

Step 4-8. The SPC performs positioning calculation according to a positioning measurement result, to obtain a position of the to-be-positioned UE.

Figure 14:
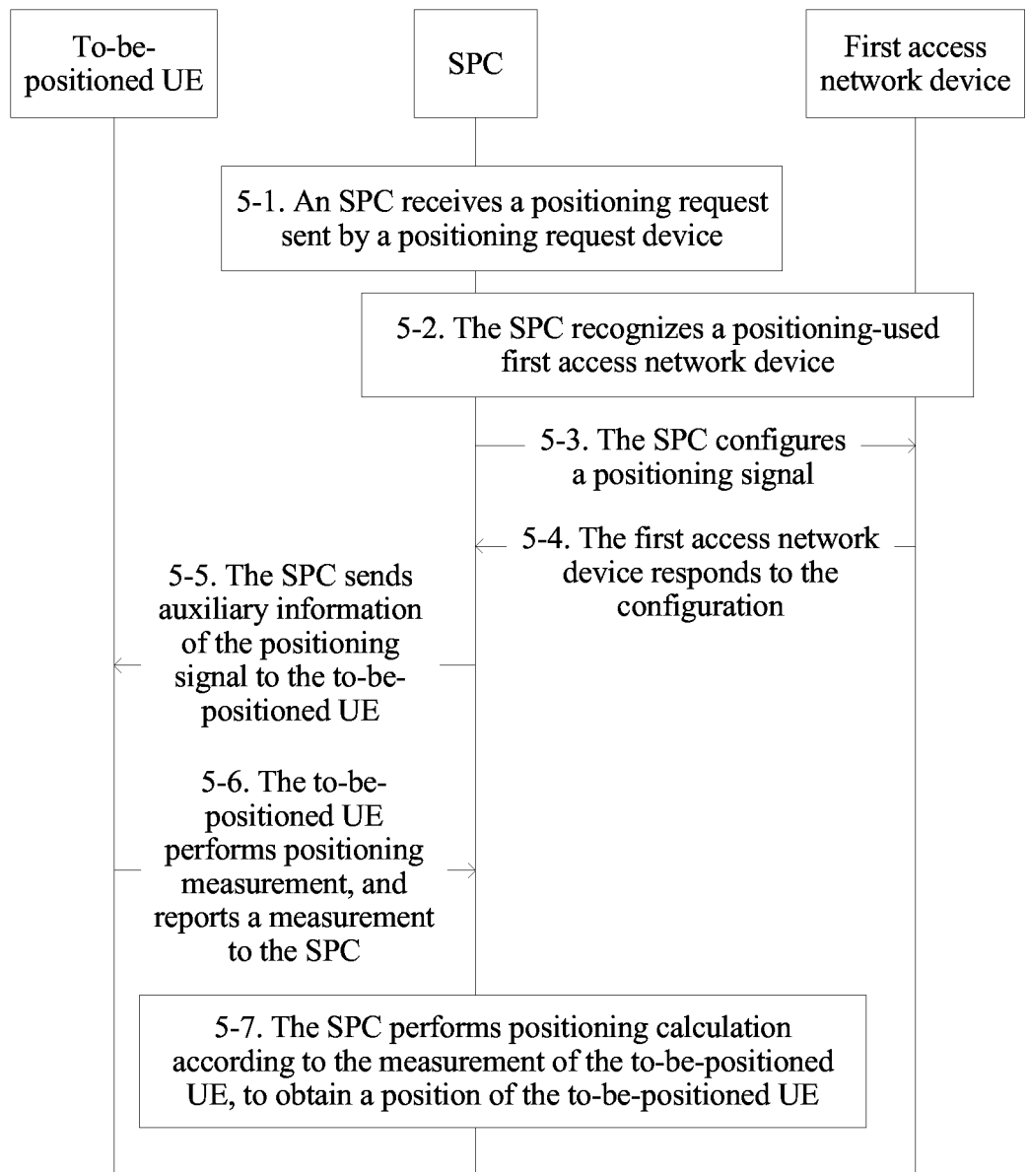
FIG. 14 is a schematic interaction diagram of another positioning parameter coordination method according to an embodiment of the present invention.

A scenario in which an SPC and a base station (or an access point) coordinately configure a positioning signal is used as an example. FIG. 14 is a schematic interaction diagram of another positioning parameter coordination method according to an embodiment of the present invention. Referring to FIG. 14, the interaction includes the following steps.

Step 5-1. The SPC receives a positioning request sent by a positioning request device.

The positioning request may be from a third party entity, to-be-positioned UE, an access network device, or the like.

Step 5-2. The SPC recognizes a positioning-used first access network device.

Specifically, the SPC determines a second access network device to which to-be-positioned UE that needs to be positioned currently belongs, and the SPC selects the positioning-used first access network device according to the second access network device.

Step 5-3. The SPC configures a positioning signal.

Specifically, the SPC configures that the first access network device sends the positioning signal, and configuration content includes a sending period, a scheduled sending time, a sending bandwidth, a sending frequency channel number, a sending sequence, or the like of the positioning signal.

Step 5-4. The first access network device responds to the configuration.

Specifically, the first access network device responds to the configuration action in step 5-3.

Step 5-5. The SPC sends auxiliary information of the positioning signal to to-be-positioned UE, where the auxiliary information includes positioning signal configuration information of the positioning-used first access network device.

Step 5-6. The to-be-positioned UE performs positioning measurement, and reports a measurement to the SPC.

Step 5-7. The SPC performs positioning calculation according to the measurement of the to-be-positioned UE, to obtain a position of the to-be-positioned UE.

The following separately describes functions of the nodes: the SPC, the serving base station, the neighboring-cell base station, and the to-be-positioned UE in FIG. 13 and FIG. 14.

Figure 15:
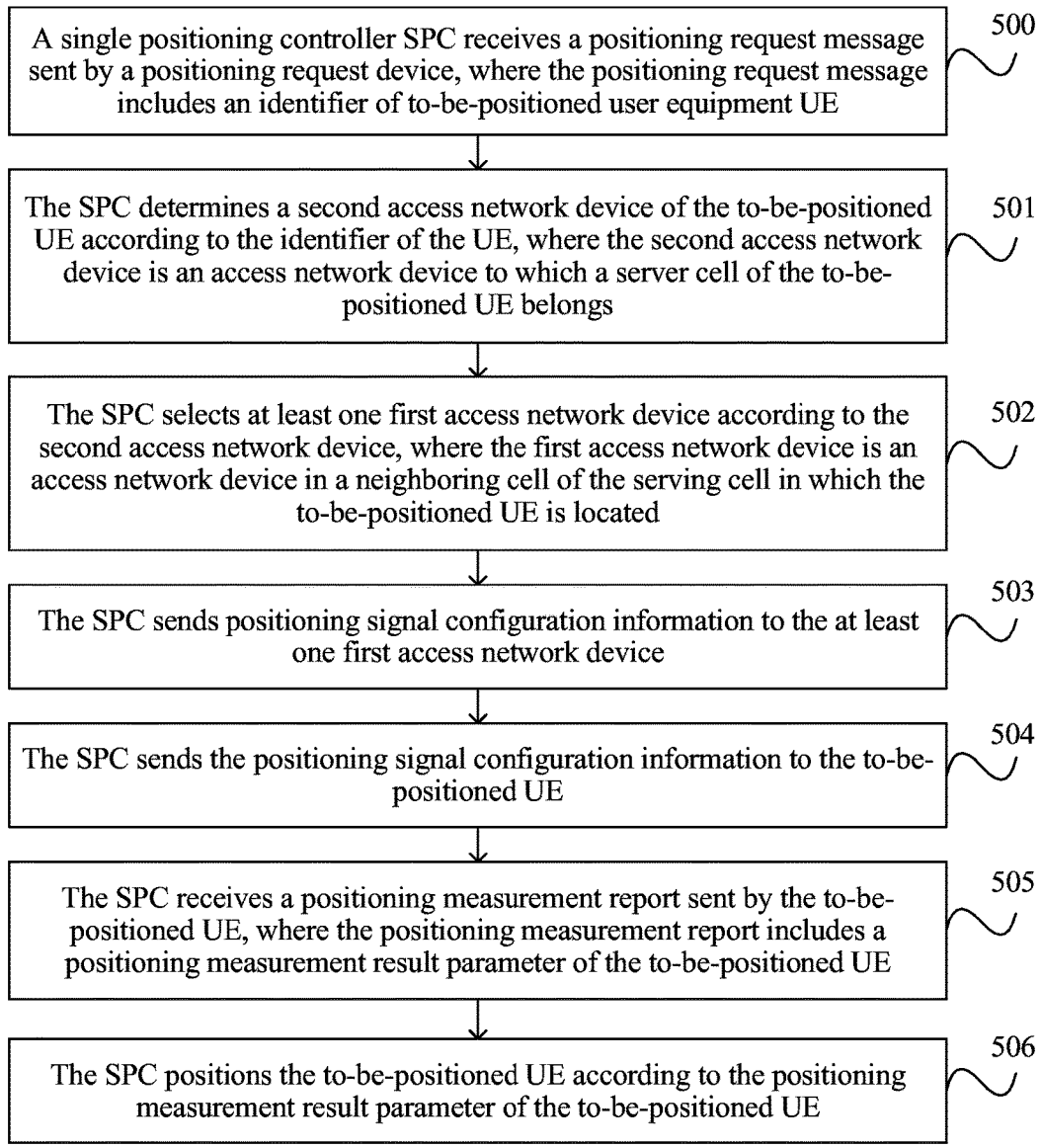
FIG. 15 is a schematic procedure diagram of another positioning parameter coordination method according to an embodiment of the present invention.

For the SPC in FIG. 13 and FIG. 14, FIG. 15 is a schematic procedure diagram of another positioning parameter coordination method according to an embodiment of the present invention. The method is performed by the SPC. Referring to FIG. 15, the method includes the following steps:

Step 500. The SPC receives a positioning request message sent by a positioning request device, where the positioning request message includes an identifier of to-be-positioned UE.

Step 501. The SPC determines a second access network device of the to-be-positioned UE according to the identifier of the UE, where the second access network device is an access network device to which a server cell of the to-be-positioned UE belongs.

Step 502. The SPC selects at least one first access network device according to the second access network device, where the first access network device is an access network device in a neighboring cell of the serving cell in which the to-be-positioned UE is located.

Step 503. The SPC sends positioning signal configuration information to the at least one first access network device.

Step 504. The SPC sends the positioning signal configuration information to the to-be-positioned UE.

Step 505. The SPC receives a positioning measurement report sent by the to-be-positioned UE, where the positioning measurement report includes a positioning measurement result parameter of the to-be-positioned UE.

Step 506. The SPC positions the to-be-positioned UE according to the positioning measurement result parameter of the to-be-positioned UE.

According to the positioning parameter coordination method provided in this embodiment of the present invention, a SPC receives a positioning request message sent by a positioning request device, and the positioning request message includes an identifier of to-be-positioned UE. The SPC determines a second access network device of the to-be-positioned UE according to the identifier of the UE, and the second access network device is an access network device to which a server cell of the to-be-positioned UE belongs. The SPC selects at least one first access network device according to the second access network device, and the first access network device is an access network device in a neighboring cell of the serving cell in which the to-be-positioned UE is located. The SPC sends positioning signal configuration information to the at least one first access network device. The SPC sends the positioning signal configuration information to the to-be-positioned UE. The SPC receives a positioning measurement report sent by the to-be-positioned UE, and the positioning measurement report includes a positioning measurement result parameter of the to-be-positioned UE. The SPC positions the to-be-positioned UE according to the positioning measurement result parameter of the to-be-positioned UE. In this way, the SPC can select an access network device in a neighboring cell of the UE to coordinately perform positioning, so as to ensure maximum utilization of resources and improve positioning accuracy of the UE.

Optionally, the positioning signal configuration information includes any one or a combination of the following: a sending period of a downlink positioning signal, a scheduled sending time of a downlink positioning signal, a sending frequency channel number of a downlink positioning signal, and/or a sending sequence of a downlink positioning signal.

Optionally, the positioning request device is the to-be-positioned UE, an access network device, a core network device, or a 3rd party application server.

Figure 16:
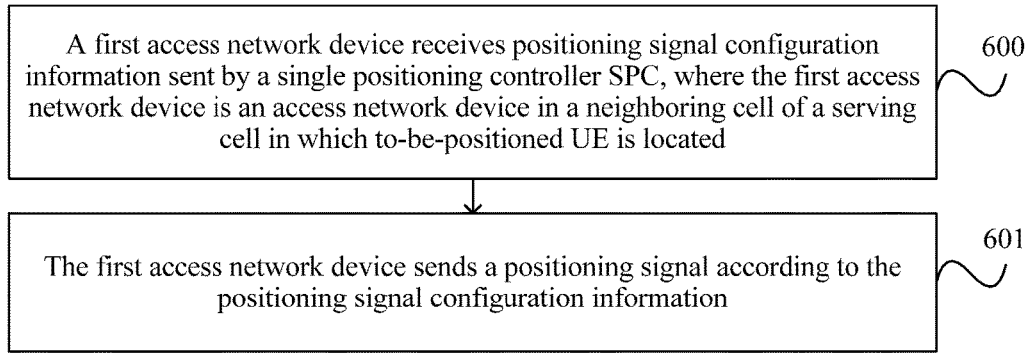
FIG. 16 is a schematic procedure diagram of another positioning parameter coordination method according to an embodiment of the present invention.

For the neighboring-cell base station in FIG. 13 and FIG. 14, FIG. 16 is a schematic procedure diagram of another positioning parameter coordination method according to an embodiment of the present invention. The method is performed by a first access network device, that is, the neighboring-cell base station. Referring to FIG. 16, the method includes the following steps.

Step 600. The first access network device receives positioning signal configuration information sent by a SPC, where the first access network device is an access network device in a neighboring cell of a serving cell in which to-be-positioned UE is located.

Step 601. The first access network device sends a positioning signal according to the positioning signal configuration information.

According to the positioning parameter coordination method provided in this embodiment of the present invention, a first access network device receives positioning signal configuration information sent by a SPC, and the first access network device is an access network device in a neighboring cell of a serving cell in which to-be-positioned UE is located. The first access network device sends a positioning signal according to the positioning signal configuration information. In this way, the SPC can select an access network device (that is, the first access network device) in a neighboring cell of the UE to coordinately perform positioning, so as to ensure maximum utilization of resources and improve positioning accuracy of the UE.

Optionally, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

Optionally, after step 601, the method further includes.

Step 602. The first access network device sends a configuration response message to the SPC.

It needs to be noted that step 602 is to assure the SPC that the positioning signal has been sent according to configuration.

Figure 17:
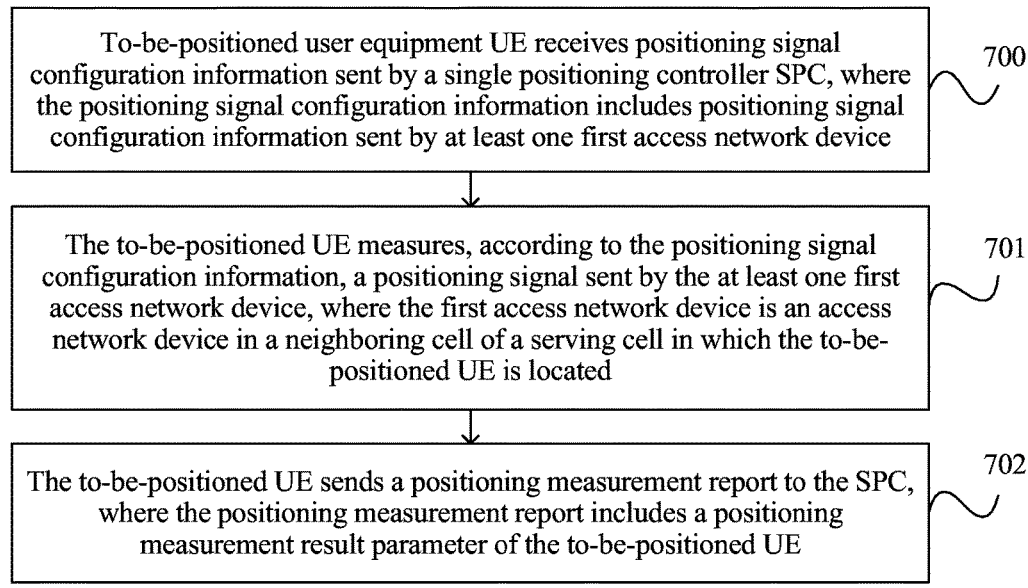
FIG. 17 is a schematic procedure diagram of another positioning parameter coordination method according to an embodiment of the present invention.

For the to-be-positioned UE in FIG. 13 and FIG. 14, FIG. 17 is a schematic procedure diagram of another positioning parameter coordination method according to an embodiment of the present invention. The method is performed by the to-be-positioned UE. Referring to FIG. 17, the method includes the following steps.

Step 700. The to-be-positioned UE receives positioning signal configuration information sent by a SPC, where the positioning signal configuration information includes positioning signal configuration information sent by at least one first access network device.

Step 701. The to-be-positioned UE measures, according to the positioning signal configuration information, a positioning signal sent by the at least one first access network device, where the first access network device is an access network device in a neighboring cell of a serving cell in which the to-be-positioned UE is located.

Step 702. The to-be-positioned UE sends a positioning measurement report to the SPC, where the positioning measurement report includes a positioning measurement result parameter of the to-be-positioned UE.

According to the positioning parameter coordination method provided in this embodiment of the present invention, to-be-positioned UE measures, according to positioning signal configuration information, a positioning signal sent by at least one first access network device, and the first access network device is an access network device in a neighboring cell of a serving cell in which the to-be-positioned UE is located. The to-be-positioned UE sends a positioning measurement report to an SPC, and the positioning measurement report includes a positioning measurement result parameter of the to-be-positioned UE. In this way, the SPC can select an access network device in a neighboring cell of the UE to coordinately perform positioning, so as to ensure maximum utilization of resources and improve positioning accuracy of the UE.

Optionally, the positioning signal configuration information includes any one or a combination of the following: a sending period of the downlink positioning signal, a scheduled sending time of the downlink positioning signal, a sending frequency channel number of the downlink positioning signal, and/or a sending sequence of the downlink positioning signal.

Figure 18:
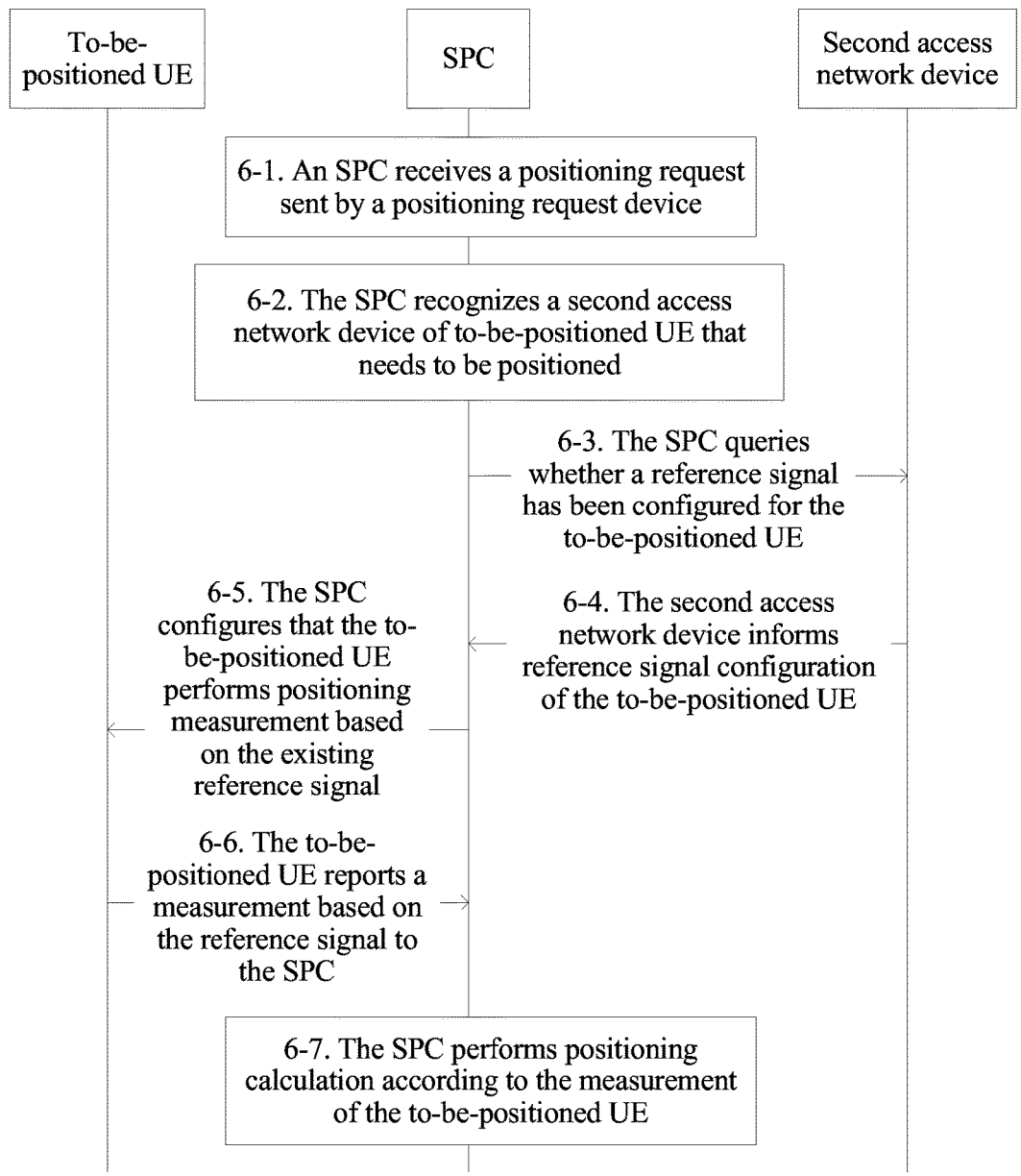
FIG. 18 is a schematic interaction diagram of another positioning parameter coordination method according to an embodiment of the present invention.

In scenario three in which an SPC and a base station (or an access point) coordinately reuse an existing reference signal to perform positioning, FIG. 18 is a schematic interaction diagram of another positioning parameter coordination method according to an embodiment of the present invention. Referring to FIG. 18, the interaction includes the following steps.

Step 6-1. The SPC receives a positioning request sent by a positioning request device.

The positioning request may be from a third party entity, to-be-positioned UE, an access network device, or the like.

Step 6-2. The SPC recognizes a second access network device of to-be-positioned UE that needs to be positioned.

Step 6-3. The SPC queries whether a reference signal has been configured for the to-be-positioned UE.

Specifically, the SPC queries the second access network device whether a reference signal, such as a CSI-RS, has been configured for the to-be-positioned UE.

Alternatively, specifically, the SPC queries the to-be-positioned UE whether a reference signal, such as a channel state indication-reference signal (CSI-RS), has been configured for the to-be-positioned UE.

Step 6-4. The second access network device informs the SPC of reference signal configuration of the to-be-positioned UE.

Step 6-5. The SPC configures that the to-be-positioned UE performs positioning measurement based on the existing reference signal.

Specifically, the SPC requests the to-be-positioned UE to perform positioning measurement based on the configured reference signal, such as time of arrival (ToA) measurement.

Step 6-6. The to-be-positioned UE reports a measurement based on the reference signal to the SPC.

Step 6-7. The SPC performs positioning calculation according to the measurement of the to-be-positioned UE.

The following separately describes functions of the nodes: the SPC, the serving base station, the neighboring-cell base station, and the to-be-positioned UE in FIG. 18.

Figure 19:
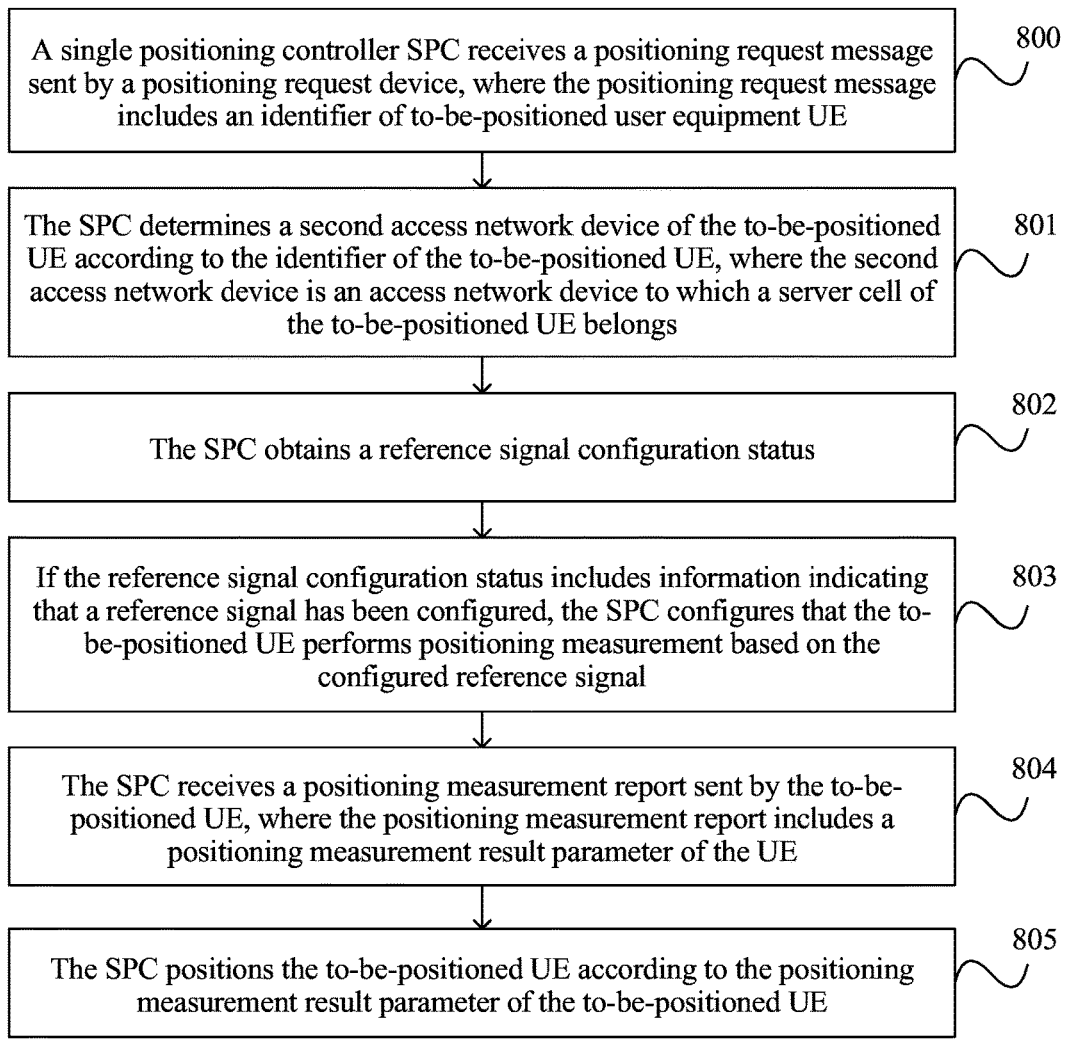
FIG. 19 is a schematic procedure diagram of another positioning parameter coordination method according to an embodiment of the present invention.

For the SPC in FIG. 18, FIG. 19 is a schematic procedure diagram of another positioning parameter coordination method according to an embodiment of the present invention. The method is performed by the SPC. Referring to FIG. 19, the method includes the following steps:

Step 800. The SPC receives a positioning request message sent by a positioning request device, where the positioning request message includes an identifier of to-be-positioned UE.

Step 801. The SPC determines a second access network device of the to-be-positioned UE according to the identifier of the to-be-positioned UE, where the second access network device is an access network device to which a server cell of the to-be-positioned UE belongs.

Step 802. The SPC obtains a reference signal configuration status.

Step 803. If the reference signal configuration status includes information indicating that a reference signal has been configured, the SPC configures that the to-be-positioned UE performs positioning measurement based on the configured reference signal.

Step 804. The SPC receives a positioning measurement report sent by the to-be-positioned UE, where the positioning measurement report includes a positioning measurement result parameter of the UE.

Step 805. The SPC positions the to-be-positioned UE according to the positioning measurement result parameter of the to-be-positioned UE.

According to the positioning parameter coordination method provided in this embodiment of the present invention, a SPC receives a positioning request message sent by a positioning request device, and the positioning request message includes an identifier of to-be-positioned UE. The SPC determines a second access network device of the to-be-positioned UE according to the identifier of the to-be-positioned UE, and the second access network device is an access network device to which a server cell of the to-be-positioned UE belongs. The SPC obtains a reference signal configuration status. If the reference signal configuration status includes information indicating that a reference signal has been configured, the SPC configures that the to-be-positioned UE performs positioning measurement based on the configured reference signal. The SPC receives a positioning measurement report sent by the to-be-positioned UE, and the positioning measurement report includes a positioning measurement result parameter of the UE. The SPC positions the to-be-positioned UE according to the positioning measurement result parameter of the to-be-positioned UE. In this way, the SPC can use the existing reference signal to position the UE, unnecessary network overheads are reduced, network resource utilization is improved, and positioning accuracy of the UE is ensured.

Optionally, step 802 may include multiple feasible implementations, and several feasible implementations are described below.

Manner One.

Step 802a-1. The SPC sends a first query message to the second access network device, where the first query message is used to query whether the second access network device has configured a reference signal for the to-be-positioned UE.

Step 802a-2. The SPC receives a first query response message sent by the second access network device, where the first query response message includes the information indicating that a reference signal has been configured.

Manner Two.

Step 802b-1. The SPC sends a second query message to the to-be-positioned UE, where the second query message is used to query whether a reference signal has been configured for the UE.

Step 802b-2. The SPC receives a second query response message sent by the to-be-positioned UE, where the second query response message includes the information indicating that a reference signal has been configured.

Further, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

A feasible implementation of step 803 is as follows.

Step 803a-1. The SPC sends a positioning measurement trigger message to the to-be-positioned UE, where the positioning measurement trigger message includes configuration information of the configured reference signal and positioning measurement indication information.

The positioning measurement indication information is used to represent any one of the following positioning measurement methods: GNSS positioning, an OTDOA manner, enhanced cell ID positioning, or U-TDOA positioning, or fingerprint matching positioning.

Optionally, the positioning request device is the to-be-positioned UE, an access network device, a core network device, or a 3rd party application server.

Figure 20:
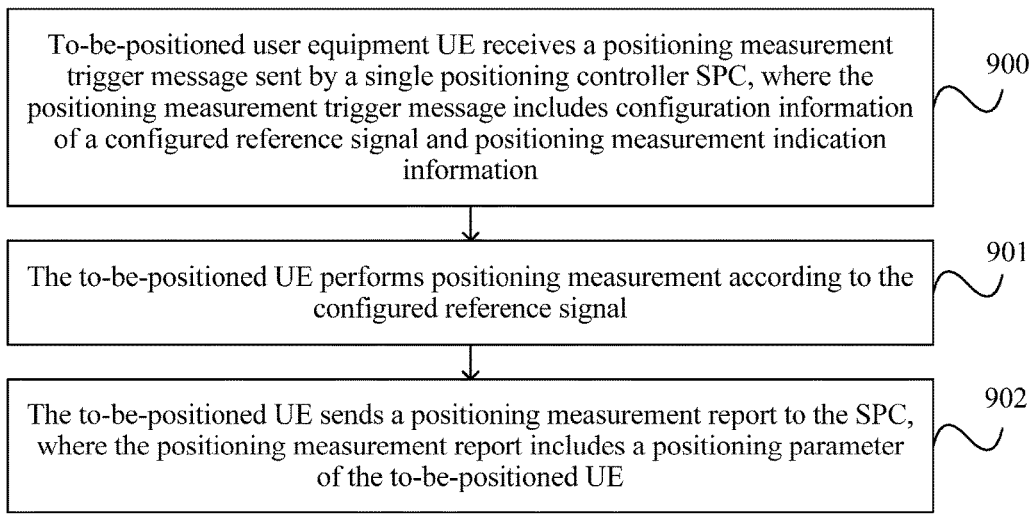
FIG. 20 is a schematic procedure diagram of another positioning parameter coordination method according to an embodiment of the present invention.

For the to-be-positioned UE in FIG. 18, FIG. 20 is a schematic procedure diagram of another positioning parameter coordination method according to an embodiment of the present invention. The method is performed by the to-be-positioned UE. Referring to FIG. 20, the method includes the following steps.

Step 900. The to-be-positioned UE receives a positioning measurement trigger message sent by a SPC, where the positioning measurement trigger message includes configuration information of a configured reference signal and positioning measurement indication information.

Step 901. The to-be-positioned UE performs positioning measurement according to the configured reference signal.

Specifically, the positioning measurement is measuring a time of arrival and/or an angle of arrival and/or a time difference of arrival of the configured reference signal.

Step 902. The to-be-positioned UE sends a positioning measurement report to the SPC, where the positioning measurement report includes a positioning parameter of the to-be-positioned UE.

According to the positioning parameter coordination method provided in this embodiment of the present invention, to-be-positioned UE receives a positioning measurement trigger message sent by a SPC, and the positioning measurement trigger message includes configuration information of a configured reference signal and positioning measurement indication information. The to-be-positioned UE performs positioning measurement according to the configured reference signal, and the positioning measurement is measuring a time of arrival and/or an angle of arrival and/or a time difference of arrival of the configured reference signal. The to-be-positioned UE sends a positioning measurement report to the SPC, and the positioning measurement report includes a positioning parameter of the to-be-positioned UE. In this way, the SPC can use the existing reference signal to position the UE, unnecessary network overheads are reduced, network resource utilization is improved, and positioning accuracy of the UE is ensured.

Optionally, before step 900, the method further includes.

Step 903. The to-be-positioned UE receives a second query message sent by the SPC, where the second query message is used to query whether a reference signal has been configured for the to-be-positioned UE.

Step 904. The to-be-positioned UE sends a second query response message to the SPC when it is determined that a reference signal has been configured for the to-be-positioned UE, where the second query response message includes information indicating that a reference signal has been configured.

Optionally, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

Optionally, the positioning measurement indication information is used to represent any one of the following positioning measurement methods: GNSS positioning, an OTDOA manner, enhanced cell ID positioning, or U-TDOA positioning, or fingerprint matching positioning.

Figure 21:
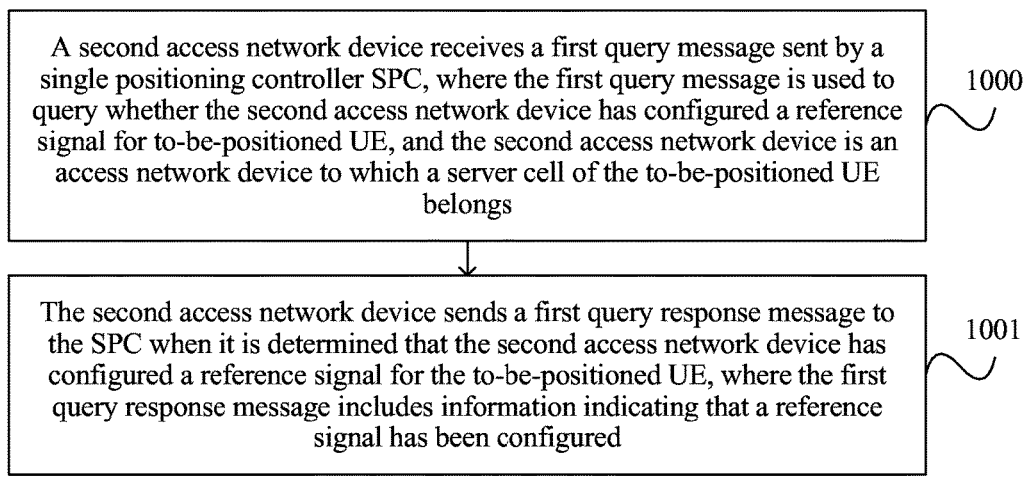
FIG. 21 is a schematic procedure diagram of another positioning parameter coordination method according to an embodiment of the present invention.

For the serving base station in FIG. 18, FIG. 21 is a schematic procedure diagram of another positioning parameter coordination method according to an embodiment of the present invention. The method is performed by the serving base station. Referring to FIG. 21, the method includes the following steps:

Step 1000. A second access network device receives a first query message sent by a SPC, where the first query message is used to query whether the second access network device has configured a reference signal for to-be-positioned UE, and the second access network device is an access network device to which a server cell of the to-be-positioned UE belongs.

Step 1001. The second access network device sends a first query response message to the SPC when it is determined that the second access network device has configured a reference signal for the to-be-positioned UE, where the first query response message includes information indicating that a reference signal has been configured.

According to the positioning parameter coordination method provided in this embodiment of the present invention, a second access network device receives a first query message sent by a SPC, and the first query message is used to query whether the second access network device has configured a reference signal for to-be-positioned UE, and the second access network device is an access network device to which a server cell of the to-be-positioned UE belongs. When it is determined that the second access network device has configured a reference signal for the to-be-positioned UE, the second access network device sends a first query response message to the SPC, and the query response message includes information indicating that a reference signal has been configured. In this way, the SPC can use the existing reference signal to position the UE, unnecessary network overheads are reduced, network resource utilization is improved, and positioning accuracy of the UE is ensured.

Optionally, the information indicating that a reference signal has been configured includes any one or a combination of the following: a sending period of the configured downlink positioning signal, a scheduled sending time of the configured downlink positioning signal, a sending frequency channel number of the configured downlink positioning signal, and/or a sending sequence of the configured downlink positioning signal.

Figure 22:
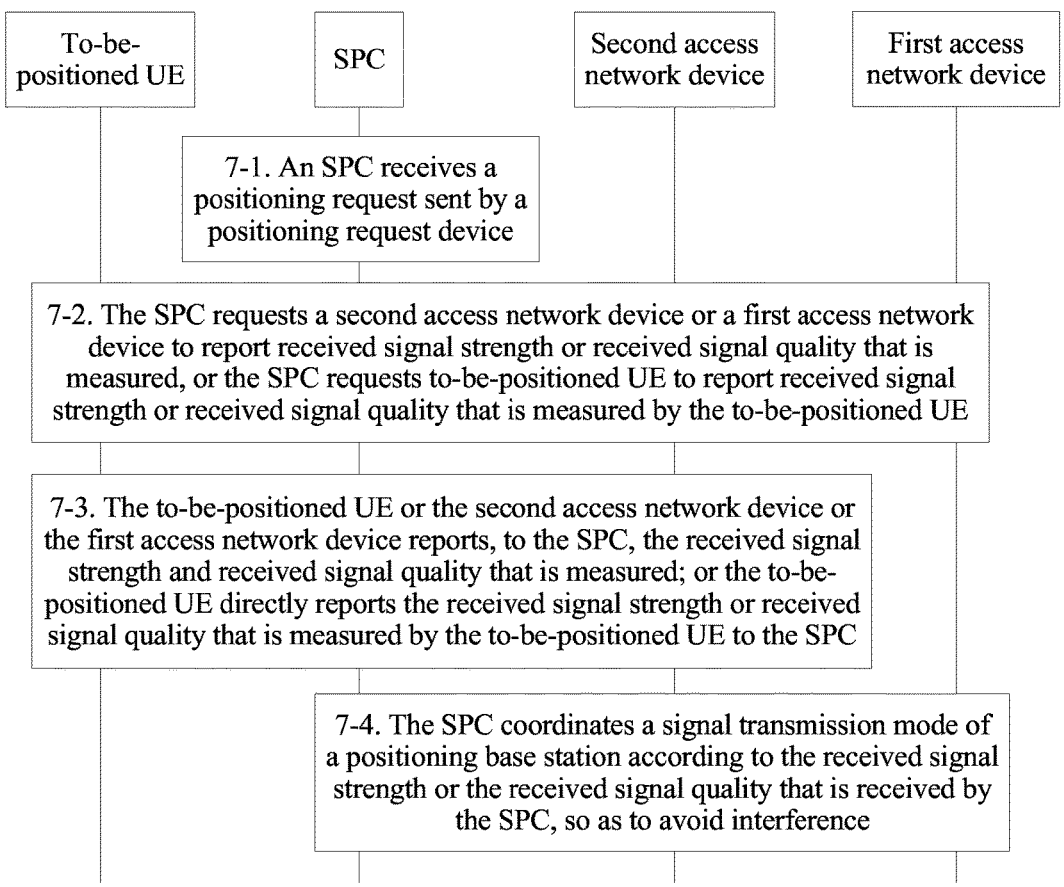
FIG. 22 is a schematic interaction diagram of another positioning parameter coordination method according to an embodiment of the present invention.

In scenario four, for a manner in which an SPC and a base station (or an access point) coordinately cancel interference in a positioning signal, an embodiment of the present invention provides another positioning parameter coordination method. FIG. 22 is a schematic interaction diagram of another positioning parameter coordination method according to this embodiment of the present invention. Referring to FIG. 22, the interaction includes the following steps.

Step 7-1 The SPC receives a positioning request sent by a positioning request device.

The positioning request may be from a third party entity, to-be-positioned UE, an access network device, or the like.

Step 7-2. The SPC requests a second access network device or a first access network device to report received signal strength or received signal quality that is measured, or the SPC requests to-be-positioned UE to report received signal strength or received signal quality that is measured by the to-be-positioned UE.

Specifically, step 7-2 includes an uplink solution and a downlink solution. For the uplink solution, the to-be-positioned UE serves as a sending party of a reference signal, and a serving base station of the to-be-positioned UE or a neighboring-cell base station of the to-be-positioned UE serves as a receiving party of the reference signal, and the SPC may request the serving base station of the to-be-positioned UE or the neighboring-cell base station of the to-be-positioned UE (the receiving party) to report signal strength or signal quality of the reference signal that is sent by the to-be-positioned UE and that is received by the receiving party. For the downlink solution, the to-be-positioned UE serves as a receiving party of a reference signal, a serving base station of the to-be-positioned UE or a neighboring-cell base station of the to-be-positioned UE serves as a sending party of the reference signal, and the SPC may request the to-be-positioned UE (the receiving party) to report signal strength or signal quality of the reference signal that is sent by the serving base station of the to-be-positioned UE or the neighboring-cell base station of the to-be-positioned UE and that is received by the to-be-positioned UE.

Step 7-3. The to-be-positioned UE or the second access network device or the first access network device reports, to the SPC, received signal strength or received signal quality that is measured.

Step 7-4. The SPC coordinates a signal transmission mode of a positioning base station according to the received signal strength or the received signal quality that is received by the SPC, so as to avoid interference.

Specifically, for the receiving party in the foregoing uplink solution or downlink solution, when the received signal strength or the received signal quality of the reference signal received by the receiving party meets a requirement, a data service does not need to be restricted on the foregoing sending party of the reference signal. Otherwise, a data service needs to be restricted on the sending party of the reference signal. Specifically, for the uplink solution, the SPC restricts mainly data service transmission of surrounding non-positioned UE other than the to-be-positioned UE. For the downlink solution, the SPC restricts mainly data service transmission of the serving base station of the to-be-positioned UE or of the neighboring-cell base station of the to-be-positioned UE. In this way, relatively less interference in the positioning-used reference signal is ensured. It needs to be noted that the non-positioned UE is not shown in FIG. 22.

Figure 23:
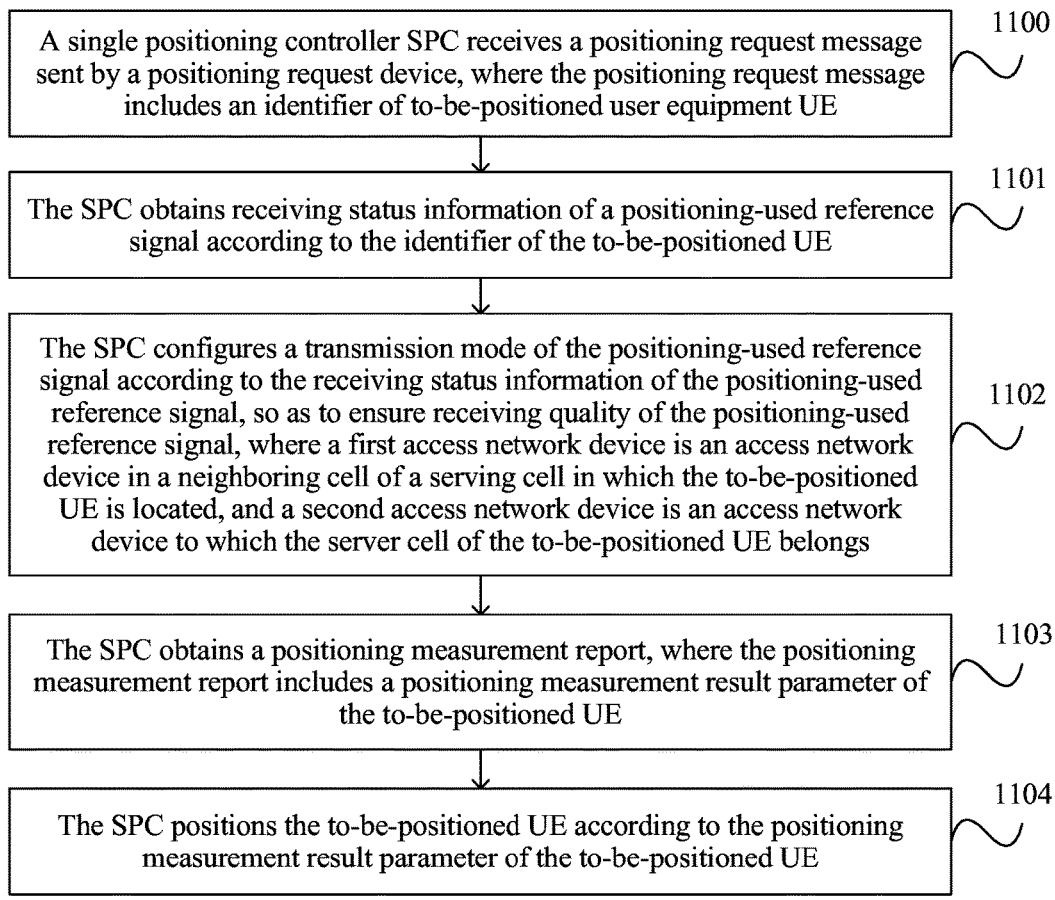
FIG. 23 is a schematic procedure diagram of another positioning parameter coordination method according to an embodiment of the present invention.

For the SPC in FIG. 22, FIG. 23 is a schematic procedure diagram of another positioning parameter coordination method according to an embodiment of the present invention. The method is performed by the SPC. Referring to FIG. 23, the method includes the following steps:

Step 1100. The SPC receives a positioning request message sent by a positioning request device, where the positioning request message includes an identifier of to-be-positioned UE.

Step 1101. The SPC obtains receiving status information of a positioning-used reference signal according to the identifier of the to-be-positioned UE.

Step 1102. The SPC configures a transmission mode of the positioning-used reference signal according to the receiving status information of the positioning-used reference signal, so as to ensure receiving quality of the positioning-used reference signal, where a first access network device is an access network device in a neighboring cell of a serving cell in which the to-be-positioned UE is located, and a second access network device is an access network device to which the server cell of the to-be-positioned UE belongs.

Step 1103. The SPC obtains a positioning measurement report, where the positioning measurement report includes a positioning measurement result parameter of the to-be-positioned UE.

Step 1104. The SPC positions the to-be-positioned UE according to the positioning measurement result parameter of the to-be-positioned UE.

According to the positioning parameter coordination method provided in this embodiment of the present invention, a SPC receives a positioning request message sent by a positioning request device, and the positioning request message includes an identifier of to-be-positioned UE. The SPC obtains receiving status information of a positioning-used reference signal according to the identifier of the to-be-positioned UE. The SPC configures a transmission mode for the positioning-used reference signal according to the receiving status information of the positioning-used reference signal, so as to ensure receiving quality of the positioning-used reference signal. A first access network device is an access network device in a neighboring cell of a serving cell in which the to-be-positioned UE is located, and a second access network device is an access network device to which the server cell of the to-be-positioned UE belongs. The SPC obtains a positioning measurement report, and the positioning measurement report includes a positioning measurement result parameter of the to-be-positioned UE. The SPC positions the to-be-positioned UE according to the positioning measurement result parameter of the to-be-positioned UE. In this way, when positioning the UE, the SPC configures the transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, step 1101 may include multiple feasible implementations, and several feasible implementations are used below to describe step 1101.

Manner One.

Step 1101a-1. The SPC sends a first report request message to at least one first access network device according to the identifier of the to-be-positioned UE, where the first report request message is used to instruct the at least one first access network device to report receiving status information of a positioning-used reference signal received by the at least one first access network device.

Manner Two.

Step 101b-1. The SPC sends a second report request message to a second access network device according to the identifier of the to-be-positioned UE, where the second report request message is used to instruct the second access network device to report receiving status information of a positioning-used reference signal received by the second access network device.

Manner Three.

Step 1101-1. The SPC sends a third report request message to the to-be-positioned UE according to the identifier of the to-be-positioned UE, where the third report request message is used to instruct the to-be-positioned UE to report receiving status information of a positioning-used reference signal received by the to-be-positioned UE.

It needs to be noted that, in the foregoing three feasible implementations of step 1101, manner one and manner two may be used in the uplink solution in FIG. 22, and manner three may be used in the downlink solution in FIG. 22.

Optionally, step 1103 may include multiple feasible implementations, and several feasible implementations are used below to describe step 1103.

Manner One.

Step 1103a-1. The SPC receives a first report response message sent by the at least one first access network device, where the first report response message includes the receiving status information of the positioning-used reference signal received by the at least one first access network device.

Manner Two.

Step 1103b-1. The SPC receives a second report response message sent by the second access network device, where the second report response message includes the receiving status information of the positioning-used reference signal received by the second access network device.

Manner Three.

Step 1103c-1. The SPC receives a third report response message sent by the to-be-positioned UE, where the third report response message includes the receiving status information of the positioning-used reference signal received by the to-be-positioned UE.

It needs to be noted that, in the foregoing three feasible implementations of step 1103, manner one and manner two may be used in the uplink solution in FIG. 22, and manner three may be used in the downlink solution in FIG. 22.

Optionally, the receiving status information of the positioning-used reference signal received by the at least one first access network device includes a signal strength value of the positioning-used reference signal received by the at least one first access network device, and/or signal quality of the positioning-used reference signal received by the at least one first access network device.

The receiving status information of the positioning-used reference signal received by the second access network device includes a signal strength value of the positioning-used reference signal received by the second access network device, and/or signal quality of the positioning-used reference signal received by the second access network device.

The receiving status information of the positioning-used reference signal received by the to-be-positioned UE includes a signal strength value of the positioning-used reference signal received by the to-be-positioned UE, and/or signal quality of the positioning-used reference signal received by the to-be-positioned UE.

Optionally, step 1102 may include multiple feasible implementations, and several feasible implementations are used below to describe step 1102.

Manner One.

Step 1102a-1. The SPC compares a first interference threshold with the signal strength value of the positioning-used reference signal received by the at least one first access network device, and if the signal strength value of the positioning-used reference signal received by the at least one first access network device is less than or equal to the first interference threshold, the SPC sends a signal transmission mode indication message to non-positioned UE, where the signal transmission mode indication message is used to instruct the non-positioned UE to restrict data service transmission when the SPC performs positioning processing of the UE, and there is a service transmitted between the non-positioned UE and the at least one first access network device.

Step 1102b-1. The SPC compares a second interference threshold with the signal quality of the positioning-used reference signal received by the at least one first access network device, and if the signal quality of the positioning-used reference signal received by the at least one first access network device is less than or equal to the second interference threshold, the SPC sends the signal transmission mode indication message to the non-positioned UE, where the signal transmission mode indication message is used to instruct the non-positioned UE to restrict data service transmission when the SPC performs positioning processing of the UE.

Manner Two.

Step 1102c-1. The SPC compares a third interference threshold with the signal strength value of the positioning-used reference signal received by the second access network device, and if the signal strength value of the positioning-used reference signal received by the second access network device is less than or equal to the third interference threshold, the SPC sends a signal transmission mode indication message to non-positioned UE, where the signal transmission mode indication message is used to instruct the non-positioned UE to restrict data service transmission when the SPC performs positioning processing of the UE, and there is a service transmitted between the non-positioned UE and the second access network device.

Step 1102d-1. The SPC compares a fourth interference threshold with the signal quality of the positioning-used reference signal received by the second access network device, and if the signal quality of the positioning-used reference signal received by the second access network device is less than or equal to the fourth interference threshold, the SPC sends the signal transmission mode indication message to the non-positioned UE, where the signal transmission mode indication message is used to instruct the non-positioned UE to restrict data service transmission when the SPC performs positioning processing of the UE.

Manner Three.

Step 1102e-1. The SPC compares a fifth interference threshold with the signal strength value of the positioning-used reference signal received by the to-be-positioned UE, and if the signal strength value of the positioning-used reference signal received by the to-be-positioned UE is less than or equal to the fifth interference threshold, the SPC sends a signal transmission mode indication message to the at least one first access network device and/or the second access network device, where the signal transmission mode indication message is used to instruct the at least one first access network device and/or the second access network device to restrict data service transmission when the SPC performs positioning processing of the UE.

Step 1102f-1. The SPC compares a sixth interference threshold with the signal quality of the positioning-used reference signal received by the to-be-positioned UE, and if the signal quality of the positioning-used reference signal received by the to-be-positioned UE is less than or equal to the sixth interference threshold, the SPC sends the signal transmission mode indication message to the at least one first access network device and/or the second access network device, where the signal transmission mode indication message is used to instruct the at least one first access network device and/or the second access network device to restrict data service transmission when the SPC performs positioning processing of the UE.

It needs to be noted that, in the foregoing three feasible implementations of step 1102, manner one and manner two may be used in the uplink solution in FIG. 22, and manner three may be used in the downlink solution in FIG. 22.

Optionally, the positioning request device is the to-be-positioned UE, an access network device, a core network device, or a 3rd party application server.

Based on the embodiment in FIG. 22, for the uplink solution and the downlink solution, the following separately describes the to-be-positioned UE, the serving base station, and the neighboring-cell base station.

Figure 24:
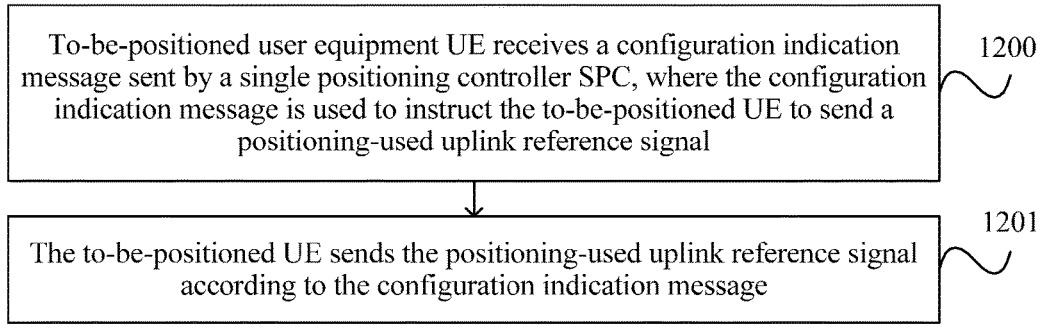
FIG. 24 is a schematic procedure diagram of another positioning parameter coordination method according to an embodiment of the present invention.

For the uplink solution described in the embodiment in FIG. 22, FIG. 24 is a schematic procedure diagram of another positioning parameter coordination method according to an embodiment of the present invention. The method is performed by the to-be-positioned UE. Referring to FIG. 24, the method includes the following steps:

Step 1200. The to-be-positioned UE receives a configuration indication message sent by a SPC, where the configuration indication message is used to instruct the to-be-positioned UE to send a positioning-used uplink reference signal.

Step 1201. The to-be-positioned UE sends the positioning-used uplink reference signal according to the configuration indication message.

According to the positioning parameter coordination method provided in this embodiment of the present invention, to-be-positioned UE receives a configuration indication message sent by a SPC, and the configuration indication message is used to instruct the to-be-positioned UE to send a positioning-used uplink reference signal. The to-be-positioned UE sends the positioning-used uplink reference signal according to the configuration indication message. In this way, when positioning the UE, the SPC configures a transmission mode of the positioning-used reference signal according to receiving status information of the positioning-used reference signal, so as to ensure receiving quality of the positioning-used reference signal, avoid interference in positioning the UE from other service data transmission, and improve positioning accuracy of the UE.

Figure 25:
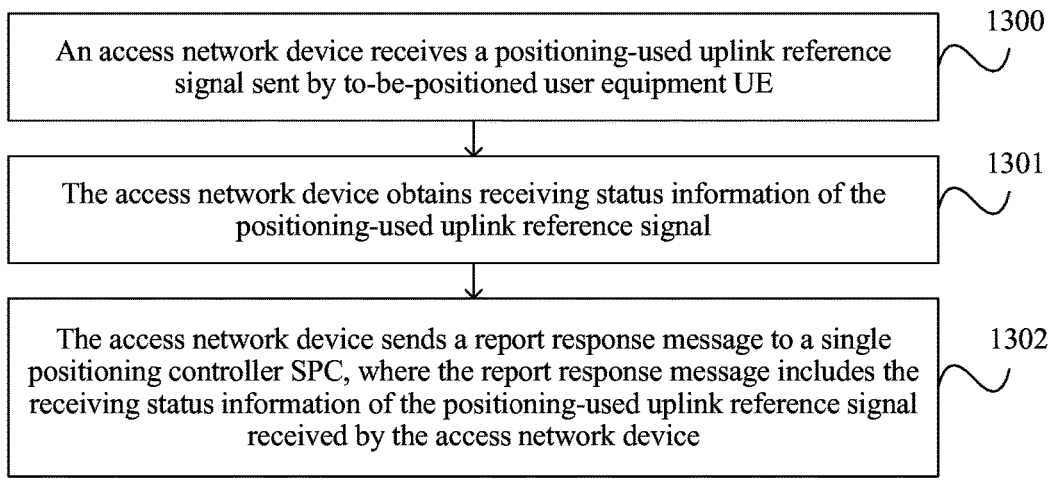
FIG. 25 is a schematic procedure diagram of another positioning parameter coordination method according to an embodiment of the present invention.

For the uplink solution described in the embodiment in FIG. 22, FIG. 25 is a schematic procedure diagram of another positioning parameter coordination method according to an embodiment of the present invention. The method is performed by an access network device, and the access network device may be a serving base station of to-be-positioned UE or a neighboring-cell base station of to-be-positioned UE. Referring to FIG. 25, the method includes the following steps.

Step 1300. The access network device receives a positioning-used uplink reference signal sent by to-be-positioned UE.

Step 1301. The access network device obtains receiving status information of the positioning-used uplink reference signal.

Step 1302. The access network device sends a report response message to a SPC, where the report response message includes the receiving status information of the positioning-used uplink reference signal received by the access network device.

According to the positioning parameter coordination method provided in this embodiment of the present invention, an access network device receives a positioning-used uplink reference signal sent by to-be-positioned UE. The access network device obtains receiving status information of the positioning-used uplink reference signal. The access network device sends a report response message to a SPC, and the report response message includes the receiving status information of the positioning-used uplink reference signal received by the access network device. In this way, when positioning the UE, the SPC configures a transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, before step 1302, the method further includes.

Step 1303. The access network device receives a report request message sent by the SPC, where the report request message is used to instruct the access network device to report the receiving status information of the positioning-used uplink reference signal received by the access network device.

Optionally, the receiving status information of the positioning-used uplink reference signal received by the access network device includes a signal strength value of the positioning-used uplink reference signal received by the access network device, and/or signal quality of the positioning-used uplink reference signal received by the access network device.

Further, the access network device is a first access network device and/or a second access network device.

The first access network device is an access network device to which a server cell of the to-be-positioned UE belongs.

The second access network device is an access network device to which the server cell of the to-be-positioned UE belongs.

Figure 26:
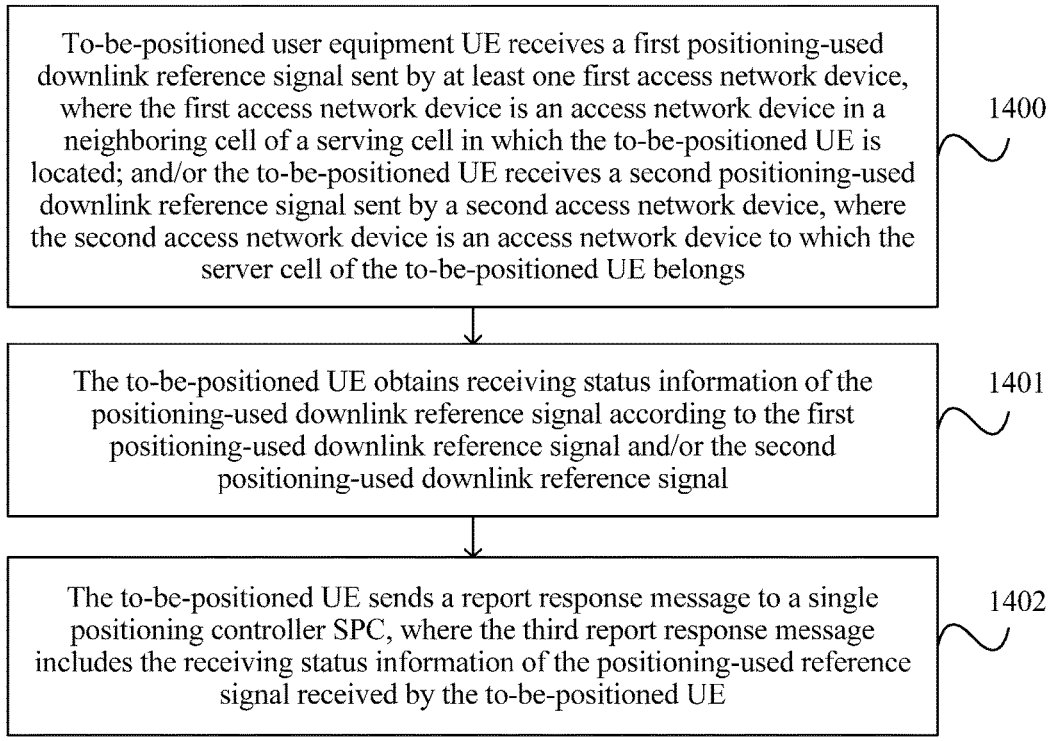
FIG. 26 is a schematic procedure diagram of another positioning parameter coordination method according to an embodiment of the present invention.

For the downlink solution described in the embodiment in FIG. 22, FIG. 26 is a schematic procedure diagram of another positioning parameter coordination method according to an embodiment of the present invention. The method is performed by to-be-positioned UE. Referring to FIG. 26, the method includes the following steps.

Step 1400. The to-be-positioned UE receives a first positioning-used downlink reference signal sent by at least one first access network device, where the first access network device is an access network device in a neighboring cell of a serving cell in which the to-be-positioned UE is located; and/or the to-be-positioned UE receives a second positioning-used downlink reference signal sent by a second access network device, where the second access network device is an access network device to which the server cell of the to-be-positioned UE belongs.

Step 1401. The to-be-positioned UE obtains receiving status information of the positioning-used downlink reference signal according to the first positioning-used downlink reference signal and/or the second positioning-used downlink reference signal.

Step 1402. The to-be-positioned UE sends a report response message to a SPC, where the third report response message includes the receiving status information of the positioning-used reference signal received by the to-be-positioned UE.

According to the positioning parameter coordination method provided in this embodiment of the present invention, to-be-positioned UE receives a first positioning-used downlink reference signal sent by at least one first access network device, where the first access network device is an access network device in a neighboring cell of a serving cell in which the to-be-positioned UE is located; and/or the to-be-positioned UE receives a second positioning-used downlink reference signal sent by a second access network device, where the second access network device is an access network device to which the server cell of the to-be-positioned UE belongs. The to-be-positioned UE obtains receiving status information of the positioning-used downlink reference signal according to the first positioning-used downlink reference signal and/or the second positioning-used downlink reference signal. The to-be-positioned UE sends a report response message to a SPC, and the third report response message includes the receiving status information of the positioning-used reference signal received by the to-be-positioned UE. In this way, when positioning the UE, the SPC configures a transmission mode of the positioning-used reference signal according to the receiving status information of the positioning-used reference signal, so as to ensure receiving quality of the positioning-used reference signal, avoid interference in positioning the UE from other service data transmission, and improve positioning accuracy of the UE.

Optionally, before step 1402, the method further includes.

Step 1403. The to-be-positioned UE receives a report request message sent by the SPC, where the report request message is used to instruct the to-be-positioned UE to report the receiving status information of the positioning-used downlink reference signal received by the to-be-positioned UE.

Optionally, the receiving status information of the positioning-used reference signal received by the to-be-positioned UE includes a signal strength value of the positioning-used downlink reference signal received by the to-be-positioned UE, and/or signal quality of the positioning-used downlink reference signal received by the to-be-positioned UE.

Figure 27:
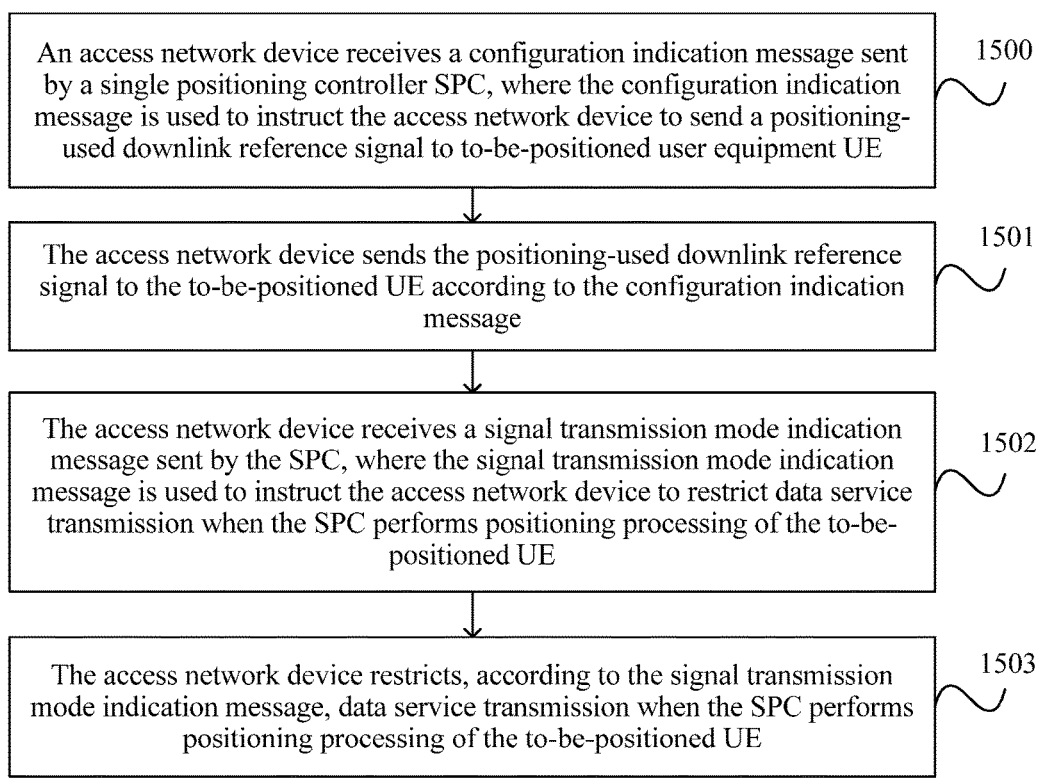
FIG. 27 is a schematic procedure diagram of another positioning parameter coordination method according to an embodiment of the present invention.

For the downlink solution described in the embodiment in FIG. 22, FIG. 27 is a schematic procedure diagram of another positioning parameter coordination method according to an embodiment of the present invention. The method is performed by an access network device, and the access network device may be a serving base station of to-be-positioned UE or a neighboring-cell base station of to-be-positioned UE. Referring to FIG. 27, the method includes the following steps.

Step 1500. The access network device receives a configuration indication message sent by a SPC, where the configuration indication message is used to instruct the access network device to send a positioning-used downlink reference signal to to-be-positioned UE.

Step 1501. The access network device sends the positioning-used downlink reference signal to the to-be-positioned UE according to the configuration indication message.

Step 1502. The access network device receives a signal transmission mode indication message sent by the SPC, where the signal transmission mode indication message is used to instruct the access network device to restrict data service transmission when the SPC performs positioning processing of the to-be-positioned UE.

Step 1503. The access network device restricts, according to the signal transmission mode indication message, data service transmission when the SPC performs positioning processing of the to-be-positioned UE.

According to the positioning parameter coordination method provided in this embodiment of the present invention, an access network device receives a configuration indication message sent by a SPC, and the configuration indication message is used to instruct the access network device to send a positioning-used downlink reference signal to to-be-positioned UE. The access network device sends the positioning-used downlink reference signal to the to-be-positioned UE according to the configuration indication message. The access network device receives a signal transmission mode indication message sent by the SPC, and the signal transmission mode indication message is used to instruct the access network device to restrict data service transmission when the SPC performs positioning processing of the to-be-positioned UE. The access network device restricts, according to the signal transmission mode indication message, data service transmission when the SPC performs positioning processing of the to-be-positioned UE. In this way, when positioning the UE, the SPC configures a transmission mode of the positioning-used reference signal according to receiving status information of the positioning-used reference signal, so as to ensure receiving quality of the positioning-used reference signal, avoid interference in positioning the UE from other service data transmission, and improve positioning accuracy of the UE.

Further, the access network device is a first access network device and/or a second access network device.

The first access network device is an access network device in a neighboring cell of a serving cell in which the to-be-positioned UE is located. The second access network device is an access network device to which the server cell of the to-be-positioned UE belongs.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of the present embodiments, but not for limiting the present embodiments. Although the present embodiments are described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A single positioning controller (SPC), comprising:
  a processor; and
  a non-transitory computer readable storage medium storing a program for execution by the processor, the program including instructions to:
    receive a positioning request message sent by a positioning request device, wherein the positioning request message comprises an identifier of a to-be-positioned user equipment (UE);
    obtain capability information of the to-be-positioned UE according to the identifier of the to-be-positioned UE, wherein the capability information of the to-be-positioned UE indicates radio standards supported by the UE;
    determine a first access network device according to the capability information of the to-be-positioned UE, wherein the first access network device is located in a neighboring cell of the to-be-positioned UE, a server cell of the to-be-positioned UE belongs to a second access network device different from the first access network device, and the first access network device supports one of the radio standards supported by the to-be-positioned UE;
    perform positioning configuration according to the first access network device;
    obtain a positioning measurement report of the to-be-positioned UE from the to-be-positioned UE, wherein the positioning measurement report comprises:
      a positioning measurement result parameter of the to-be-positioned UE, wherein the to-be-positioned UE obtains the positioning measurement result parameter by performing positioning measurement of a downlink position reference signal received, by the to-be-positioned UE, from the first access network device; and
      a second positioning measurement result parameter, wherein the to-be-positioned UE obtains the second positioning measurement result parameter by performing position measurement of a second downlink positioning reference signal received, by the to-be-positioned UE, from the second access network device;
    position the to-be-positioned UE according to the positioning measurement result parameter of the to-be-positioned UE and the second positioning measurement result parameter of the to-be-positioned UE.

2. The SPC according to claim 1, wherein the instructions further comprise instructions to:
  send a second UE capability query message to the to-be-positioned UE according to the identifier of the to-be-positioned UE; and
  receive a second UE capability query response message sent by the to-be-positioned UE, wherein the second UE capability query response message comprises the capability information of the to-be-positioned UE.

3. The SPC according to claim 1, wherein the instructions further comprise instructions to:
  send a first UE capability query message to the second access network device according to the identifier of the to-be-positioned UE; and
  receive a first UE capability query response message sent by the second access network device, wherein the first UE capability query response message comprises the capability information of the to-be-positioned UE.

4. The SPC according to claim 3, wherein the instructions further comprise instructions to:
  configure downlink positioning signal configuration information of the first access network device;
  configure downlink positioning signal configuration information of the second access network device; and
  send the downlink positioning signal configuration information of the first access network device and the downlink positioning signal configuration information of the second access network device to the to-be-positioned UE.

5. The SPC according to claim 4, wherein the instructions further comprise instructions to:
  send a first query message to the first access network device;
  send a second query message to the second access network device;
  send the downlink positioning signal configuration information of the first access network device and the downlink positioning signal configuration information of the second access network device to the to-be-positioned UE;
  receive a first query response message sent by the first access network device, wherein the first query response message comprises the downlink positioning signal configuration information of the first access network device; and receive a second query response message sent by the second access network device, wherein the second query response message comprises the downlink positioning signal configuration information of the second access network device.

6. The SPC according to claim 4, wherein the downlink positioning signal configuration information of the first access network device comprises at least one of:
   a sending period of a downlink positioning signal, a scheduled sending time of a downlink positioning signal, a sending frequency channel number of a downlink positioning signal, or a sending sequence of a downlink positioning signal; and
   wherein the downlink positioning signal configuration information of the second access network device comprises at least one of:
   a sending period of a downlink positioning signal, a scheduled sending time of a downlink positioning signal, a sending frequency channel number of a downlink positioning signal, or a sending sequence of a downlink positioning signal.

7. The SPC according to claim 3, wherein the instructions further comprise instructions to:
   use the second access network device to configure the to-be-positioned UE to send an uplink reference signal, before performing positioning configuration;
   send uplink reference signal configuration information of the to-be-positioned UE to the first access network device and to the second access network device; and
   receive positioning measurement reports of the to-be-positioned UE that are separately sent by the first access network device and by the second access network device.

8. The SPC according to claim 1, wherein the positioning request device is the to-be-positioned UE, an access network device, a core network device, or a third party application server.

9. A method, comprising:
   receiving, by a single positioning controller (SPC), a positioning request message sent by a positioning request device, wherein the positioning request message comprises an identifier of a to-be-positioned user equipment (UE);
   obtaining, by the SPC, capability information of the to-be-positioned UE according to the identifier of the UE, wherein the capability information of the to-be-positioned UE indicates radio standards supported by the UE;
   determining, by the SPC, a first access network device according to the capability information of the to-be-positioned UE, wherein the first access network device is located in a neighboring cell of the to-be-positioned UE, a server cell of the to-be-positioned UE belongs to a second access network device different from the first access network device, and wherein the first access network device supports one of the radio standards supported by the to-be-positioned UE;
   performing, by the SPC, positioning configuration according to the first access network device;
   obtaining, by the SPC, a positioning measurement report of the to-be-positioned UE, wherein the positioning measurement report comprises:
      a positioning measurement result parameter of the to-be-positioned UE, wherein the to-be-positioned UE obtains the positioning measurement result parameter by performing positioning measurement of a downlink position reference signal received, by the to-be-positioned UE, from the first access network device; and
      a second positioning measurement result parameter, wherein the to-be-positioned UE obtains the second positioning measurement result parameter by performing position measurement of a second downlink positioning reference signal received, by the to-be-positioned UE, from the second access network device; and
   positioning, by the SPC, the to-be-positioned UE according to the positioning measurement result parameter of the to-be-positioned UE and the second positioning measurement result parameter of the to-be-positioned UE.

10. The method according to claim 9, wherein obtaining the capability information of the to-be-positioned UE comprises:
    sending, by the SPC, a first UE capability query message to the second access network device according to the identifier of the to-be-positioned UE; and
    receiving, by the SPC, a first UE capability query response message sent by the second access network device, wherein the first capability query response message comprises the capability information of the to-be-positioned UE.

11. The method according to claim 10, wherein obtaining the positioning measurement report of the to-be-positioned UE comprises:
    receiving, by the SPC, the positioning measurement report sent by the to-be-positioned UE, wherein the positioning measurement report comprises a positioning measurement result of downlink positioning reference signals based on multiple access networks.

12. The method according to claim 11, wherein the downlink positioning signal configuration information of the first access network device comprises at least one of:
    a sending period of a downlink positioning signal, a scheduled sending lime of a downlink positioning signal, a sending frequency channel number of a downlink positioning signal, or a sending sequence of a downlink positioning signal; and
    wherein the downlink positioning signal configuration information of the second access network device comprises at least one of:
    a sending period of a downlink positioning signal, a scheduled sending time of a downlink positioning signal, a sending frequency channel number of a downlink positioning signal, or a sending sequence of a downlink positioning signal.

13. The method according to claim 11, wherein performing positioning configuration comprises:
    sending, by the SPC, a first query message to the first access network device;
    sending, by the SPC, a second query message to the second access network device;
    receiving, by the SPC, a first query response message sent by the first access network device, wherein the first query response message comprises the downlink positioning signal configuration information of the first access network device;
    receiving, by the SPC, a second query response message sent by the second access network device, wherein the second query response message comprises the downlink positioning signal configuration information of the second access network device; and sending, by the SPC, the downlink positioning signal configuration information of the first access network device and the downlink positioning signal configuration information of the second access network device to the to-be-positioned UE.

14. The method according to claim 10, wherein performing positioning configuration comprises:
configuring, by the SPC, downlink positioning signal configuration information of the first access network device;
configuring, by the SPC, downlink positioning signal configuration information of the second access network device; and
sending, by the SPC, the downlink positioning signal configuration information of the first access network device and the downlink positioning signal configuration information of the second access network device to the to-be-positioned UE.

15. The method according to claim 10, wherein the method comprises:
configuring, by the SPC using the second access network device, that the to-be-positioned UE sends an uplink reference signal, before performing positioning configuration according to the first access network device;
wherein performing positioning configuration comprises sending, by the SPC, uplink reference signal configuration information of the to-be-positioned UE to the first access network device and to the second access network device; and
wherein obtaining the positioning measurement report of the to-be-positioned UE comprises receiving, by the SPC, positioning measurement reports of the to-be-positioned UE that are separately sent by the first access network device and sent by the second access network device.

16. The method according to claim 10, wherein obtaining the capability information of the to-be-positioned UE comprises:
sending, by the SPC, a second UE capability query message to the to-be-positioned UE according to the identifier of the to-be-positioned UE; and
receiving, by the SPC, a second UE capability query response message sent by the to-be-positioned UE, wherein the second UE capability query response message comprises the capability information of the to-be-positioned UE.

17. The method according to claim 9, wherein the positioning request device is the to-be-positioned UE, an access network device, a core network device, or a third party application server.

18. A non-transitory computer readable storage medium storing a program for execution by a processor of a single positioning controller (SPC), the program including instructions for:
receiving a positioning request message sent by a positioning request device, wherein the positioning request message comprises an identifier of to-be-positioned user equipment (UE);
obtaining capability information of the to-be-positioned UE according to the identifier of the to-be-positioned UE, wherein the capability information of the to-be-positioned UE indicates radio standards supported by the UE;
determining a first access network device according to the capability information of the to-be-positioned UE, wherein the first access network device is located in a neighboring cell of the to-be-positioned UE, a server cell of the to-be-positioned UE belongs to a second access network device different from the first access network device, and the first access network device supports one of the radio standards supported by the to-be-positioned UE;
performing positioning configuration according to the first access network device;
obtain a positioning measurement report of the to-be-positioned UE from the to-be-positioned UE, wherein the positioning measurement report comprises:
a positioning measurement result parameter of the to-be-positioned UE, wherein the to-be-positioned UE obtains the positioning measurement result parameter by performing positioning measurement of a downlink position reference signal received, by the to-be-positioned UE, from the first access network device; and
second positioning measurement result parameter, wherein the to-be-positioned UE obtains the second positioning measurement result parameter by performing position measurement of a second downlink positioning reference signal received, by the to-be-positioned UE, from the second access network device; and
positioning the to-be-positioned UE according to the positioning measurement result parameter of the to-be-positioned UE and the second positioning measurement result parameter of the to-be-positioned UE.

19. The non-transitory computer readable storage medium of claim 18, wherein the instructions comprise further instructions to:
send a first UE capability query message to the second access network device according to the identifier of the to-be-positioned UE; and
receive a first UE capability query response message sent by the second access network device, wherein the first UE capability query response message comprises the capability information of the to-be-positioned UE.

* * * * *

UNITED STATES PATENT AND TRADEMARK OFFICE
CERTIFICATE OF CORRECTION

| | | |
|---|---|---|
| PATENT NO. | : 10,299,240 B2 | Page 1 of 1 |
| APPLICATION NO. | : 15/677819 | |
| DATED | : May 21, 2019 | |
| INVENTOR(S) | : Cui et al. | |

It is certified that error appears in the above-identified patent and that said Letters Patent is hereby corrected as shown below:

In the Claims

In Column 80, Lines 1-2, Claim 1, delete "to-he-positioned" and insert --to-be-positioned--.

In Column 82, Line 25, Claim 10, delete "wherein the first capability" and insert --wherein the first UE capability--.

In Column 82, Line 40, Claim 12, delete "lime" and insert --time--.

In Column 84, Lines 31-32, Claim 18, delete "and second positioning measurement" and insert --and a second positioning measurement--.

Signed and Sealed this
Twenty-seventh Day of August, 2019

Andrei Iancu
*Director of the United States Patent and Trademark Office*